United States Patent
Connell et al.

(10) Patent No.: US 6,359,107 B1
(45) Date of Patent: Mar. 19, 2002

(54) COMPOSITION OF AND METHOD FOR MAKING HIGH PERFORMANCE RESINS FOR INFUSION AND TRANSFER MOLDING PROCESSES

(75) Inventors: John W. Connell, Yorktown; Joseph G. Smith, Smithfield; Paul M. Hergenrother, Yorktown, all of VA (US)

(73) Assignee: The United States of America as represented by the Administrator, National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/575,826

(22) Filed: May 18, 2000

(51) Int. Cl.[7] .................... C08G 73/10; C08G 69/26; C08G 69/28
(52) U.S. Cl. .................. 528/353; 528/125; 528/128; 528/170; 528/172; 528/173; 528/176; 528/179; 528/185; 528/188; 528/220; 528/229; 528/350; 524/600; 524/607; 526/262; 526/285; 526/935; 428/411.1; 428/395; 428/473.5
(58) Field of Search ................ 528/353, 125, 528/128, 170, 172, 173, 176, 179, 185, 188, 220, 229, 350; 428/473.5, 411.1, 395; 526/262, 285, 935; 524/600, 607

(56) References Cited

U.S. PATENT DOCUMENTS

| | | | |
|---|---|---|---|
| 4,837,300 A | 6/1989 | St. Claie et al. | 528/353 |
| 5,606,014 A | 2/1997 | Connell et al. | 528/353 |
| 5,760,168 A | * 6/1998 | Hergenrother et al. | 528/170 |
| 5,817,744 A | * 10/1998 | Sheppard et al. | 528/170 |

FOREIGN PATENT DOCUMENTS

| | | |
|---|---|---|
| EP | 0 879 839 A1 | 11/1998 |
| JP | 03203388 | 1/1991 |
| JP | 03237272 | 8/1991 |

* cited by examiner

Primary Examiner—P. Hampton-Hightower
(74) Attorney, Agent, or Firm—Robin W. Edwards; Hillary W. Hawkins

(57) ABSTRACT

A composition of and method for making high performance imide resins that are processable by resin transfer molding (RTM) and resin infusion (RI) techniques were developed. Materials with a combination of properties, making them particularly useful for the fabrication of composite parts via RTM and/or RI processes, were prepared, characterized and fabricated into moldings and carbon fiber reinforced composites and their mechanical properties were determined. These materials are particularly useful for the fabrication of structural composite components for aerospace applications. The method for making high performance resins for RTM and RI processes is a multi-faceted approach. It involves the preparation of a mixture of products from a combination of aromatic diamines and aromatic dianhydrides at relatively low calculated molecular weights (i.e. high stoichiometric offsets) and endcapping with latent reactive groups. The combination of these monomers results in a mixture of products, in the imide form, that exhibits a stable melt viscosity of less than approximately 60 poise below approximately 300° C.

33 Claims, 8 Drawing Sheets

Examples of chemical structures of the monomers used in this method to prepare high performance resins for RTM and/or RI.

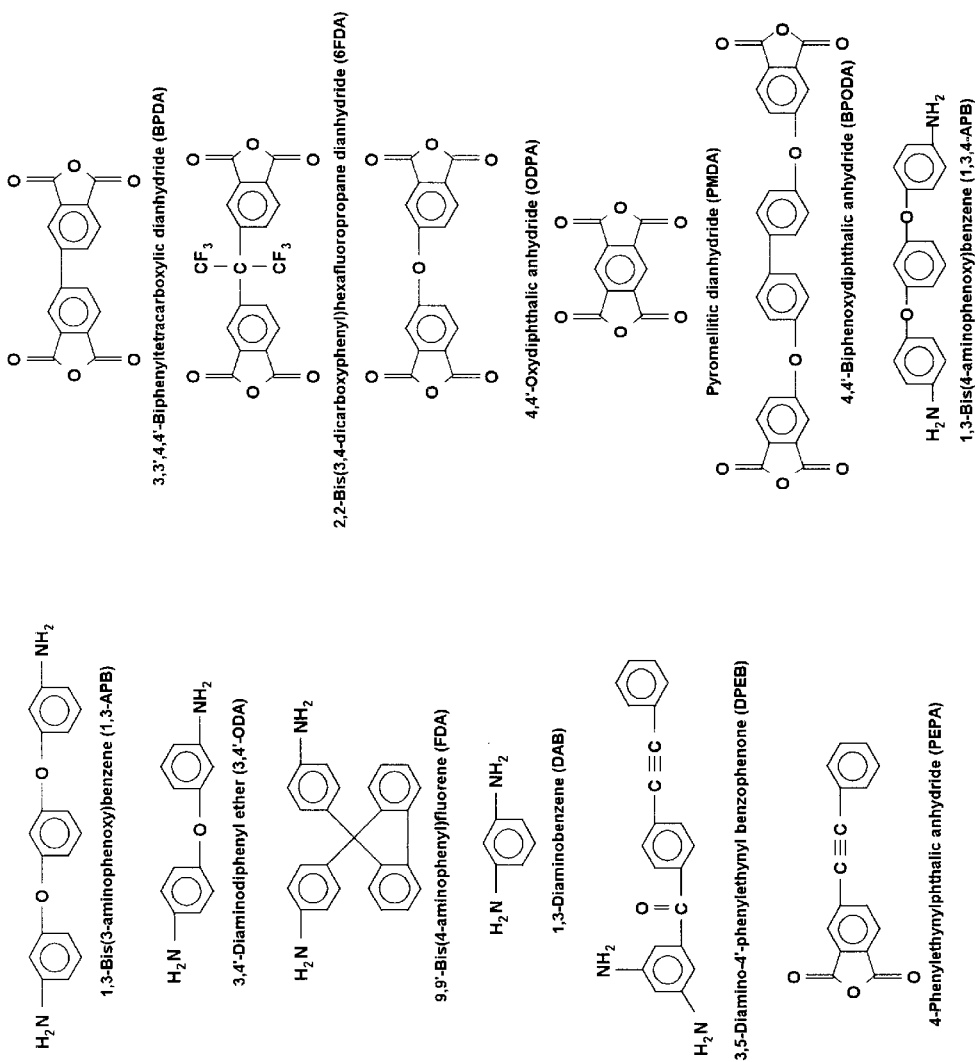
Figure 1. Examples of chemical structures of the monomers used in this method to prepare high performance resins for RTM and/or RI.

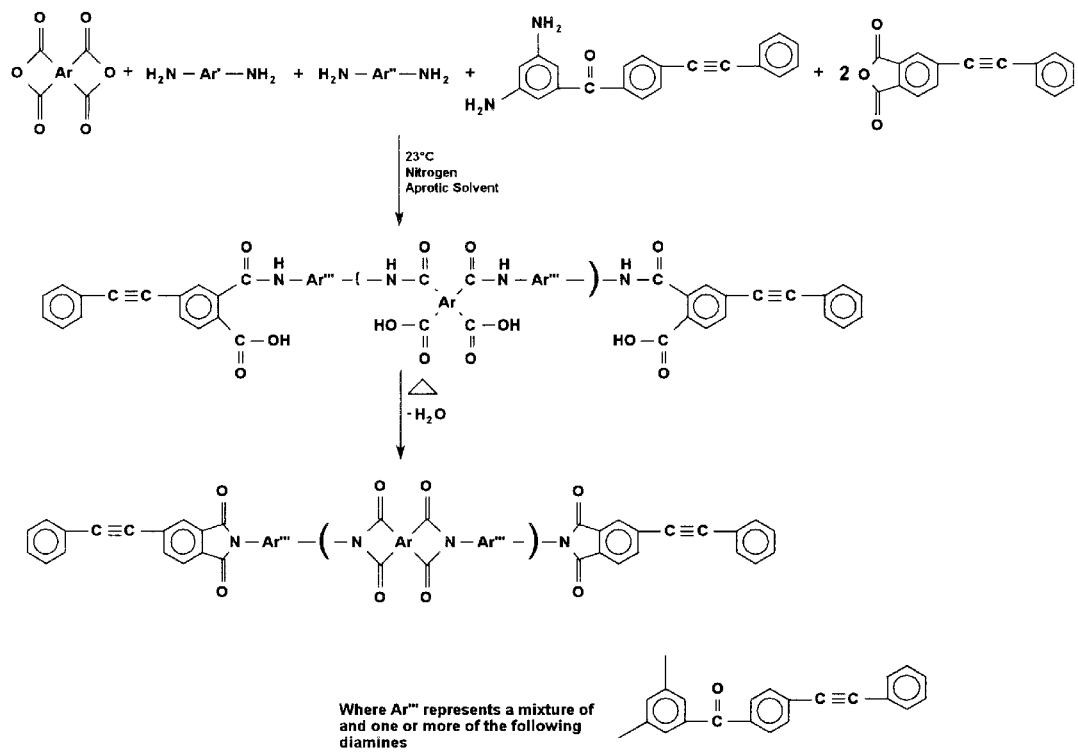

Wherein Ar can be:

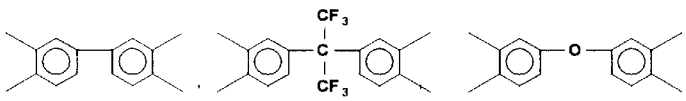

Wherein Ar' and Ar'' are a mixture of:

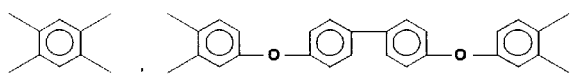

Wherein the stoichiometric offset ranges from 0.25 to 0.64 moles of dianhydride for every 1.0 mole of diamines.

Figure 2. Preparation of amide acid and imide random co-oligomers containing terminal phenylethynyl groups. Idealized structures given above for amide acid and imide chemical structures. The product actually consists of a complex mixture of different molecular phenylethynyl terminated and pendent random co-oligomers and simple phenylethynyl containing compounds that is not possible to accurately represent.

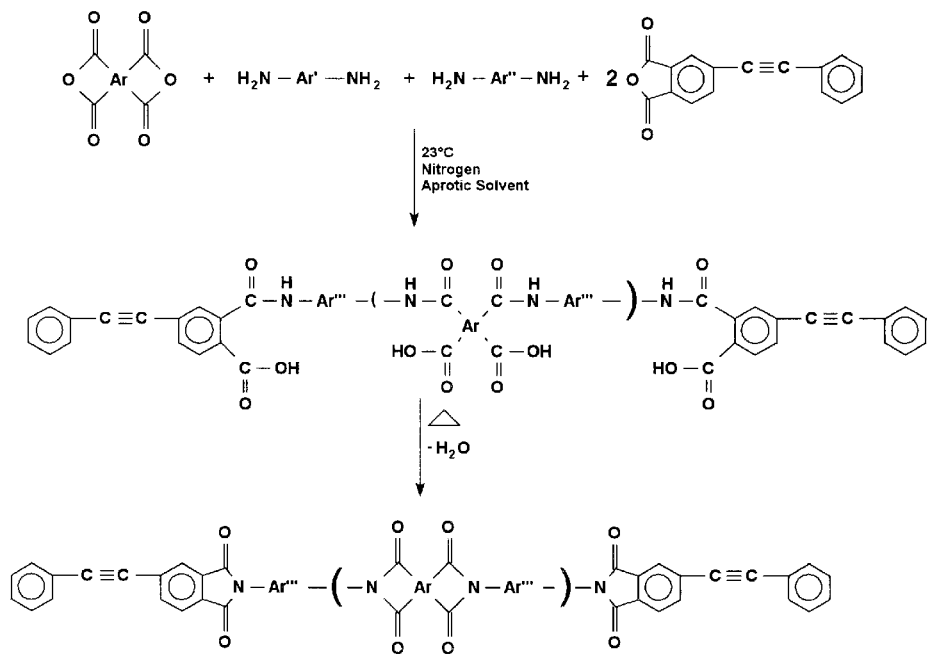

Where Ar''' represents a mixture of Ar' and Ar''

Wherein Ar can be:

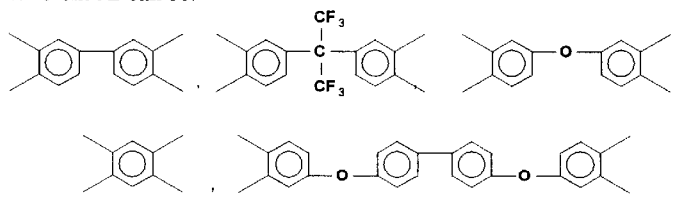

Wherein Ar' and Ar'' are a mixture of:

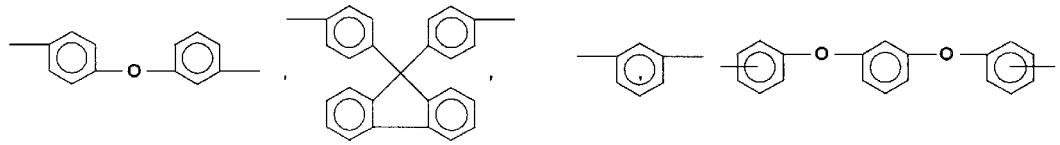

Wherein the stoichiometric offset ranges from 0.25 to 0.64 moles of dianhydride for every 1.0 mole of diamines.

Figure 3. Preparation of amide acid and imide random co-oligomers containing pendent and terminal phenylethynyl groups. Idealized structures given above for amide acid and imide chemical structures. The product actually consists of a complex mixture of different molecular phenylethynyl terminated and pendent random co-oligomers and simple phenylethynyl containing compounds that is not possible to accurately represent.

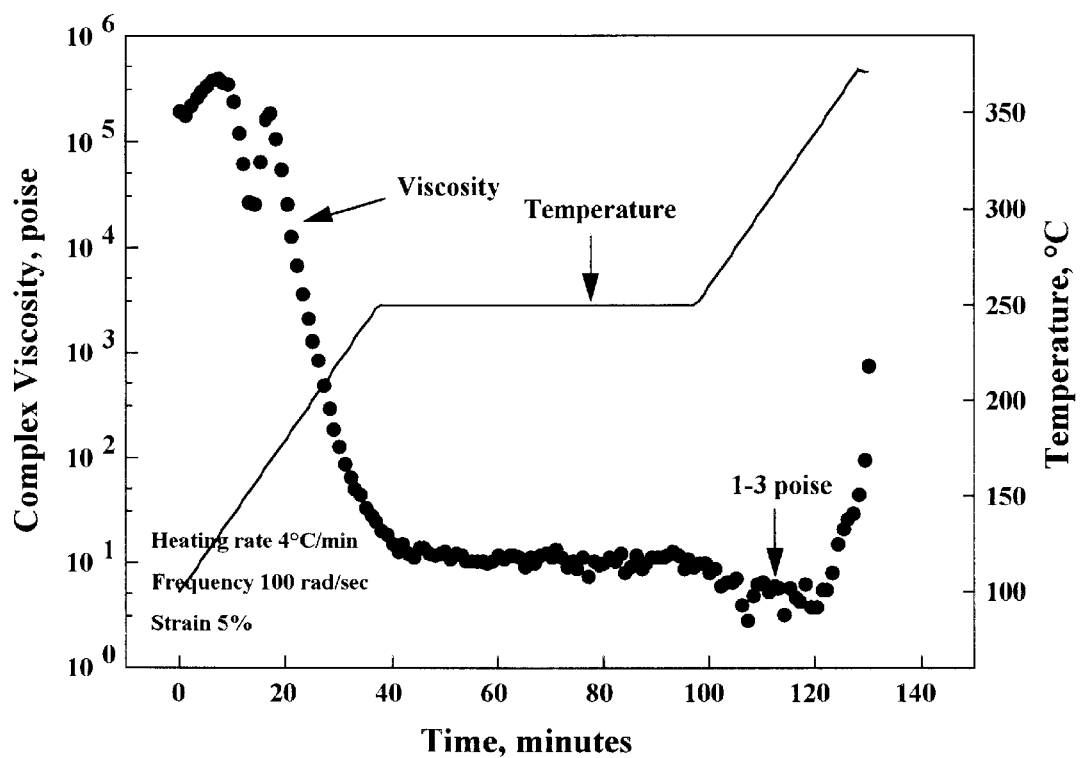
Figure 4. Dynamic melt viscosity curve of oligomer described in Example 1.

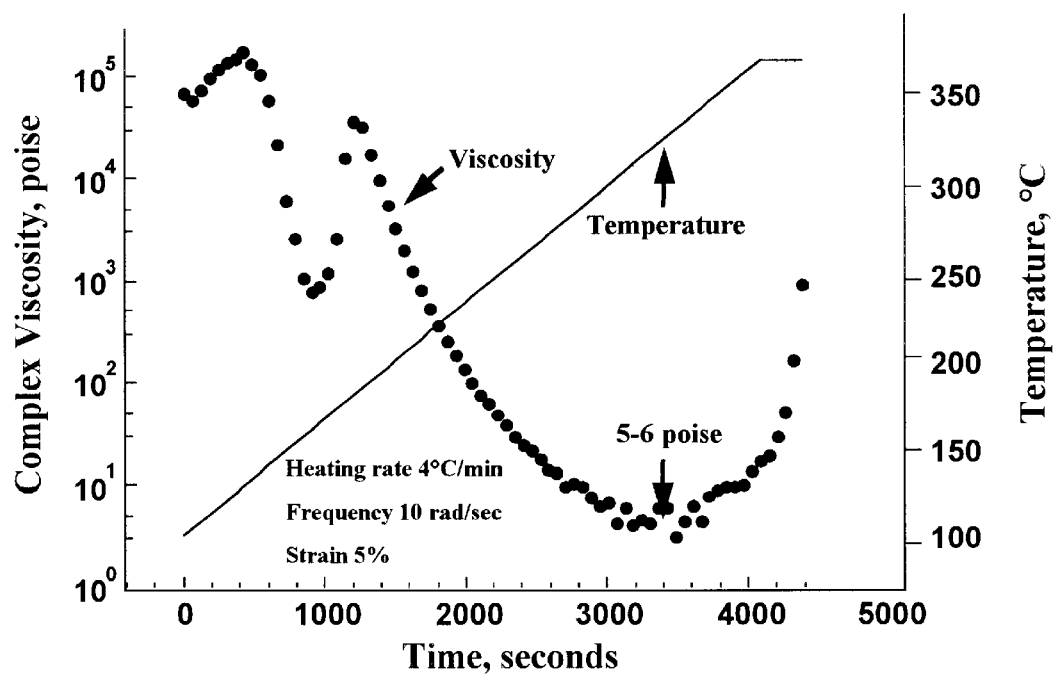
Figure 5. Dynamic melt viscosity curve of oligomer described in Example 3.

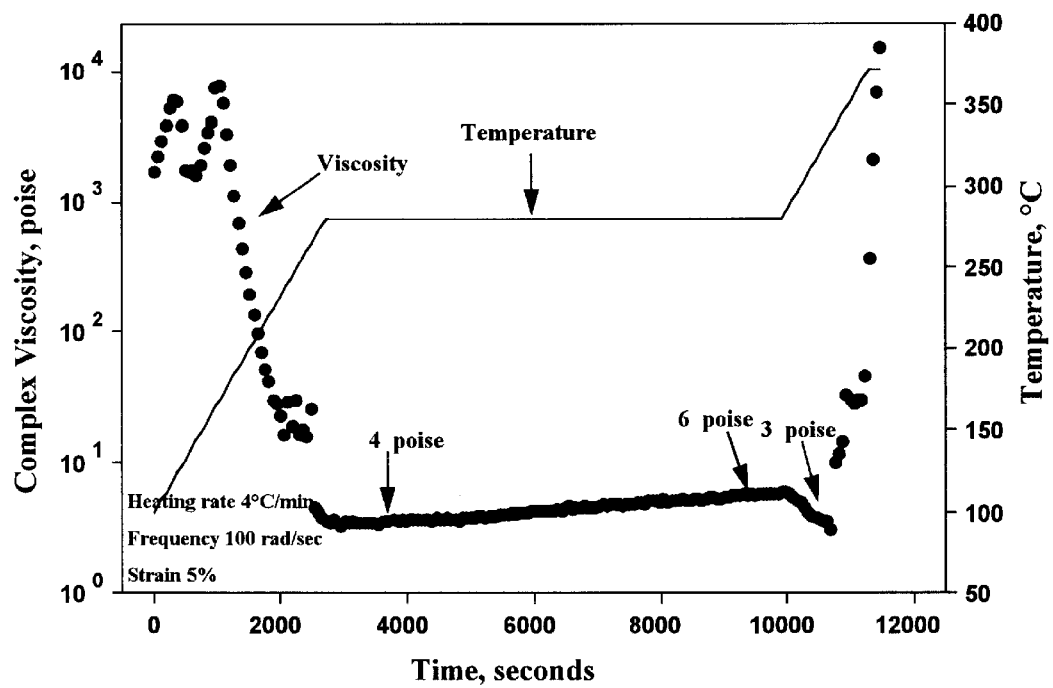
Figure 6. Isothermal melt viscosity at 280°C of co-oligomer described in Example 1.

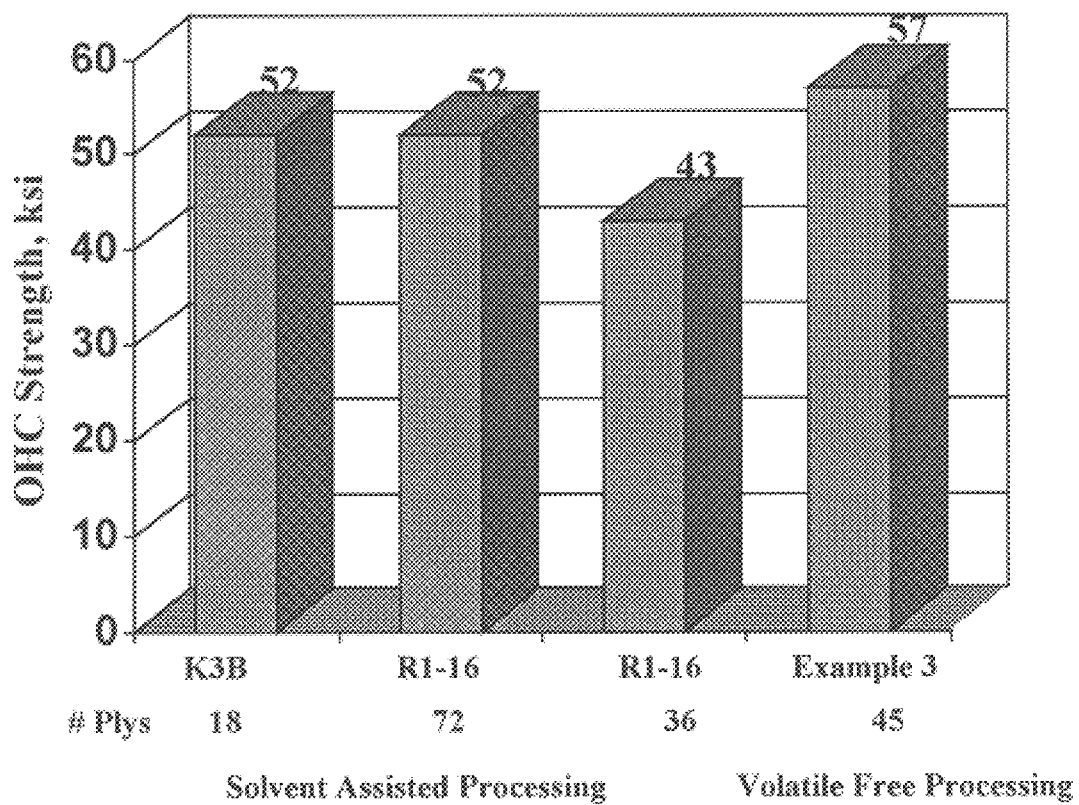
Figure 7. Room temperature OHC strength of composite laminates.

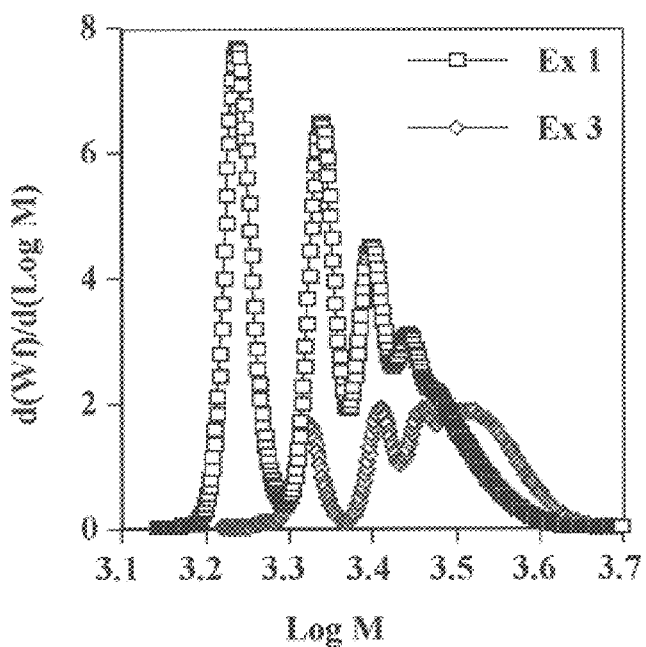
Figure 8. Representative gel permeation chromatogram of Eamples 1 and 3 showing multi-modal molecular weight distribution typically attained via this method.

COMPOSITION OF AND METHOD FOR MAKING HIGH PERFORMANCE RESINS FOR INFUSION AND TRANSFER MOLDING PROCESSES

ORIGIN OF INVENTION

This invention described herein was made by employees of the United States Government and may be manufactured and used by or for the Government for government purposes without payment of any royalties thereon or therefor.

BACKGROUND OF INVENTION

Resin transfer molding (RTM) and resin infusion (RI) are ideally solvent-free processes for making composite parts which can have significant cost advantages over traditional autoclave methods of composite fabrication since an autoclave is not required and there are no volatiles to manage. RTM and RI enable fabrication of highly complex shapes that would otherwise be extremely difficult to fabricate using hand lay-up autoclave techniques. Typically, these processes involve the placement of a woven preform or mat (i.e. glass, carbon, polymer, etc.) in the mold cavity. The molten resin is subsequently injected or infused at an elevated temperature into the mold whereby it permeates through the woven preform. This step is usually performed under vacuum in a sealed mold so there is little opportunity for volatile components to escape. After sufficient time to allow complete wet-out of the preform, the mold is subsequently heated to a higher temperature whereby the resin reacts to crosslink the material. During this step, external pressure is often applied to the mold by means of hydrostatic pressure. It is important that there are no volatiles present either in the form of residual solvent or chemical components of the resin system as they will cause void formation in the composite part. This is a difficult feature to achieve in a resin system for RTM and/or RI processes. Commercial resins such as vinyl esters, epoxies and bismaleimides are available that are processable by RI and/or RTM and provide good mechanical performance; however, these materials are limited in their use temperatures relative to the aromatic imide based materials described herein.

Phenylethynyl containing amines have been used to terminate imide oligomers [F. W. Harris, A. Pamidimuhkala, R. Gupta, S. Das, T. Wu, and G. Mock, *Poly. Prep.*, 24 (2), 325, 1983; F. W. Harris, A. Pamidimuhkala, R. Gupta, S. Das, T. Wu, and G. Mock, *J. Macromol. Sci.-Chem.*, A21 (8 & 9), 1117 (1984); C. W. Paul, R. A. Schultz, and S. P. Fenelli, "High-Temperature Curing Endcaps For Polyimide Oligomers" in Advances in Polyimide Science and Technology, (Ed. C. Feger, M. M. Khoyasteh, and M. S. Htoo), Technomic Publishing Co., Inc., Lancaster, Pa., 1993, p. 220; U.S. Pat. No. 5,138,028 (Aug. 11, 1992) to National Starch and Chemical Co.; R. G. Byrant, B. J. Jensen, and P. M. Hergenrother, *Poly. Prepr.*, 34 (1), 566, 1993; U.S. Pat. No. 5,412,066 (1995) to National Aeronautics and Space Administration]. Imide oligomers terminated with ethynyl phthalic anhydride [P.M. Hergenrother, *Poly. Prep.*, 21 (1), 81, 1980], substituted ethynyl phthalic acid derivatives [S. Hino, S. Sato, K. Kora, and O. Suzuki, Jpn. Kokai Tokyo Koho JP 63, 196, 564. Aug. 15, 1988; *Chem. Abstr.*, 115573w, 110, (1989)], and phenylethynyl containing phthalic anhydrides [P. M. Hergenrother and J. G. Smith, Jr., *Polymer*, 35(22)4857 (1994); U.S. Pat. No. 5,567,800 (1996) to National Aeronautics and Space Administration, J. E. McGrath and G. W. Meyer, U.S. Pat. No. 5,493,002 (1996) to Virginia Tech Intellectual Properties, Inc., J. A. Johnson, F. M. Li, F. W. Harris and T. Takekoshi, *Polymer*, 35(22)4865 (1994), T. Takekoshi and J. M. Terry, *Polymer*, 35(22)4874 (1994), R. J. Cano and B. J. Jensen, J. Adhesion, 60, 113 (1997)] have been reported. Imide oligomers containing pendent substituted ethynyl groups [F. W. Harris, S. M. Padaki, and S. Varaprath, *Poly, Prepr.*, 21 (1), 3, 1980 (abstract only), B. J. Jensen, P. M. Hergenrother, and G. Nwokogu, *Polymer*, 34 (3), 630, 1993; B. J. Jensen and P. M. Hergenrother, U.S. Pat. No. 5,344,982 (Sep. 6, 1994); J. W. Connell, J. G. Smith, Jr. R. J. Cano and P. M. Hergenrother, *Sci. Adv. Mat. Proc. Eng. Ser.*, 41, 1102 (1996); U.S. Pat. No. 5,606,014 (Feb. 25, 1997) to National Aeronautics and Space Administration] and pendent and terminal phenylethynyl groups, [J. G. Smith, Jr., J. W. Connell and P. M. Hergenrother, *Polymer*, 38(18), 4657 (1997)] have been reported.

A high temperature resin system designated as phthalonitrile has been developed that exhibits low melt viscosity. This material however suffers from poor melt stability and lacks suitable toughness after thermal cure. Simple laminates have been fabricated by RTM, however mechanical properties were low and the resin exhibited microcracking upon thermal cycling (D. E. Duch, *Sci. Adv. Mat. Proc. Eng. Ser.*, 44, 705 (1999).)

The present invention constitutes a new composition of and method for preparing a mixture of imide random co-oligomers and imide compounds that exhibit a unique combination of properties that make them particularly useful in the fabrication of composite parts via RTM and/or RI processes. These materials can be readily synthesized and isolated in a solvent-free and moisture-free form, exhibit the proper flow, melt stability and lack of volatile formation to allow for processing using RTM and/or RI techniques. Upon thermal curing, these materials exhibit sufficient thermal stability, toughness and mechanical properties so as to be useful as composite matrix resins in high performance applications. They are also useful as adhesives, coatings, films, foams and moldings (both filled and unfilled).

SUMMARY OF INVENTION

According to the present invention, a composition of and method for making high performance resins that are processable by resin transfer molding (RTM) and resin infusion (RI) techniques were developed. Materials with a combination of properties, making them particularly useful for the fabrication of composite parts via RTM and/or RI processes, were prepared, characterized and fabricated into moldings and carbon fiber reinforced composites. These materials are particularly useful for the fabrication of structural composite components for aerospace applications. This method produces aromatic imide based resins that are processable into complex composite parts using RTM and/or RI.

The method for making high performance imide resins for RTM and/or RI processes is a multi-faceted approach. It involves preparation of a mixture of products from a combination of aromatic diamines with aromatic dianhydrides at relatively high stoichiometric offsets and endcapping with latent reactive groups. The combination of aromatic diamines includes at least over approximately 50 molar percent of a flexible diamine. It also may include less than approximately 50 molar percent of a rigid diamine. Alternatively, or in conjunction with the rigid diamine, a diamine containing pendent phenylethynyl groups comprising less than approximately 20 molar percent of the total diamine combination can also be utilized. This combination of monomers provides a balance of properties that impart flexibility (melt flow) with those that impart rigidity for sufficiently high glass transition temperature ($T_g$) and results in a mixture of products, in the imide form, that exhibit a stable melt viscosity of less than approximately 60 poise below approximately 300° C. The use of a high stoichiometric offset produces a mixture of products consisting of different molecular weight imide oligomers and simple imide compounds. This mixture of products can be detected through gel permeation chromatographic (GPC) analyses that indicate multi-modal molecular weight distributions. Additional experimental observations also indicate that there are components in the mixture of products that significantly contribute to the low melt viscosities exhibited by the materials described herein.

The selection of the monomers used to prepare the imide oligomers desires a balance of monomers that impart flexibility (i.e. melt flow) with those that impart rigidity (high cured Tg). The resultant mixture of products from their reaction should exhibit a stable melt viscosity of less than approximately 60 poise below approximately 300° C. In addition, the mixture of products formed does not contain components that are volatile under the processing conditions. A flexible diamine is described herein as an aromatic diamine that imparts a low melt viscosity to the uncured resin and without its use the uncured resins would have melt viscosities too high for use in resin transfer molding. A flexible diamine may contain three or more phenyl rings whereby the phenyl rings are connected by divalent radicals such as oxygen, sulfur, 2,2'-isopropylidene and 2,2'-hexafluoroisopropylidene and wherein at least one of the divalent radicals is located in the ortho or meta position on a phenyl ring. Some flexible diamines include, but are not limited to, 1,3-bis(3-aminophenoxy)benzene, 1,3-bis(4-minophenoxy)benzene and 1,3-bis(3-aminothiophenoxy) benzene. A rigid diamine is described herein as an aromatic diamine that may contain one or more phenyl rings and that when used, in combination with a flexible aromatic diamine, in the preparation of resin transfer molding materials described in the present invention, provides cured resins with high Tgs (more than approximately 230° C.). When the rigid diamine contains a single phenyl group, the amino groups can be located in any substitution pattern (1,2-, 1,3- or 1,4-) on the phenyl ring. When the aromatic diamine contains two phenyl rings and the phenyl rings are connected by a covalent bond or any divalent radical, the amino groups can be located in any substitution pattern on the phenyl rings. When the aromatic diamine contains more than two phenyl rings and the phenyl rings are connected by a covalent bond or a divalent radical, the amino groups can be located in any substitution pattern different from that of the flexible aromatic diamines described above. Other aromatic rings such as naphthalene, 1,3,4-oxadiazole or quinoxaline can be substituted for the inner phenyl ring. The materials described herein preferably contain more diamine than dianhydride, therefore, the diamine components are the biggest contributing factor to melt flow behavior. High stoichiometric offsets can be defined as an offset resulting in low molecular weight (approximately 1500 theoretical molecular weight). The latent reactive endgroup may be 4-phenyethynylphthalic anhydride. Alternatively, monoamines containing phenylethynyl groups such as, 3-phenylethynylaniline or 4-amino-4'-phenylethynylbenzophenone could be used as endcapping agents.

An extension of the invention described herein would be to employ alternate synthetic routes commonly used to produce amide acids and imides to prepare the materials described herein. Another extension would be to prepare amide acid and imide oligomers and random co-oligomers of comparable molecular weight containing only pendent phenylethynyl groups. Alternative synthethic routes to prepare amide acids and imides containing phenylethynyl groups have been performed. For example, the reaction of dianhydride(s) and diamine(s) and 4-phenylethynylphthalic anhydride in m-cresol containing isoquinoline at elevated temperature gives the imide directly. Phenylethynyl containing amide acid oligomers and random co-oligomers can also be prepared by the reaction of diamine(s) with an excess of dianhydride(s) and endcapped with a monofunctional amine containing phenylethynyl groups under a nitrogen atmosphere at room temperature in N-methyl-2-pyrrolidinone (NMP). Phenylethynyl terminated imide oligomers and random co-oligomers can be prepared by the reaction of the half alkyl ester of aromatic tetracarboxylic acids with aromatic diamines and endcapped with the half alkyl ester of a phenylethynyl substituted phthalic acid or a phenylethynyl amine by heating in NMP. Phenylethynyl containing imide oligomers and random co-oligomers prepared by the alkyl ester route can also be prepared by heating neat or in solvents such as m-cresol. Phenylethynyl terminated imide oligomers and random co-oligomers can be prepared by the polymerization of monomeric reactants approach by heating a mixture of a diamine(s), the half alkyl ester of a dianhydride(s) and endcapped with the half alkyl ester derivative of 4-phenylethynylphthalic anhydride.

The method described herein produces materials that are useful as adhesives, coatings, films, foams, moldings, powders and composite matrices. In powder form, the imides are useful for making adhesive tape and carbon/graphite fiber prepreg (dry tow) that is subsequently converted into dry prepreg (tape or ribbon) and used in an automated tape placement process without the use of solvents. The powders and/or pellets are particularly useful in making composite parts by RTM and/or RI processes. To demonstrate this technology, high quality, complex composites parts such as F-frames, skin stringer panels, I-beams, sine wave spars and window frames have been fabricated by RTM and RI using the materials described herein.

BRIEF DESCRIPTION OF THE DRAWINGS

FIG. 1 is a schematic of chemical structures of the monomers used in this method to prepare high performance resins for RTM and/or RI;

FIG. 2 is a schematic of the preparation of amide acid and imide random co-oligomers containing terminal phenylethynyl groups;

FIG. 3 is a schematic of the preparation of amide acid and imide random co-oligomers containing pendent and terminal phenylethynyl groups;

FIG. 4 is a graph of dynamic melt viscosity curve of oligomer described in Example 1;

FIG. 5 is a graph of dynamic melt viscosity curve of oligomer described in Example 3;

FIG. 6 is a graph of isothermal melt viscosity at 280° C. of co-oligomer described in Example 1;

FIG. 7 is a graph of room temperature OHC strength of composite laminates; and FIG. 8 is a graphic representation of gel permeation chromatogram of Examples 1 and 3 showing multi-modal molecular weight distribution typically attained via this method.

DESCRIPTION OF THE PREFERRED EMBODIMENTS

A composition and method were devised for making high performance resins that are processable by resin transfer molding (RTM) and/or resin infusion (RI) techniques. Materials with a combination of properties, making them particularly useful for the fabrication of composite parts via RTM and/or RI processes, were prepared, characterized and fabricated into moldings and carbon fiber reinforced composites and their mechanical properties were determined. The method for making high performance resins for RTM and/or RI processes is a multi-faceted approach using a high stoichiometric offset of a mixture of diamines with a dianhydride or mixture of dianhydrides. This approach produces a mixture of products consisting of different molecular weight imide oligomers and simple imide compounds.

One aspect of this method involves the proper selection of the monomers used to prepare the imide oligomers. It requires a balance of monomers that impart flexibility with those that impart rigidity. The resultant mixture of products from their reaction should be amorphous or exhibit melting at temperatures less than approximately 300° C. In addition, the mixture of products formed must not contain components that are volatile under the processing conditions (cure temperatures of approximately 350–371° C. and pressures ranging from of approximately 50–200 psi). Since the materials described herein are preferably prepared using more diamine than dianhydride, the products from the diamine components were the biggest contributing factor to melt flow behavior. The chemical structures of some of the aromatic diamines and dianhydrides used in this method are presented in FIG. 1. The best results were obtained when the relative amount of flexible diamine exceeded approximately 50 mole percent of the diamine component. Below this level, the resulting complex mixture of products exhibited melt viscosities in excess of approximately 60 poise at approximately 290° C.

There are many known aromatic diamines that impart flexibility and rigidity into oligomer or polymer molecules. Particularly good success was obtained with using 1,3 bis(3-aminophenoxy)benzene as the flexible component. Another diamine that gave good results as a flexible component was 1,3-bis(4-minophenoxy)benzene (1,3,4-APB). This diamine offered particularly good attributes in that it resulted in a cured oligomer with a much higher cured Tg without sacrificing melt viscosity. This material (example 81) prepared at the same stoichiometric offset as example 1 gave an oligomer that exhibited a cured Tg of approximately 301° C. and a melt viscosity of <10 poise at approximately 280° C. Other diamines that would be expected to behave similarly in providing flexibility and consequently advantageous

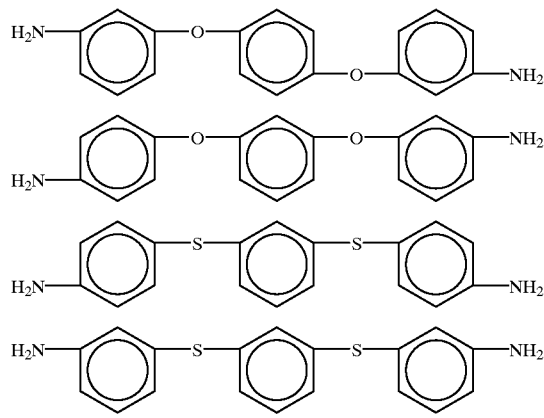

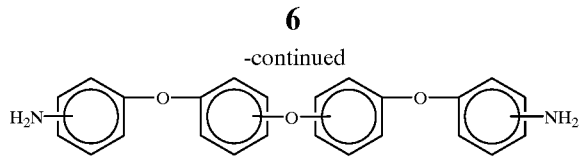

Diamines that provided good results with regard to providing rigidity and consequently high cured Tgs (>approximately 230° C.) without compromising the melt viscosity or melting temperature included 3,4'-diaminodiphenyl ether (3,4'-ODA), 9,9'-bis(4-aminophenyl)fluorene (FDA) and 1,3-diaminobenzene (DAB). Typically these diamines were used in molar concentration of less than approximately 50 mole percent of the diamine component. Other aromatic diamines that contain meta catenation, bulky and compliant linking groups would work in an analogous manner.

A complimentary approach for maintaining low melt viscosity, but yielding a cured resin with a high Tg and suitable toughness, involved the use of a diamine containing phenylethynyl groups in lieu of, or in conjunction with, the rigid diamine. The best results were obtained using 3,5-diamino-4'-phenylethynyl benzophenone (DPEB) although a number of such diamines would provide similar results. The best results were achieved when DPEB was used at approximately a 10–20 mole percent concentration of the total diamine component.

A unique dianhydride, 2,3,3',4'-biphenyltetracarboxylic dianhydride (a-BPDA), would be expected to provide a higher cured Tg without sacrificing melt viscosity. The chemical structure of this dianhydride is provided below.

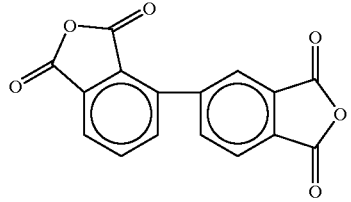

A complex mixture consisting of imide random co-oligomers and imide compounds were prepared from the corresponding complex mixture of amide acid random co-oligomers and compounds by cyclodehydration either thermally or chemically (FIG. 2). In many cases, a diamine containing pendent phenylethynyl groups, such as 3,5-diamino-4'-phenylethynyl-benzophenone, was used in combination with one or more aromatic diamines to prepare a complex mixture of products consisting of phenylethynyl containing amide acid oligomers and compounds and imide random co-oligomers and compounds with both pendent and terminal phenylethynyl groups (FIG. 3). The polymerizations were carried out in polar aprotic solvents such as N-methyl-2-pyrrolidinone (NMP) and N,N-dimethylacetamide under nitrogen at room temperature. In nearly all cases, the complex mixture of imide random co-oligomers and imide compounds were soluble in NMP, implying that the materials were predominately amorphous.

The molecular weights were calculated by offsetting the stoichiometry according to the Carothers equation [Degree of polymerization (Dp)=(target number average molecular weight)/(0.5) (molecular weight of repeat unit)] wherein Dp=(1+r)/(1−r), wherein r=monomer ratio. The molecular weight of the endcapping agent is not included in the calculations for target molecular weight. The stoichiometric quantities of the monomers used are presented in Table 1. In the present invention, r (monomer ratio) is equal to the relative amount of dianhydride used as compared to 1 mole of diamines. The amount of endcapping agent (for example, 4-phenylethynylphthalic anhydride) was calculated using the following equation, 2(1−r). The calculated molecular weights did not agree with those determined by GPC because of the complex mixture of products formed and GPC lacks the fidelity to detect the imide components that are present in this complex mixture. GPC does show the multimodal distributions that are consistently formed using this method.

TABLE 1

Stoichiometric Quantities of Monomers Used

| Stoichiometric Ratio (Example #) | | Dianhydride (mole %) | Diamine-1 (mole %) | Diamine-2 (mole %) | Diamine-3 (mole %) | Endcap (mole %) |
|---|---|---|---|---|---|---|
| 0.48 | (1) | BPDA (48) | ODA (25) | 1,3-APB (75) | 0 | PEPA (104) |
| 0.58 | (2) | BPDA (58) | ODA (25) | 1,3-APB (75) | 0 | PEPA (84) |
| 0.65 | (3) | BPDA (65) | ODA (25) | 1,3-APB (75) | 0 | PEPA (70) |
| 0.64 | (4) | BPDA (64) | ODA (20) | 1,3-APB (75) | DPEB (5) | PEPA (68) |
| 0.48 | (5) | BPDA (48) | ODA (20) | 1,3-APB (80) | 0 | PEPA (104) |
| 0.48 | (6) | BPDA (48) | ODA (15) | 1,3-APB (85) | 0 | PEPA (104) |
| 0.46 | (7) | BPDA (46) | 0 | 1,3-APB (100) | 0 | PEPA (107) |
| 0.47 | (8) | BPDA (47) | ODA (10) | 1,3-APB (80) | DPEB (10) | PEPA (106) |
| 0.47 | (9) | BPDA (47) | ODA (15) | 1,3-APB (70) | DPEB (15) | PEPA (106) |
| 0.46 | (10) | BPDA (46) | 0 | 1,3-APB (85) | DPEB (15) | PEPA (108) |
| 0.29 | (11) | BPDA (29) | 0 | 1,3-APB (85) | DPEB (15) | PEPA (142) |
| 0.47 | (12) | BPDA (47) | ODA (10) | 1,3-APB (90) | 0 | PEPA (106) |
| 0.44 | (13) | ODPA (44) | ODA (10) | 1,3-APB (90) | 0 | PEPA (112) |
| 0.46 | (14) | ODPA (46) | ODA (10) | 1,3-APB (90) | 0 | PEPA (108) |
| 0.44 | (15) | ODPA (44) | ODA (25) | 1,3-APB (75) | 0 | PEPA (111) |
| 0.46 | (16) | ODPA (46) | ODA (25) | 1,3-APB (75) | 0 | PEPA (108) |
| 0.44 | (17) | ODPA (44) | ODA (50) | 1,3-APB (50) | 0 | PEPA (111) |
| 0.46 | (18) | ODPA (46) | ODA (50) | 1,3-APB (50) | 0 | PEPA (108) |
| 0.55 | (19) | ODPA (55) | FDA (25) | 1,3-APB (75) | 0 | PEPA (90) |
| 0.27 | (20) | ODPA (27) | 0 | 1,3-APB (85) | DPEB (15) | PEPA (145) |
| 0.45 | (21) | ODPA (45) | 0 | 1,3-APB (85) | DPEB (15) | PEPA (115) |
| 0.56 | (22) | ODPA (56) | 0 | 1,3-APB (85) | DPEB (15) | PEPA (89) |
| 0.63 | (23) | ODPA (63) | 0 | 1,3-APB (85) | DPEB (15) | PEPA (74) |
| 0.27 | (24) | ODPA (27) | ODA (15) | 1,3-APB (70) | DPEB (15) | PEPA (145) |
| 0.46 | (25) | ODPA (46) | ODA (15) | 1,3-APB (70) | DPEB (15) | PEPA (108) |
| 0.56 | (26) | ODPA (56) | ODA (15) | 1,3-APB (70) | DPEB (15) | PEPA (87) |
| 0.64 | (27) | ODPA (64) | ODA (15) | 1,3-APB (70) | DPEB (15) | PEPA (73) |
| 0.25 | (28) | ODPA (25) | ODA (30) | 1,3-APB (55) | DPEB (15) | PEPA (150) |
| 0.42 | (29) | ODPA (42) | ODA (30) | 1,3-APB (55) | DPEB (15) | PEPA (115) |
| 0.54 | (30) | ODPA (54) | ODA (30) | 1,3-APB (55) | DPEB (15) | PEPA (92) |
| 0.61 | (31) | ODPA (61) | ODA (30) | 1,3-APB (55) | DPEB (15) | PEPA (78) |
| 0.31 | (32) | BPDA (31) | ODA (25) | 1,3-APB (75) | 0 | PEPA (138) |
| 0.18 | (33) | 6FDA (18) | ODA (10) | 1,3-APB (90) | 0 | PEPA (163) |
| 0.37 | (34) | 6FDA (37) | ODA (10) | 1,3-APB (90) | 0 | PEPA (126) |
| 0.19 | (35) | 6FDA (19) | ODA (25) | 1,3-APB (75) | 0 | PEPA (162) |
| 0.38 | (36) | 6FDA (38) | ODA (25) | 1,3-APB (75) | 0 | PEPA (124) |
| 0.21 | (37) | 6FDA (21) | ODA (50) | 1,3-APB (50) | 0 | PEPA (158) |
| 0.39 | (38) | 6FDA (39) | ODA (50) | 1,3-APB (50) | 0 | PEPA (121) |
| 0.54 | (39) | PMDA (54) | ODA (25) | 1,3-APB (75) | 0 | PEPA (92) |
| 0.53 | (40) | 6FDA (53) | PDA (50) | 1,3-APB (50) | 0 | PEPA (93) |
| 0.61 | (41) | 6FDA (61) | PDA (50) | 1,3-APB (50) | 0 | PEPA (78) |
| 0.55 | (42) | 6FDA (55) | FDA (25) | 1,3-APB (75) | 0 | PEPA (89) |
| 0.56 | (43) | BPDA (56) | FDA (25) | 1,3-APB (75) | 0 | PEPA (88) |
| 0.17 | (44) | 6FDA (17) | 0 | 1,3-APB (75) | DPEB (15) | PEPA (165) |
| 0.36 | (45) | 6FDA (36) | 0 | 1,3-APB (75) | DPEB (15) | PEPA (128) |
| 0.19 | (46) | 6FDA (19) | ODA (30) | 1,3-APB (55) | DPEB (15) | PEPA (162) |
| 0.38 | (47) | 6FDA (37) | ODA (30) | 1,3-APB (55) | DPEB (15) | PEPA (125) |
| 0.30 | (48) | BPDA (30) | ODA (15) | 1,3-APB (70) | DPEB (15) | PEPA (140) |
| 0.31 | (49) | BPDA (31) | ODA (25) | 1,3-APB (60) | DPEB (15) | PEPA (139) |
| 0.31 | (50) | BPDA (31) | ODA (35) | 1,3-APB (50) | DPEB (15) | PEPA (137) |
| 0.32 | (51) | BPDA (32) | ODA (45) | 1,3-APB (40) | DPEB (15) | PEPA (135) |
| 0.33 | (52) | BPDA (33) | ODA (55) | 1,3-APB (30) | DPEB (15) | PEPA (134) |
| 0.56 | (53) | BPDA (56) | FDA (15X | 1,3-APB (65) | DPEB (20) | PEPA (88) |
| 0.56 | (54) | BPDA (56) | FDA (10) | 1,3-APB (70) | DPEB (20) | PEPA (87) |
| 0.55 | (55) | BPDA (55) | FDA (33) | 1,3-APB (52) | DPEB (15) | PEPA (89) |
| 0.62 | (56) | BPDA (62) | 0 | 1,3-APB (50) | DPEB (50) | PEPA (38) PA (38) |
| 0.57 | (57) | BPODA (57) | PDA (25) | 1,3-APB (75) | 0 | PEPA (86) |
| 0.65 | (58) | BPDA (65) | ODA (25) | 1,3-APB (60) | DPEB (15) | PEPA (70) |
| 0.50 | (59) | BPDA (50) | DAB (25) | 1,3-APB (75) | 0 | PEPA (100) |
| 0.66 | (60) | BPDA (66) | DAB (25) | 1,3-APB (75) | 0 | PEPA (67) |
| 0.72 | (61) | BPDA (72) | DAB (25) | 1,3-APB (75) | 0 | PEPA (58) |
| 0.52 | (62) | BPDA (52) | DAB (40) | 1,3-APB (60) | 0 | PEPA (96) |
| 0.68 | (63) | BPDA (68) | DAB (40) | 1,3-APB (60) | 0 | PEPA (64) |

TABLE 1-continued

Stoichiometric Quantities of Monomers Used

| Stoichiometric Ratio (Example #) | Dianhydride (mole %) | Diamine-1 (mole %) | Diamine-2 (mole %) | Diamine-3 (mole %) | Endcap (mole %) |
|---|---|---|---|---|---|
| 0.33 (64) | BPDA (33) | DAB (25) | 1,3-APB (60) | DPEB (15) | PEPA (134) |
| 0.49 (65) | BPDA (49) | DAB (25) | 1,3-APB (60) | DPEB (15) | PEPA (102) |
| 0.66 (66) | BPDA (66) | DAB (25) | 1,3-APB (60) | DPEB (15) | PEPA (68) |
| 0.34 (67) | BPDA (34) | DAB (35) | 1,3-APB (50) | DPEB (15) | PEPA (132) |
| 0.36 (68) | BPDA (36) | DAB (45) | 1,3-APB (40) | DPEB (15) | PEPA (128) |
| 0.18 (69) | 6-FDA (18) | ODA (15) | 1,3-APB (70) | DPEB (15) | PEPA (164) |
| 0.57 (70) | BPDA (57) | 0 | 1,3-APB (85) | DPEB (15) | PEPA (86) |
| 0.64 (71) | BPDA (64) | 0 | 1,3-APB (85) | DPEB (15) | PEPA (72) |
| 0.56 (72) | 6-FDA (56) | FDA (25) | 1,3-APB (75) | 0 | PEPA (89) |
| 0.63 (73) | BPDA (63) | FDA (25) | 1,3-APB (75) | 0 | PEPA (74) |
| 0.47 (74) | BPDA (47) | ODA (15) | 1,3-APB (65) | DPEB (20) | PEPA (106) |
| 0.58 (75) | BPDA (58) | ODA (25) | 1,3-APB (65) | DPEB (10) | PEPA (84) |
| 0.65 (76) | BPDA (65) | MDA (25) | 1,3-APB (75) | 0 | PEPA (70) |
| 0.58 (77) | BPDA (58) | ODA (25) | 1,3-APB (55) | DPEB (20) | PEPA (84) |
| 0.58 (78) | BPDA (58) | ODA (30) | 1,3-APB (55) | DPEB (15) | PEPA (84) |
| 0.58 (79) | BPDA (58) | ODA (25) | 1,3-APB (65) | DPEB (10) | PEPA (84) |
| 0.48 (80) | BPDA (48) | 1,4,4-APB (37.5) | 1,3-APB (37.5) | ODA (25) | PEPA (104) |
| 0.48 (81) | BPDA (48) | 1,3,4 APB (37.5) | ODA (25) | 0 | PEPA (104) |

ODA = 3,4'-ODA

This method was successful in achieving the necessary combination of ties required for use in RTM and/or RI processes. This method produced materials that: 1). were solvent-free and moisture-free; 2). exhibited stable viscosities less than approximately 60 poise below approximately 300° C.; 3). exhibited good melt stability at the required temperatures (stable for several hours at approximately 250–290° C.); 4). contained no chemical components that could volatilize under the processing conditions; and 5). allowed for void-free fabrication of composite parts that exhibited an excellent combination of mechanical ties. These combination of characteristics make these materials particularly attractive for use in RTM and/or RI processes to make composite parts. Material characterization is presented in Table 2.

TABLE 2

Material Characterization

| Example # | Tg (Tm), ° C. Initial | Tg (Tm), ° C. Cured[1] | Melt Viscosity, Poise | Temp. of Melt Viscosity, ° C. |
|---|---|---|---|---|
| 1 | 132 | 258 | 1–3 | 280–290 |
| 2 | 140 | 245 | 3–5 | 275–290 |
| 3 | 145 | 244 | 5–12 | 280–290 |
| 4 | 148 | 251 | 20–25 | 280–290 |
| 5 | 129 | 257 | 3–10 | 265–280 |
| 6 | 127 | 253 | 2–3 | 280–290 |
| 7 | 120 | 232 | 2–4 | 280–290 |
| 8 | 125 | 269 | 3–6 | 280–290 |
| 9 | 125 | 293 | 1–3 | 275–290 |
| 10 | 120 | 279 | 4–5 | 275–290 |
| 11 | 105 | 294 | 1–2 | 250–280 |
| 12 | 121 | 245 | 2–4 | 280–290 |
| 13 | 95 | 235 | 0.5–1 | 250–280 |
| 14 | 95 | 229 | 0.75–1 | 250–280 |
| 15 | 90 | 237 | 1–2 | 250–280 |
| 16 | 99 | 235 | 1–2 | 250–280 |
| 17 | 113 | 258 | 4–5 | 250–280 |
| 18 | 113 | 245 | 4–5 | 250–280 |
| 19 | 140 | 235 | 5–7 | 250–280 |
| 20 | 110 | 276 | 5–10 | 250–280 |
| 21 | 110 | 256 | 4–10 | 250–280 |
| 22 | 115 | 242 | 1–2 | 250–280 |
| 23 | 117 | 235 | 4–5 | 250–280 |
| 24 | 104 | 283 | 1–4 | 250–280 |
| 25 | 107 | 268 | 3–5 | 250–280 |
| 26 | 113 | 253 | 2–4 | 250–280 |
| 27 | 150 | 241 | 8–18 | 250–280 |
| 28 | 130 | 308 | 1–2 | 250–280 |
| 29 | 130 | 291 | 2–4 | 250–280 |
| 30 | 135 | 263 | 4–8 | 250–280 |
| 31 | 135 | 260 | 6–10 | 250–280 |
| 32 | 88 | 269 | 1–3 | 250–280 |
| 33 | 97 | 270 | 1–4 | 250–280 |
| 34 | 114 | 247 | 1–3 | 250–280 |
| 35 | 100 | 238 | 1–3 | 250–280 |
| 36 | 117 | 259 | 2–6 | 250–280 |
| 37 | 104 (256) | 305 | 1–6 | 280–290 |
| 38 | 121 | 276 | 2–15 | 250–280 |
| 39 | 121 | 260 | 5–8 | 280–290 |
| 40 | 139 | 274 | 3–10 | 280–290 |
| 41 | 150 | 262 | 6–20 | 280–290 |
| 42 | 147 | 260 | 6–50 | 280–290 |
| 43 | 150 | 267 | 9–30 | 280–290 |
| 44 | 98 (196) | 300 | 8–10 | 280–290 |
| 45 | 112 | 278 | 3–5 | 250–280 |
| 46 | 99 (244) | 316 | 1–2 | 250–280 |
| 47 | 118 | 307 | 4–10 | 250–280 |
| 48 | 111 | 307 | 2–4 | 250–280 |
| 49 | 116 | 318 | 3–5 | 250–280 |
| 50 | 118 | 330 | 2–3 | 250–280 |
| 51 | 121 (173) | 340 | 5–7 | 250–280 |
| 52 | 111 | 352 | 7–10 | 250–280 |
| 53 | 142 (193) | 305 | 35–40 | 250–280 |
| 54 | 146 (199) | 296 | 15–25 | 250–280 |
| 55 | 162 (210) | 326 | 35–40 | 280–290 |
| 56 | 168 | 287 | 30–40 | 280–290 |
| 57 | 135 | 238 | 30–40 | 280–290 |
| 58 | 154 (205) | 276 | 25–50 | 250–280 |
| 59 | 138 | 264 | 0.5–1 | 280–290 |
| 60 | 143 | 247 | 2–4 | 275–290 |
| 61 | 146 | 241 | 15–30 | 280–290 |

TABLE 2-continued

Material Characterization

| Example # | Tg (Tm), ° C. Initial | Tg (Tm), ° C. Cured[1] | Melt Viscosity, Poise | Temp. of Melt Viscosity, ° C. |
|---|---|---|---|---|
| 62 | 125 | 260 | 2–4 | 280–290 |
| 63 | 149 | 244 | 2–4 | 265–280 |
| 64 | 108 | 325 | 1–2 | 280–290 |
| 65 | 130 | 303 | 20 | 280–290 |
| 66 | 149 | 290 | 40 | 280–290 |
| 67 | 111 | 342 | 1–10 | 280–290 |
| 68 | 119 | 354 | 100 | 280–290 |
| 69 | 89 | 313 | 1–2 | 280–290 |
| 70 | 134 | 260 | 10–15 | 280–290 |
| 71 | 143 | 255 | 30 | 280–290 |
| 72 | 147 | 260 | 6–50 | 280–290 |
| 73 | 157 | 255 | 10–100 | 280–290 |
| 74 | 126 (183) | 297 | 2–50 | 280–290 |
| 75 | 129 | 268 | 15–20 | 280–290 |
| 76 | 146 | 242 | 6–10 | 280–290 |
| 77 | 137 (186) | 295 | 15 | 280–290 |
| 78 | 144 (190) | 295 | 25–30 | 280–290 |
| 79 | 129 | 268 | 10–15 | 280–290 |
| 80 | 128 (186–304) | 294 | 8–10 | 280–290 |
| 81 | 139 (167–218) | 301 | 6–13 | 280–290 |

[1]Determined by DSC after curing imide powder for 1 hr at 371° C. in a sealed aluminum pan.

Representative melt viscosity curves are presented in FIGS. 4 and 5. Both materials exhibited relatively low melt viscosities at 280–290° C. The co-oligomer described in Example 1 exhibited a melt viscosity of ~10 poise at 250° C. which subsequently decreased to 1–3 poise at ~285° C. No increase in melt viscosity was detected during the 2 hour hold at 250° C. The co-oligomer described in Example 1 exhibits melt flow behavior consistent with that required for RTM processing whereas the co-oligomer described in Example 3 is more suitable for RI processing. The effect of a 2 hour hold at 280° C. on the oligomer described in Example 1 is shown in FIG. 6. The melt viscosity exhibits a slightly positive slope from 4 to 6 poise, but the viscosity decreases to 3 poise upon heating above 280° C. This indicates that the melt viscosity is stable for 2 hours at 280° C. These melt viscosity profiles are representative, in terms of their melt stability, of examples presented herein.

Neat resin moldings were prepared by placing the imide powders in an aluminum pan and heating to 300° C. for 0.5 hour and 350–371° C. for 1 hour. The powders melted and flowed-out well to give neat resin plaques with a small amount of voids due to entrapped air. None of the plaques exhibited any cracks and had to be peeled out of the aluminum pans. The toughness exhibited by the plaques ranged from good to excellent based on qualitative assessments. In contrast, the unsuccessful examples typically cracked on their own or broke while trying to remove the samples from the pan.

Adhesive film was prepared using the oligomer described in Example 3 by a solution process. Adhesive tape was prepared by multiple coating of 112 E glass with an A-1100 finish with a 30% (w/w) NMP solution of the amide acid co-oligomer described in Example 3 and subsequently stage-dried to 225° C. in a forced air oven after each coat. After the appropriate thickness had been obtained, the tape was dried to 250° C. to a final volatile content of 3%. Titanium (Ti, 6Al-4V) tensile shear specimens with a PASA-Jell 107 (Products Research and Chemical Corp., Semco Division) surface treatment were fabricated in a press at 350° C. under various pressures for 1 hour. Tensile shear strengths were determined according to ASTM D1002 using four specimens per test condition (Table 3).

TABLE 3

Titanium Tensile Shear Properties of Co-Oligomer Described in Example 3

| Processing Conditions | Primer | Test Temp., ° C. | Tensile Shear Strength, psi |
|---|---|---|---|
| 10 psi/8 h @ 288° C. | BRx-5 | 23 | 2320 |
| | | 177 | 2600 |
| 5 psi/8 h @ 288° C. | BRx-5 | 23 | 1850 |
| | | 177 | 2350 |
| 5 psi/8 h @ 288° C. | Co-Oligomer Described in Ex 3 | 23 | 1860 |
| | | 177 | 2260 |
| 5 psi/1 h @ 350° C. | BRx-5 | 23 | 4025 |
| | | 177 | 2930 |

Several composite panels were prepared using the co-oligomer described in Example 3 by both RTM and RI processes. In the RTM process, the resin was heated to ~290° C. and subsequently injected using a 4 inch diameter piston into a mold containing stacks of carbon fiber fabric. The mold was subsequently heated under pressure to 350–371° C. and held for one hour to effect cure. The laminates exhibited good appearance visually and microscopic inspection of laminate sections from the center and edge showed no voids. The resins exhibited excellent flow and wet-out of the carbon fibers and no void formation. Mechanical property data on composites fabricated via RTM is presented in Tables 4, 5 and 6. For comparison, similar data for PR 500 (an epoxy from 3M) and 5250-4 (a bismaleimide from Cytec-Fiberite) are included. These two materials represent high performance structural matrix resins processable via RTM.

TABLE 4

Characterization of IM-7 Carbon Fabric Laminates Fabricated via RTM

| Example | Tg, ° C. | Porosity, % | Fiber Volume, % | Microcracks/inch |
|---|---|---|---|---|
| 1 | 246 | 1 | 52 | 0 |
| 3 | 236 | 0 | 53 | 0 |
| PR500 | 201 | 0 | 49 | 0 |

TABLE 5

Room Temperature Compressive Properties of IM-7 Carbon Fabric Laminates Fabricated via RTM

| Example | Compressive Strength, ksi | Compressive Modulus, msi |
|---|---|---|
| 1 | 101 | 16.3 |
| 3 | 97 | 14.4 |
| PR500 | 97 | 14.3 |

TABLE 6

Room Temperature Flexural Properties of IM-7 Carbon Fabric Laminates Fabricated via RTM

| Example | Fiber Volume, % | Flexural Strength, ksi | Flexural Modulus, msi |
|---|---|---|---|
| 3 | 55 | 150 | 8.7 |
| 58 | 55 | 140 | 8.3 |
| 5250-4 | 56 | 140 | 8.5 |

The co-oligomer described in Example 3 was used to prepare a flat composite panel via the RI process. The polymer powder was placed in the bottom of a mold and an unsized IM-7 carbon fiber stitched preform (lay-up: [+45/−45/0/0/90/0/0/−45/+45]$_5$, 45 plies thick) was placed on top of the powder. The mold was heated to 290° C. and held for one hour to allow for impregnation and subsequently heated to 350° C. for 1 hour. The laminate dimensions were 1 ft×1 ft by 45 plies thick. The laminates exhibited excellent wet-out particularly around the carbon fiber stitch area. A relatively small amount of voids was evident. The resin content was 32%. Specimens were machined from the laminate and tested for open hole compression (OHC) strength at room temperature. The properties are presented in FIG. 7.

For comparative purposes, similar data is presented for two other imide systems, K3B (a thermoplastic polyimide from Cytec-Fiberite) and R1-16 (a phenylethynyl terminated oligomer with a calculated number average molecular weight of ~6000 g/mole from Cytec-Fiberite). The data for K3B is from laminates processed using conventional, solvent-containing (wet) prepreg, not RI. The data for R1-16 is from stitched laminates processed in a two-step, solvent assisted process, not a true RI process (i.e. these resin systems do not exhibit sufficient melt flow and/or melt stability to wet-out the carbon fiber without the aid of solvent). The laminates prepared via the solvent assisted process exhibited comparable void contents as laminates prepared from the co-oligomer described in Example 3. However, there is no data available for direct comparison with the subject invention since no imide laminates have heretofore been processed via RTM and/or RI processes. The composite specimens prepared from the co-oligomer described in Example 3 gave the highest room temperature OHC strength of all of the materials. In addition, this material offers the distinct advantage of one-step, volatile free processing. Please note that open hole compression strength is not significantly affected by the number of plies in the laminates. Thus, it is acceptable to compare the properties even though the laminates have varying number of plies.

Due to the combination of high melt flow, good melt stability, no volatilization during processing and after thermal curing, high $T_g$, toughness, and mechanical properties exhibited by the cured laminates, high quality composites were readily prepared by RTM and RI processes. The composites exhibited excellent fiber wet-out, consolidation, low void content and high mechanical properties. This combination of properties, particularly the toughness and open hole compression strength in composites, is unexpected. Other imide oligomers of comparable molecular weight containing phenylethynyl groups exhibit melt viscosities that were too high at temperatures where the melt viscosity is stable (i.e. <300° C.) to be useful in RTM and/or RI processes. For example, random co-oligomers of 3,4'-ODA and 1,3-APB where the amount of 1,3-APB was less than 60% exhibited melt viscosities in excess of 60 poise at 290° C. and consequently poor melt stability at temperatures where the minimum melt viscosity occurred. (i.e. minimum melt viscosities occurred at temperatures in excess of 300° C.).

To further exemplify the combination of properties of the cured composite parts, it was desirable to make direct property comparisons with a well known phenylethynyl terminated matrix resin (NASA LaRC's PETI-5, 5000 g/mole). Due to a relatively high and unstable melt viscosity, PETI-5 cannot be processed via RTM or RI processes regardless of the stoichiometric offset. Consequently, laminates were fabricated from conventional solvent containing unidirectional prepreg using the resin described in Example 3. The properties of these laminates were compared with those of PETI-5 and are presented in Table 7. The properties, particularly the compressive strength after impact, serve to reinforce the excellent toughness exhibited by most of the examples described herein.

TABLE 7

IM-7 Laminate Properties

| Example | Test Condition, ° C. | Open Hole Compressive Strength, ksi | Compressive Strength After Impact, ksi | Compressive Modulus After Impact, msi | Microstrain, in/in |
|---|---|---|---|---|---|
| 3 | 23 | 63 | 49 | 7.4 | 6886 |
|  | 177 (wet) | 40 |  |  |  |
| PETI-5 (5000 g/mol) | 23 | 66 | 47 | 8.1 | 5896 |
|  | 177 (wet) | 46 |  |  |  |

The complex mixture of products obtained from the method described herein were characterized for molecular weight and molecular weight distribution by gel permeation chromatography (GPC). The samples exhibited multi-modal molecular weight distributions. This is another advantageous feature that is a direct result of the method described herein. A representative GPC curve is shown in FIG. 8. Two runs were performed for each sample. In all cases, the GPC results indicated number average molecular weights ($M_n$) significantly higher than the target molecular weights. The polydispersities ($M_w/M_n$) were significantly less than the theoretical value of 2. The reason for this is that the molecular weight distributions are not Gaussian and the resolution of this technique is not optimized for this molecular weight range. In addition as previously discussed, the simple phenylethynyl compounds that are part of the complex mixture of products are not detected by GPC.

The absolute molecular weight data for representative imide and amide acid samples is presented in Table 8. The entries are for the imide unless otherwise indicated.

TABLE 8

Molecular Weight Characterization of Complex Mixture of Phenylethynyl Imides

| Example | $M_n$, g/mole | $M_w$, g/mole | $M_z$, g/mole | Intrinsic Viscosity, dL/g |
|---|---|---|---|---|
| 1 | 2200 | 2310 | 2430 | 0.0607 |
|  | 2170 | 2280 | 2400 | 0.0620 |
| 3 | 1450 | 1790 | 2150 | 0.113 |
|  | 1500 | 1850 | 2230 | 0.109 |
| 5 | 1850 | 1960 | 2080 | 0.0619 |
|  | 1880 | 1980 | 2100 | 0.0616 |
| 6 | 1340 | 1400 | 1470 | 0.0826 |
|  | 1330 | 1380 | 1440 | 0.0845 |
| 7 | 1880 | 1980 | 2090 | 0.0590 |
|  | 1870 | 1970 | 2080 | 0.0594 |
| 8 Amide Acid | 1980 | 2100 | 2230 | 0.0801 |
|  | 2030 | 2160 | 2300 | 0.0798 |
| 9 | 1310 | 1420 | 1540 | 0.0833 |
|  | 1300 | 1400 | 1500 | 0.0844 |
| 10 | 1380 | 1510 | 1650 | 0.0763 |
|  | 1420 | 1550 | 1710 | 0.0744 |
| 11 | 1690 | 1710 | 1740 | 0.0489 |
|  | 1660 | 1680 | 1720 | 0.0496 |

TABLE 8-continued

Molecular Weight Characterization of Complex Mixture of Phenylethynyl Imides

| Example | $M_n$, g/mole | $M_w$, g/mole | $M_z$, g/mole | Intrinsic Viscosity, dL/g |
|---|---|---|---|---|
| 12 Amide Acid | 1650 | 1670 | 1690 | 0.101 |
| 13 | 2110 | 2180 | 2260 | 0.0819 |
|  | 2080 | 2140 | 2220 | 0.0837 |
| 16 | 2420 | 2470 | 2530 | 0.0640 |
|  | 2380 | 2440 | 2510 | 0.0652 |
| 18 | 2000 | 2280 | 2600 | 0.0654 |
|  | 1940 | 2190 | 2490 | 0.0682 |
| 19 | 2500 | 2680 | 2880 | 0.0725 |
|  | 2530 | 2700 | 2870 | 0.0712 |
| 20 | 1930 | 2220 | 2560 | 0.0693 |
|  | 1970 | 2220 | 2490 | 0.0694 |
| 21 | 1700 | 1860 | 2060 | 0.0577 |
|  | 1730 | 1890 | 2080 | 0.0570 |
| 22 | 2170 | 2570 | 3020 | 0.0780 |
|  | 2280 | 2730 | 3240 | 0.0747 |
| 24 | 1780 | 2040 | 2330 | 0.0697 |
|  | 1840 | 2090 | 2380 | 0.0677 |
| 25 | 2230 | 2760 | 3300 | 0.0831 |
|  | 2160 | 2720 | 3290 | 0.0847 |
| 26 | 1910 | 2300 | 2710 | 0.0801 |
|  | 1970 | 2380 | 2830 | 0.0770 |
| 27 | 2530 | 2760 | 3000 | 0.0853 |
|  | 2550 | 2830 | 3120 | 0.0829 |
| 28 | 1960 | 1970 | 1980 | 0.0497 |
|  | 1940 | 1970 | 2000 | 0.0483 |
| 29 | 1990 | 2040 | 2100 | 0.0598 |
|  | 1900 | 1980 | 2060 | 0.0616 |
| 30 | 2190 | 2330 | 2480 | 0.0718 |
|  | 2150 | 2290 | 2440 | 0.0725 |
| 31 | 2240 | 2460 | 2680 | 0.0725 |
|  | 2200 | 2440 | 2870 | 0.0712 |
| 32 | 1960 | 1970 | 1990 | 0.0512 |
|  | 1960 | 1970 | 1980 | 0.0514 |
| 33 | 1780 | 1830 | 1880 | 0.0456 |
|  | 1790 | 1820 | 1840 | 0.0466 |
| 34 | 2130 | 2140 | 2140 | 0.0532 |
|  | 2210 | 2210 | 2210 | 0.0519 |
| 35 | 1830 | 1840 | 1850 | 0.0453 |
|  | 1910 | 1920 | 1920 | 0.0436 |
| 36 | 1960 | 1990 | 2020 | 0.0537 |
|  | 1970 | 2000 | 2030 | 0.0530 |
| 37 | 1600 | 1600 | 1600 | 0.0476 |
|  | 1610 | 1620 | 1620 | 0.0467 |
| 38 | 2170 | 2190 | 2210 | 0.0520 |
|  | 2150 | 2160 | 2180 | 0.0530 |
| 39 Amide Acid | 2120 | 2220 | 2340 | 0.0921 |
|  | 2080 | 2210 | 2370 | 0.0919 |
| 40 Amide Acid | 2390 | 2400 | 2400 | 0.0746 |
|  | 2380 | 2380 | 2390 | 0.0758 |
| 41 Amide Acid | 2240 | 2340 | 2450 | 0.0887 |
|  | 2320 | 2410 | 2510 | 0.0853 |
| 44 | 2220 | 2230 | 2240 | 0.0511 |
|  | 2220 | 2230 | 2240 | 0.0512 |
| 45 | 1660 | 1750 | 1820 | 0.0480 |
|  | 1710 | 1740 | 1760 | 0.0474 |
| 46 | 1530 | 1530 | 1530 | 0.0459 |
|  | 1560 | 1560 | 1560 | 0.0454 |
| 47 | 2030 | 2060 | 2090 | 0.0501 |
|  | 2040 | 2060 | 2090 | 0.0504 |
| 48 | 1680 | 1710 | 1750 | 0.0512 |
|  | 1690 | 1730 | 1760 | 0.0511 |
| 49 | 1660 | 1700 | 1750 | 0.0526 |
|  | 1700 | 1740 | 1800 | 0.0510 |
| 50 | 1890 | 1910 | 1920 | 0.0540 |
|  | 1890 | 1900 | 1910 | 0.0546 |
| 51 Amide Acid | 1980 | 2030 | 2080 | 0.078 |
|  | 1950 | 2000 | 2050 | 0.079 |
| 52 | 1870 | 1890 | 1910 | 0.0759 |
|  | 1870 | 1880 | 1900 | 0.0763 |
| 53 Amide Acid | 2600 | 3170 | 3820 | 0.0898 |
|  | 2550 | 3150 | 3840 | 0.0905 |
| 54 Amide Acid | 2700 | 3340 | 4050 | 0.0852 |
|  | 2710 | 3310 | 3970 | 0.0851 |
| 55 | 1950 | 2250 | 2570 | 0.0754 |
|  | 2040 | 2320 | 2620 | 0.0728 |

Having generally described the invention, a more complete understanding thereof can be obtained by reference to the following examples which are provided herein for purposes of illustration only and do not limit the invention.

Synthesis of Complex Mixtures of Phenylethynyl Containing Imide Oligomers

EXAMPLE 1

Synthesis of a phenylethynyl terminated amide acid and imide co-oligomer with a calculated number average molecular weight of 750 g/mole using 3,3',4,4'-biphenyltetracarboxylic dianhydride (BPDA, 0.48 mole), 1,3-bis(3-aminophenoxy)benzene (1,3-APB, 0.75 mole), 3,4'-oxydianiline (3,4'-ODA, 0.25 mole) and 4-phenylethynylphthalic anhydride (PEPA, 1.04 mole).

Into a 100 mL three neck round bottom flask equipped with a mechanical stirrer, thermometer and nitrogen inlet/outlet was placed 1,3-APB (3.6063 g, 0.0123 mole), 3,4'-ODA (0.8234 g, 0.0041 mole), BPDA (2.3210 g, 0.0079 mole), PEPA (4.2493 g, 0.0171 mole) and NMP (17 mL). Additional NMP (7 mL) was used to rinse in all of the solids (30.73% solids w/w). The mixture was stirred overnight under nitrogen (all solids had dissolved at this point). Toluene was added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of yellow powder. The powder exhibited an initial $T_g$ of 132° C. and $T_g$ of 258° C. after curing for 1 hour at 371° C. The melt viscosity curve for a 2 hour hold at 250° C. is shown below. The powder exhibited a complex melt viscosity of 5–6 poise at 250° C., this viscosity was stable at 250° C. for the duration of the experiment (1 hour). The powder exhibited a complex melt viscosity of 1–3 poise at 280° C., this viscosity was stable at 280° C. for the duration of the experiment (2 hours).

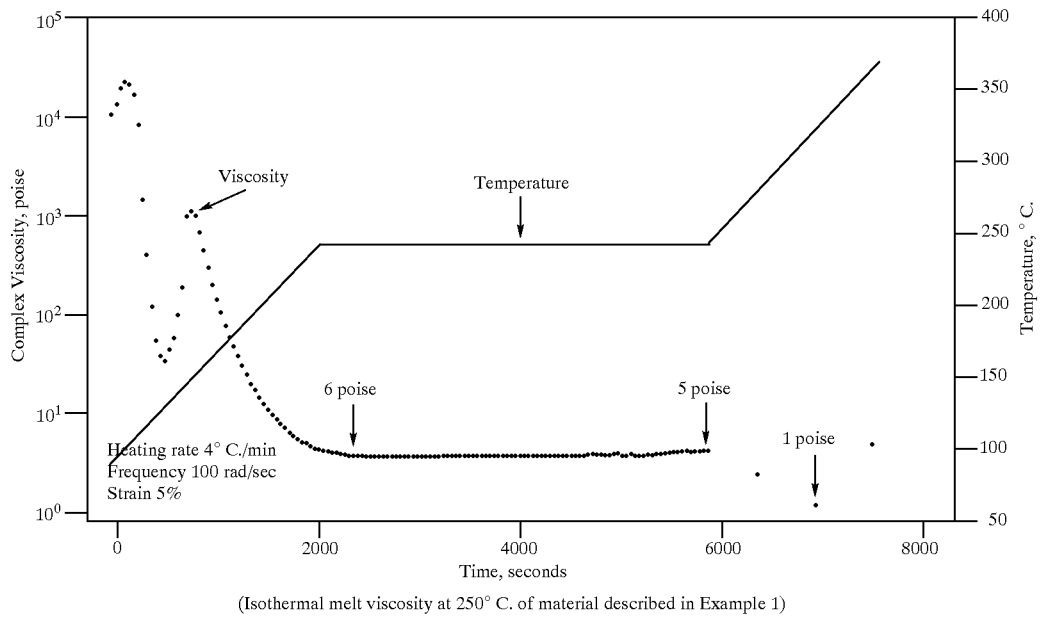

(Isothermal melt viscosity at 250° C. of material described in Example 1)

EXAMPLE 2

Synthesis of a phenylethynyl terminated amide acid and imnide co-oligomer with a calculated number average molecular weight of 1000 g/mole using 3,3',4,4'-biphenyltetracarboxylic dianhydride (BPDA, 0.58 mole), 1,3-bis(3-aminophenoxy)benzene (1,3-APB, 0.75 mole), 3,4'-oxydianiline (3,4'-ODA, 0.25 mole) and 4-phenylethynylphthalic anhydride (PEPA, 0.84 mole).

Into a 100 mL three neck round bottom flask equipped with a mechanical stirrer, thermometer and nitrogen inlet/outlet was placed 1,3-APB (4.6043 g, 0.01575 mole), 3,4'-ODA (1.05127 g, 0.00525 mole) and NMP (7 g). The mixture was stirred for ~0.5–1 hr to dissolve the diamines. A slurry of BPDA (3.5836 g, 0.01218 mole) and PEPA (4.3789 g, 0.01764 mole) in NMP (10.6 g) was added. Additional NMP (10.0 g) was used to rinse in all of the anhydrides (30.0% solids w/w). Upon addition of the anhydride/NMP slurry, the reaction temperature increased slightly. The mixture was stirred overnight under nitrogen (all solids had dissolved at this point). Toluene was added (50 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of yellow powder. The powder exhibited an initial $T_g$ of 140° C. and $T_g$ of 245° C. after curing for 1 hour at 371° C. The powder exhibited a complex melt viscosity of 5–6 poise at 250° C., this viscosity was stable at 250° C. for the duration of the experiment (1 hour). The powder exhibited a complex melt viscosity of 3–5 poise at 280° C., this viscosity was stable at 280° C. for the duration of the experiment (2 hours).

EXAMPLE 3

Synthesis of a phenylethynyl terminated amide acid and imide co-oligomer with a calculated number average molecular weight of 1250 g/mole using 3,3',4,4'- biphenyltetracarboxylic dianhydride (BPDA, 0.65 mole), 1,3-bis (3-aminophenoxyphenyl)benzene (1,3-APB, 0.75 mole), 3,4'-oxydianiline (3,4'-ODA, 0.25 mole) and 4-phenylethynylphthalic anhydride (PEPA, 0.70 mole).

Into a 4L reaction kettle equipped with a mechanical stirrer, thermometer and nitrogen inlet/outlet was placed 1,3-APB (658 g, 2.25 moles), 3,4'-ODA (150 g, 0.75 mole) and NMP (673 g). The mixture was stirred for ~0.5–1 hr to dissolve the diamines. A slurry of BPDA (574 g, 1.95 mole) and PEPA (521 g, 2.1 mole) in NMP (1000 g) was added. Additional NMP (431 g) was used to rinse in all of the anhydrides (47.5% solids w/w). Upon addition of the anhydride/NMP slurry, the reaction temperature increased to ~65° C. The mixture was stirred for ~4 hrs (all solids had not dissolved at this point), toluene was added (300 mL) and the reaction kettle was fitted with a Dean Stark trap and reflux condenser. The mixture was heated via an oil bath to 185° C. and held overnight. The next day toluene was removed from the system via the Dean Stark trap (the reaction temp eventually reached ~205° C. during the toluene removal) and the reaction solution was allowed to cool to room temperature. The solution (Brookfield viscosity at 24° C. was 2400 cps at 46.9% solids w/w), was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 140° C. for ~8 hrs to give a quantitative yield of yellow powder. The powder exhibited an initial $T_g$ of 145° C. and $T_g$ of 244° C. after curing for 1 hour at 371° C. The powder exhibited a complex melt viscosity of 10–15 poise at 250° C., this viscosity was stable at 250° C. for the duration of the experiment (1 hour). The powder exhibited a complex melt viscosity of 5–12 poise at 280° C., this viscosity was stable at 280° C. for the duration of the experiment (2 hours).

EXAMPLE 4

Synthesis of an amide acid and imide co-oligomer containing both terminal and pendent phenylethynyl groups with a calculated number average molecular weight of 1250 g/mole using 3,3',4,4'-biphenyltetracarboxylic dianhydride (BPDA, 0.64 mole), 1,3-bis(3-aminophenoxyphenyl)benzene (1,3-APB, 0.75 mole), 3,4'-oxydianiline (3,4'-ODA, 0.20 mole), 3,5-diamino-4'-phenylethynyl benzophenone (DPEB, 0.05 mole) and 4-phenylethynylphthalic anhydride (PEPA, 0.68 mole).

Into a 100 mL three neck round bottom flask equipped with a mechanical stirrer, thermometer and nitrogen inlet/outlet was placed 1,3-APB (3.2888 g, 0.01125 mole), 3,4'-ODA (0.6007 g, 0.0030 mole), DPEB (0.2343 g, 0.00075 mole) and NMP (5.9 g). The mixture was stirred for ~0.5–1 hr to dissolve the diamines. A slurry of BPDA (2.8245 g, 0.0096 mole) and PEPA (2.6809 g, 0.0108 mole) in NMP (10.0 g) was added. Additional NMP (4.0 g) was used to rinse in all of the anhydrides (32.6% solids w/w). Upon addition of the anhydride/NMP slurry, the reaction temperature increased slightly. The mixture was stirred overnight under nitrogen (all solids had dissolved at this point). Toluene was added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of yellow powder. The powder exhibited an initial $T_g$ of 148° C. and $T_g$ of 251° C. after curing for 1 hour at 371° C. The powder exhibited a complex melt viscosity of 40 poise at 250° C., this viscosity was stable at 250° C. for the duration of the experiment (1 hour). The powder exhibited a complex melt viscosity of 20–25 poise at 280° C., this viscosity was stable at 280° C. for the duration of the experiment (2 hours).

EXAMPLE 5

Synthesis of a phenylethynyl terminated amide acid and imide co-oligomer with a calculated number average molecular weight of 750 g/mole using 3,3',4,4'-biphenyltetracarboxylic dianhydride (BPDA, 0.48 mole), 1,3-bis(3-aminophenoxyphenyl)benzene (1,3-APB, 0.80 mole), 3,4'-oxydianiline (3,4'-ODA, 0.20 mole) and 4-phenylethynylphthalic anhydride (PEPA, 1.04 mole).

Into a 100 mL three neck round bottom flask equipped with a mechanical stirrer, thermometer and nitrogen inlet/outlet was placed 1,3-APB (5.1127 g, 0.0175 mole), 3,4'-ODA (0.8755 g, 0.0044 mole), BPDA (3.0636 g, 0.0104 mole), PEPA (5.6840 g, 0.0229 mole) and NMP (20 mL) was added. Additional NMP (12 mL) was used to rinse in all of the solids (30.83% solids w/w). The mixture was stirred overnight under nitrogen (all solids had dissolved at this point). Toluene was added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of yellow powder. The powder exhibited an initial $T_g$ of 129° C. and $T_g$ of 257° C. after curing for 1 hour at 371° C. The powder exhibited a complex melt viscosity of 10 poise at 250° C., this viscosity was stable at 250° C. for the duration of the experiment (1 hour). The powder exhibited a complex melt viscosity of 5 poise at 280° C., this viscosity was stable at 280° C. for the duration of the experiment (2 hours).

EXAMPLE 6

Synthesis of a phenylethynyl terminated amide acid and imide co-oligomer with a calculated number average molecular weight of 750 g/mole using 3,3',4,4'-biphenyltetracarboxylic dianhydride (BPDA, 0.48 mole), 1,3-bis(3-aminophenoxyphenyl)benzene (1,3-APB, 0.85 mole), 3,4'-oxydianiline (3,4'-ODA, 0.15 mole) and 4-phenylethynylphthalic anhydride (PEPA, 1.04 mole).

Into a 100 mL three neck round bottom flask equipped with a mechanical stirrer, thermometer and nitrogen inlet/outlet was placed 1,3-APB (3.5433 g, 0.0121 mole), 3,4'-ODA (0.4283 g, 0.0021 mole), BPDA (1.9844 g, 0.0067 mole), PEPA (3.7313 g, 0.0150 mole) and NMP (14 mL). Additional NMP (8 mL) was used to rinse in all of the solids (29.85% solids w/w). The mixture was stirred overnight under nitrogen (all solids had dissolved at this point). Toluene was added (50 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of yellow powder. The powder exhibited an initial $T_g$ of 127° C. and $T_g$ of 253° C. after curing for 1 hour at 371° C. The melt viscosity curve for a 2 hour hold at 280° C. is shown below. The powder exhibited a complex melt viscosity of 5–6 poise at 250° C., this viscosity was stable at 250° C. for the duration of the experiment (1 hour). The powder exhibited a complex melt viscosity of 2–3 poise at 280° C., this viscosity was stable at 280° C. for the duration of the experiment (2 hours).

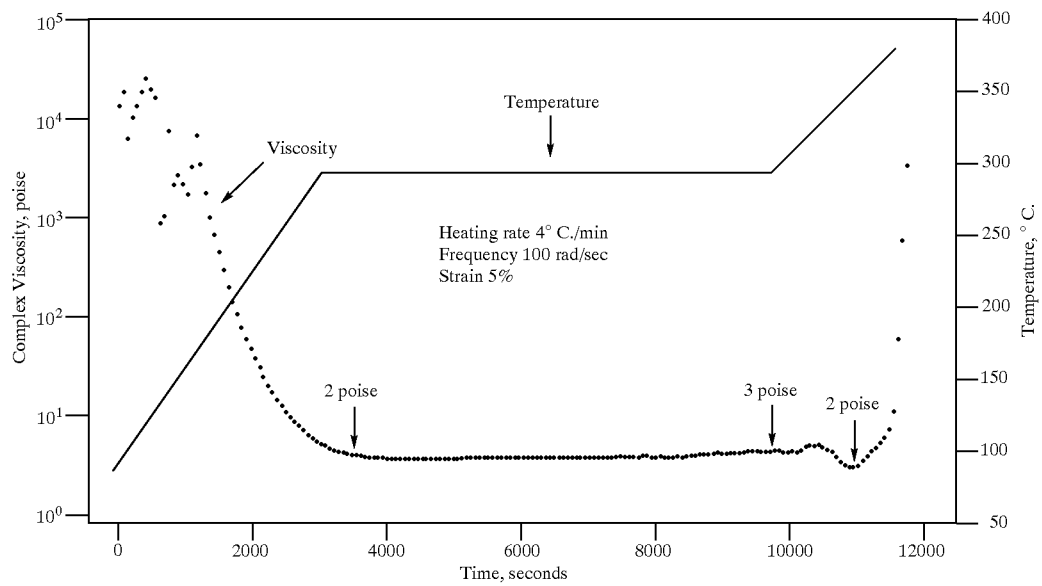

Isothermal melt viscosity at 280° C. of material described in Example 6.

EXAMPLE 7

Synthesis of a phenylethynyl terminated amide acid and imide oligomer with a calculated number average molecular weight of 750 g/mole using 3,3',4,4'-biphenyltetracarboxylic dianhydride (BPDA, 0.46 mole), 1,3-bis(3-aminophenoxyphenyl)benzene (1,3-APB, 1.0 mole) and 4-phenylethynylphthalic anhydride (PEPA, 1.07 mole).

Into a 100 mL three neck round bottom flask equipped with a mechanical stirrer, thermometer and nitrogen inlet/outlet was placed 1,3-APB (4.8696 g, 0.0167 mole), BPDA (2.2691 g, 0.0077 mole), PEPA (4.4410 g, 0.0179 mole) and NMP (17 mL). Additional NMP (9 mL) was used to rinse in all of the solids (30.13% solids w/w). The mixture was stirred overnight under nitrogen (all solids had dissolved at this point). Toluene was added (50 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 110° C. for ~8 hrs to give a quantitative yield of yellow powder. The powder exhibited an initial $T_g$ of 120° C. and $T_g$ of 232° C. after curing for 1 hour at 371° C. The melt viscosity curve for a 2 hour hold at 280° C. is shown below. The powder exhibited a complex melt viscosity of 5–6 poise at 250° C., this viscosity was stable at 250° C. for the duration of the experiment (1 hour). The powder exhibited a complex melt viscosity of 2–4 poise at 280° C., this viscosity was stable at 280° C. for the duration of the experiment (2 hours).

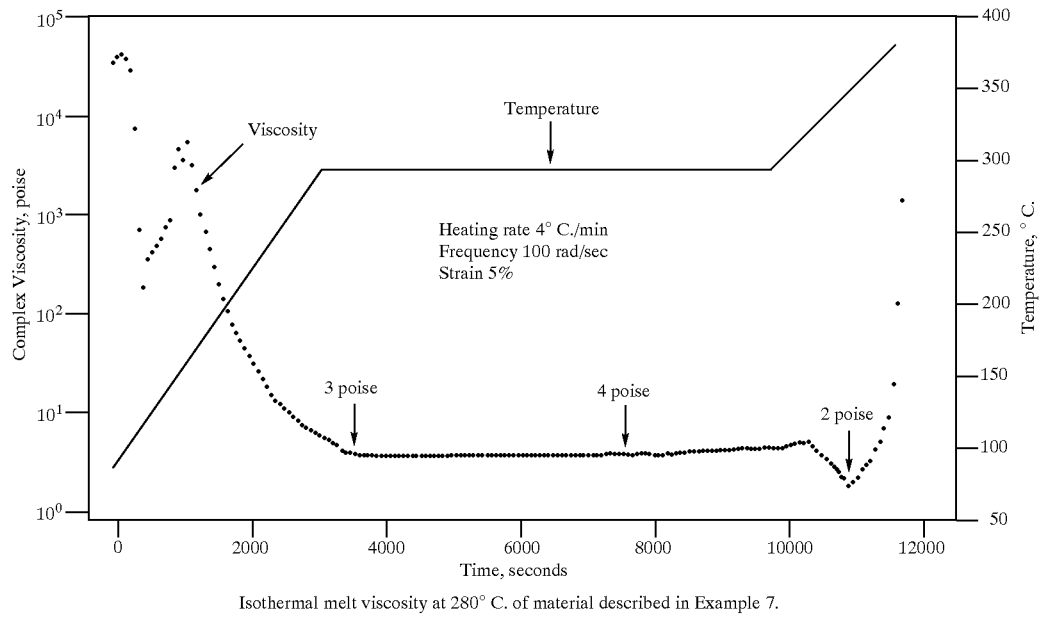

Isothermal melt viscosity at 280° C. of material described in Example 7.

EXAMPLE 8

Synthesis of an amide acid and imide co-oligomer containing both terminal and pendent phenylethynyl groups with a calculated number average molecular weight of 750 g/mole using 3,3',4,4'-biphenyltetracarboxylic dianhydride (BPDA, 0.47 mole), 1,3-bis(3-aminophenoxyphenyl)benzene (1,3-APB, 0.80 mole), 3,4'-oxydianiline (3,4'-ODA, 0.10 mole), 3,5-diamino-4'-phenylethynyl benzophenone (DPEB, 0.10 mole) and 4-phenylethynylphthalic anhydride (PEPA, 1.06 mole).

Into a 100 mL three neck round bottom flask equipped with a mechanical stirrer, thermometer and nitrogen inlet/outlet was placed 1,3-APB (3.4033 g, 0.0116 mole), 3,4'-ODA (0.2914 g, 0.0015 mole), DPEB (0.4546 g, 0.0015 mole), BPDA (2.0046 g, 0.0068 mole), PEPA (3.8422 g, 0.0155 mole) and NMP (15.0 mL). Additional NMP (7.0 mL) was used to rinse in all of the solids (30.5% solids w/w). The mixture was stirred overnight under nitrogen (all solids had dissolved at this point). Toluene was added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 120° C. for ~8 hrs to give a quantitative yield of yellow powder. The powder exhibited an initial $T_g$ of 125° C. and $T_g$ of 269° C. after curing for 1 hour at 371° C. The powder exhibited a complex melt viscosity of 8–10 poise at 250° C., this viscosity was stable at 250° C. for the duration of the experiment (1 hour). The powder exhibited a complex melt viscosity of 3–6 poise at 280° C., this viscosity was stable at 280° C. for the duration of the experiment (2 hours).

EXAMPLE 9

Synthesis of an amide acid and imide co-oligomer containing both terminal and pendent phenylethynyl groups with a calculated number average molecular weight of 750 g/mole using 3,3',4,4'-biphenyltetracarboxylic dianhydride (BPDA, 0.47 mole), 1,3-bis(3-aminophenoxyphenyl)benzene (1,3-APB, 0.70 mole), 3,4'-oxydianiline (3,4'-ODA, 0.15 mole), 3,5-diamino-4'-phenylethynyl benzophenone (DPEB, 0.15 mole) and 4-phenylethynylphthalic anhydride (PEPA, 1.06 mole).

Into a 100 mL three neck round bottom flask equipped with a mechanical stirrer, thermometer and nitrogen inlet/outlet was placed 1,3-APB (3.1572, 0.0108 mole), 3,4'-ODA (0.4634 g, 0.0023 mole), DPEB (0.7229 g, 0.0023 mole), BPDA (2.1371 g, 0.0073 mole), PEPA (4.0535 g, 0.0163 mole) and NMP (15.0 mL). Additional NMP (9.0 mL) was used to rinse in all of the solids (29.8% solids w/w). The mixture was stirred overnight under nitrogen (all solids had dissolved at this point). Toluene was added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 120° C. for ~8 hrs to give a quantitative yield of yellow powder. The powder exhibited an initial $T_g$ of 125° C. and $T_g$ of 293° C. after curing for 1 hour at 371° C. The powder exhibited a complex melt viscosity of 5–6 poise at 250° C., this viscosity was stable at 250° C. for the duration of the experiment (1 hour). The powder exhibited a complex melt viscosity of 1–3 poise at 280° C., this viscosity was stable at 280° C. for the duration of the experiment (2 hours).

EXAMPLE 10

Synthesis of an amide acid and imide co-oligomer containing both terminal and pendent phenylethynyl groups with a calculated number average molecular weight of 750 g/mole using 3,3',4,4'-biphenyltetracarboxylic dianhydride (BPDA, 0.46 mole), 1,3-bis(3-aminophenoxyphenyl) benzene (1,3-APB, 0.85 mole), 3,5-diamino-4'-phenylethynyl benzophenone (DPEB, 0.15 mole) and 4-phenylethynylphthalic anhydride (PEPA, 1.08 mole).

Into a 100 mL three neck round bottom flask equipped with a mechanical stirrer, thermometer and nitrogen inlet/outlet was placed 1,3-APB (4.1387 g, 0.0142 mole), DPEB (0.7804 g, 0.0025 mole), BPDA (2.2586 g, 0.0077 mole), PEPA (4.4579 g, 0.0180 mole) and NMP (15.0 mL). Additional NMP (11.0 mL) was used to rinse in all of the solids (30.2% solids w/w). The mixture was stirred overnight under nitrogen (all solids had dissolved at this point). Toluene was added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 110° C. for ~8 hrs to give a quantitative yield of yellow powder. The powder exhibited an initial $T_g$ of 120° C. and $T_g$ of 279° C. after curing for 1 hour at 371° C. The powder exhibited a complex melt viscosity of 7–9 poise at 250° C., this viscosity was stable at 250° C. for the duration of the experiment (1 hour). The powder exhibited a complex melt viscosity of 4–5 poise at 280° C., this viscosity was stable at 280° C. for the duration of the experiment (2 hours).

EXAMPLE 11

Synthesis of an amide acid and imide co-oligomer containing both terminal and pendent phenylethynyl groups with a calculated number average molecular weight of 500 g/mole using 3,3',4,4'-biphenyltetracarboxylic dianhydride (BPDA, 0.29 mole), 1,3-bis(3-aminophenoxyphenyl) benzene (1,3-APB, 0.85 mole), 3,5-diamino-4'-phenylethynyl benzophenone (DPEB, 0.15 mole) and 4-phenylethynylphthalic anhydride (PEPA, 1.4 mole).

Into a 100 mL three neck round bottom flask equipped with a mechanical stirrer, thermometer and nitrogen inlet/outlet was placed 1,3-APB (3.4562 g, 0.0118 mole), DPEB (0.6517 g, 0.0021 mole), BPDA (1.1761 g, 0.0040 mole), PEPA (4.9208 g, 0.0198 mole) and NMP (15.0 mL). Additional NMP (8.0 mL) was used to rinse in all of the solids (30.0% solids w/w). The mixture was stirred overnight under nitrogen (all solids had dissolved at this point). Toluene was added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 100° C. for ~8 hrs to give a quantitative yield of yellow powder. The powder exhibited an initial $T_g$ of 105° C. and $T_g$ of 294° C. after curing for 1 hour at 371° C. The powder exhibited a complex melt viscosity of 2–3 poise at 250° C., this viscosity was stable at 250° C. for the duration of the experiment (1 hour). The powder exhibited a complex melt viscosity of 1–2 poise at 280° C., this viscosity was stable at 280° C. for the duration of the experiment (2 hours).

EXAMPLE 12

Synthesis of an amide acid and imide co-oligomer containing terminal phenylethynyl groups with a calculated number average molecular weight of 750 g/mole using 3,3',4,4'-biphenyltetracarboxylic dianhydride (BPDA, 0.47 mole), 1,3-bis(3-aminophenoxyphenyl)benzene (1,3-APB, 0.90 mole), 3,4'-oxydianiline (3,4'-ODA, 0.10 mole), and 4-phenylethynylphthalic anhydride (PEPA, 1.06 mole).

Into a 100 mL three neck round bottom flask equipped with a mechanical stirrer, thermometer and nitrogen inlet/outlet was placed 1,3-APB (3.4714 g, 0.0119 mole), 3,4'-ODA (0.2642 g, 0.0013 mole), BPDA (1.8230 g, 0.0062 mole), PEPA (3.4741 g, 0.0140 mole) and NMP (12.0 mL). Additional NMEP (8.0 mL) was used to rinse in all of the solids (30.4% solids w/w). The mixture was stirred overnight under nitrogen (all solids had dissolved at this point). Toluene was added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 130° C. for ~8 hrs to give a quantitative yield of yellow powder. The powder exhibited an initial $T_g$ of 121° C. and $T_g$ of 245° C. after curing for 1 hour at 371° C. The melt viscosity curve for a 2 hour hold at 280° C. is shown below. The powder exhibited a complex melt viscosity of 5–6 poise at 250° C., this viscosity was stable at 250° C. for the duration of the experiment (1 hour). The powder exhibited a complex melt viscosity of 2–4 poise at 280° C., this viscosity was stable at 280° C. for the duration of the experiment (2 hours).

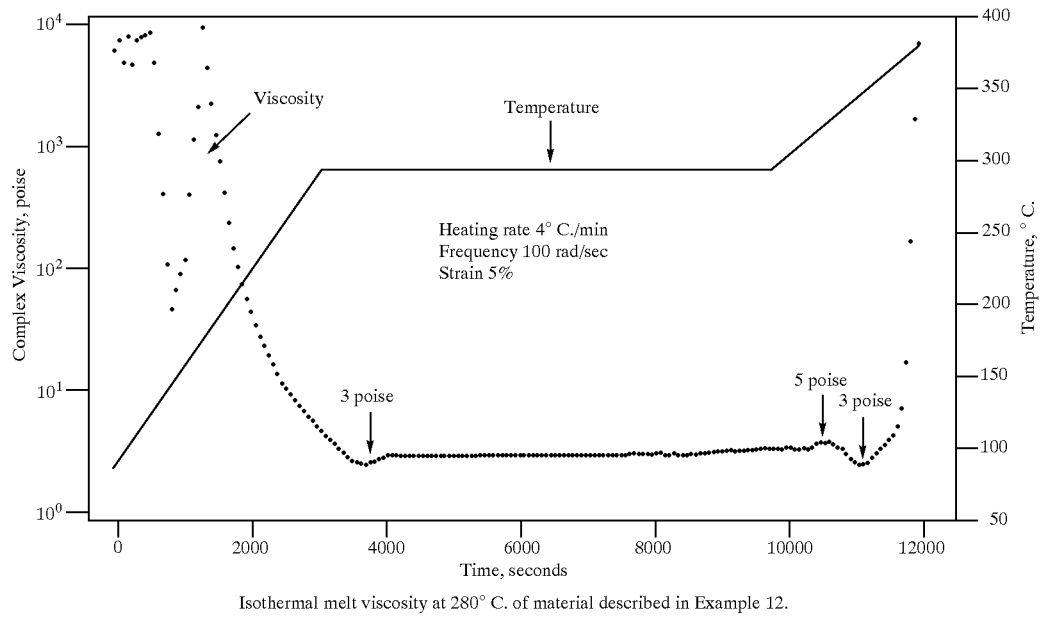

Isothermal melt viscosity at 280° C. of material described in Example 12.

EXAMPLE 13

Synthesis of a phenylethynyl terminated amide acid and imide co-oligomer with a calculated number average molecular weight of 500 g/mole using 3,3',4,4'-oxydiphthalic dianhydride (ODPA, 0.44 mole), 1,3-bis(3-aminophenoxyphenyl)benzene (1,3-APB, 0.90 mole), 3,4'-oxydianiline (3,4'-ODA, 0.10 mole) and 4-phenylethynylphthalic anhydride (PEPA, 1.12 mole).

Into a 100 mL three neck round bottom flask equipped with a mechanical stirrer, thermometer and nitrogen inlet/outlet was placed 1,3-APB (7.1036 g, 0.0243 mole), 3,4'-ODA (0.5406 g, 0.0027 mole) and NMP (15 g). The mixture was stirred for ~0.5–1 hr to dissolve the diamines. A slurry of ODPA (3.7067 g, 0.012 mole) and PEPA (7.4457 g, 0.030 mole) in NMP (10.0 g) was added. Additional NMP (9.9 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of ~95° C. and $T_g$ of 235° C. after curing for 1 hour at 371° C. The powder exhibited a complex melt viscosity of 1 poise at 250° C., this viscosity was stable at 250° C. for the duration of the experiment (1 hour). The powder exhibited a complex melt viscosity of 0.5 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 14

Synthesis of a phenylethynyl terminated amide acid and imide co-oligomer with a calculated number average molecular weight of 750 g/mole using 3,3',4,4'-oxydiphthalic dianhydride (ODPA, 0.46 mole), 1,3-bis(3-aminophenoxyphenyl)benzene (1,3-APB, 0.90 mole), 3,4'-oxydianiline (3,4'-ODA, 0.10 mole) and 4-phenylethynylphthalic anhydride (PEPA, 1.08 mole).

Into a 100 mL three neck round bottom flask equipped with a mechanical stirrer, thermometer and nitrogen inlet/outlet was placed 1,3-APB (7.1036 g, 0.0243 mole), 3,4'-ODA (0.5406 g, 0.0027 mole) and NMP (15 g). The mixture was stirred for ~0.5–1 hr to dissolve the diamines. A slurry of ODPA (3.8380 g, 0.0126 mole) and PEPA (7.2600 g, 0.029 mole) in NMP (10.0 g) was added. Additional NMP (9.3 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of ~95° C. and $T_g$ of 229° C. after curing for 1 hour at 371° C. The powder exhibited a complex melt viscosity of 1 poise at 250° C., this viscosity was stable at 250° C. for the duration of the experiment (1 hour). The powder exhibited a complex melt viscosity of 0.75 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was tougher than the molding fabricated from the material described in Example 13.

EXAMPLE 15

Synthesis of a phenylethynyl terminated amide acid and imide co-oligomer with a calculated number average molecular weight of 500 g/mole using 3,3',4,4'-oxydiphthalic dianhydride (ODPA, 0.44 mole), 1,3-bis(3-aminophenoxyphenyl)benzene (1,3-APB, 0.75 mole), 3,4'-oxydianiline (3,4'-ODA, 0.25 mole) and 4-phenylethynylphthalic anhydride (PEPA, 1.115 mole).

Into a 100 mL three neck round bottom flask equipped with a mechanical stirrer, thermometer and nitrogen inlet/outlet was placed 1,3-APB (5.9197 g, 0.02025 mole), 3,4'-ODA (1.3516 g, 0.00675 mole) and NMP (15 g). The mixture was stirred for ~0.5–1 hr to dissolve the diamines. A slurry of ODPA (3.7067 g, 0.01195 mole) and PEPA (7.4457 g, 0.030 mole) in NMP (10.0 g) was added. Additional NMP (9.2 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of ~90° C. and $T_g$ of 237° C. after curing for 1 hour at 371° C. The powder exhibited a complex melt viscosity of 1.5 poise at 250° C., this viscosity was stable at 250° C. for the duration of the experiment (1 hour). The powder exhibited a complex melt viscosity of 1.0 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough comparable to the molding fabricated from the material described in Example 13.

EXAMPLE 16

Synthesis of a phenylethynyl terminated amide acid and imide co-oligomer with a calculated number average molecular weight of 750 g/mole using 3,3',4,4'-oxydiphthalic dianhydride (ODPA, 0.46 mole), 1,3-bis(3-aminophenoxyphenyl)benzene (1,3-APB, 0.75 mole), 3,4'-oxydianiline (3,4'-ODA, 0.25 mole) and 4-phenylethynylphthalic anhydride (PEPA, 1.08 mole).

Into a 100 mL three neck round bottom flask equipped with a mechanical stirrer, thermometer and nitrogen inlet/outlet was placed 1,3-APB (5.9197 g, 0.02025 mole), 3,4'-ODA (1.3516 g, 0.00675 mole) and NMP (15 g). The mixture was stirred for ~0.5–1 hr to dissolve the diamines. A slurry of ODPA (3.8382 g, 0.0124 mole) and PEPA (7.2600 g, 0.0295 mole) in NMP (10.0 g) was added. Additional NMP (9.1 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of ~99° C. and $T_g$ of 235° C. after curing for 1 hour at 371° C. The powder exhibited a complex melt viscosity of 1.0 poise at 250° C., this viscosity was stable at 250° C. for the duration of the experiment (1 hour). The powder exhibited a complex melt viscosity of 0.75 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was tougher than the moldings fabricated from the material described in Examples 13 and 15.

EXAMPLE 17

Synthesis of a phenylethynyl terminated amide acid and imide co-oligomer with a calculated number average molecular weight of 500 g/mole using 3,3',4,4'-oxydiphthalic dianhydride (ODPA, 0.44 mole), 1,3-bis(3-aminophenoxyphenyl)benzene (1,3-APB, 0.50 mole), 3,4'-oxydianiline (3,4'-ODA, 0.50 mole) and 4-phenylethynylphthalic anhydride (PEPA, 1.115 mole).

Into a 100 mL three neck round bottom flask equipped with a mechanical stirrer, thermometer and nitrogen inlet/outlet was placed 1,3-APB (3.9465 g, 0.0135 mole), 3,4'-ODA (2.7032 g, 0.0135 mole) and NMP (15 g). The mixture was stirred for ~0.5–1 hr to dissolve the diamines. A slurry of ODPA (3.7067 g, 0.0120 mole) and PEPA (7.4704 g, 0.0301 mole) in NMP (10.0 g) was added. Additional NMP (8.1 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of ~113° C. and $T_g$ of 258° C. after curing for 1 hour at 371° C. The powder exhibited a complex melt viscosity of 5 poise at 250° C., this viscosity was stable at 250° C. for the duration of the experiment (1 hour). The powder exhibited a complex melt viscosity of 4 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was tougher than the moldings fabricated from the material described in Examples 13 and 15.

EXAMPLE 18

Synthesis of a phenylethynyl terminated amide acid and imide co-oligomer with a calculated number average molecular weight of 750 g/mole using 3,3',4,4'-oxydiphthalic dianhydride (ODPA, 0.46 mole), 1,3-bis(3-aminophenoxyphenyl)benzene (1,3-APB, 0.50 mole), 3,4'-oxydianiline (3,4'-ODA, 0.50 mole) and 4-phenylethynylphthalic anhydride (PEPA, 1.08 mole).

Into a 100 mL three neck round bottom flask equipped with a mechanical stirrer, thermometer and nitrogen inlet/outlet was placed 1,3-APB (3.9465 g, 0.0135 mole), 3,4'-ODA (2.7032 g, 0.0135 mole) and NMP (15 g). The mixture was stirred for ~0.5–1 hr to dissolve the diamines. A slurry of ODPA (3.8382 g, 0.0123 mole) and PEPA (7.2600 g, 0.029 mole) in NMP (10.0 g) was added. Additional NMP (7.9 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of ~113° C. and $T_g$ of 245° C. after curing for 1 hour at 371° C. The powder exhibited a complex melt viscosity of 5 poise at 250° C., this viscosity was stable at 250° C. for the duration of the experiment (1 hour). The powder exhibited a complex melt viscosity of 4 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was tougher than the moldings fabricated from the material described in Examples 13 and 15.

EXAMPLE 19

Synthesis of a phenylethynyl terminated amide acid and imide co-oligomer with a calculated number average molecular weight of 1000 g/mole using 3,3',4,4'-oxydiphthalic dianhydride (ODPA, 0.55 mole), 1,3-bis(3-aminophenoxyphenyl)benzene (1,3-APB, 0.75 mole), 9,9'-diaminofluorene (FDA, 0.25 mole) and 4-phenylethynylphthalic anhydride (PEPA, 0.90 mole).

Into a 100 mL three neck round bottom flask equipped with a mechanical stirrer, thermometer and nitrogen inlet/outlet was placed 1,3-APB (5.6785, 0.0194 mole), FDA (2.2562 g, 0.00648 mole) and NMP (15 g). The mixture was stirred for ~0.5–1 hr to dissolve the diamines. A slurry of ODPA (4.4193 g, 0.0145 mole) and PEPA (5.7860 g, 0.023 mole) in NMP (10.0 g) was added. Additional NMP (8.7 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of ~140° C. and $T_g$ of 235° C. after curing for 1 hour at 371° C. The powder exhibited a complex melt viscosity of 10 poise at 250° C., this viscosity was stable at 250° C. for the duration of the experiment (1 hour). The powder exhibited a complex melt viscosity of 3 poise at 280° C. A neat resin molding, approximately 1.5 inches in diameter and 25 mils thick, was fabricated by heating the powder in an aluminum pan to 371° C. for 1 hour. Based on a qualitative test of the molding, it was tougher than the moldings fabricated from the material described in Examples 13 and 15.

EXAMPLE 20

Synthesis of a phenylethynyl terminated amide acid and imide co-oligomer with a calculated number average molecular weight of 500 g/mole using 3,3',4,4'-oxydiphthalic dianhydride (ODPA, 0.27 mole), 1,3-bis(3-aminophenoxyphenyl)benzene (1,3-APB, 0.85 mole), 3,5-diamino-4'-phenylethynyl benzophenone (DPEB, 0.15 mole) and 4-phenylethynylphthalic anhydride (PEPA, 1.45 mole).

Into a 100 mL three neck round bottom flask equipped with a mechanical stirrer, thermometer and nitrogen inlet/outlet was placed 1,3-APB (6.4605 g, 0.0221 mole), DPEB (1.2182 g, 0.0039 mole) and NMP (15 g). The mixture was stirred for ~0.5–1 hr to dissolve the diamines. A slurry of ODPA (2.2121 g, 0.0071 mole) and PEPA (9.3670 g, 0.038 mole) in NMP (10.0 g) was added. Additional NMP (11 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of 110° C. and $T_g$ of 276° C. after curing for 1 hour at 371° C. The powder exhibited a complex melt viscosity of 10 poise at 250° C., this viscosity was stable at 250° C. for the duration of the experiment (1 hour). The powder exhibited a complex melt viscosity of 5 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 21

Synthesis of a phenylethynyl terminated amide acid and imide co-oligomer with a calculated number average molecular weight of 750 g/mole using 3,3',4,4'-oxydiphthalic dianhydride (ODPA, 0.45 mole), 1,3-bis(3-aminophenoxyphenyl)benzene (1,3-APB, 0.85 mole), 3,5-diamino-4'-phenylethynyl benzophenone (DPEB, 0.15 mole) and 4-phenylethynylphthalic anhydride (PEPA, 1.10 mole).

Into a 100 mL three neck round bottom flask equipped with a mechanical stirrer, thermometer and nitrogen inlet/outlet was placed 1,3-APB (6.4605 g, 0.0221 mole), DPEB (1.2182 g, 0.0039 mole) and NMP (15 g). The mixture was stirred for ~0.5–1 hr to dissolve the diamines. A slurry of ODPA (3.6259 g, 0.0117 mole) and PEPA (7.1043 g, 0.0286 mole) in NMP (10.0 g) was added. Additional NMP (9.2 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of 110° C. and $T_g$ of 256° C. after curing for 1 hour at 371° C. The powder exhibited a complex melt viscosity of 10 poise at 250° C., this viscosity was stable at 250° C. for the duration of the experiment (1 hour). The powder exhibited a complex melt viscosity of 4 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 22

Synthesis of a phenylethynyl terminated amide acid and imide co-oligomer with a calculated number average molecular weight of 1000 g/mole using 3,3',4,4'-oxydiphthalic dianhydride (ODPA, 0.56 mole), 1,3-bis(3-aminophenoxyphenyl)benzene (1,3-APB, 0.85 mole), 3,5-diamino-4'-phenylethynyl benzophenone (DPEB, 0.15 mole) and 4-phenylethynylphthalic anhydride (PEPA, 0.89 mole).

Into a 100 mL three neck round bottom flask equipped with a mechanical stirrer, thermometer and nitrogen inlet/outlet was placed 1,3-APB (6.4605 g, 0.0221 mole), DPEB (1.2182 g, 0.0039 mole) and NMP (15 g). The mixture was stirred for ~0.5–1 hr to dissolve the diamines. A slurry of ODPA (4.4896 g, 0.0145 mole) and PEPA (5.7219 g, 0.0230 mole) in NMP (10.0 g) was added. Additional NMP (8.2 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of 115° C. and $T_g$ of 242° C. after curing for 1 hour at 371° C. The powder exhibited a complex melt viscosity of 1 poise at 250° C., this viscosity was stable at 250° C. for the duration of the experiment (1 hour). The powder exhibited a complex melt viscosity of 1 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 23

Synthesis of a phenylethynyl terminated amide acid and imide co-oligomer with a calculated number average molecular weight of 1250 g/mole using 3,3',4,4'-oxydiphthalic dianhydride (ODPA, 0.63 mole), 1,3-bis(3-aminophenoxyphenyl)benzene (1,3-APB, 0.85 mole), 3,5-diamino-4'-phenylethynyl benzophenone (DPEB, 0.15 mole) and 4-phenylethynylphthalic anhydride (PEPA, 0.74 mole).

Into a 100 mL three neck round bottom flask equipped with a mechanical stirrer, thermometer and nitrogen inlet/outlet was placed 1,3-APB (6.4605 g, 0.0221 mole), DPEB (1.2182 g, 0.0039 mole) and NMP (15 g). The mixture was stirred for ~0.5–1 hr to dissolve the diamines. A slurry of ODPA (5.0719 g, 0.0163 mole) and PEPA (4.7900 g, 0.0193 mole) in NMP (10.0 g) was added. Additional NMP (7.6 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of 117° C. and $T_g$ of 235° C. after curing for 1 hour at 371° C. The powder exhibited a complex melt viscosity of 10 poise at 250° C., this viscosity was stable at 250° C. for the duration of the experiment (1 hour). The powder exhibited a complex melt viscosity of 4 poise at 280° C. A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 24

Synthesis of a phenylethynyl terminated amide acid and imide co-oligomer with a calculated number average molecular weight of 500 g/mole using 3,3',4,4'-oxydiphthalic dianhydride (ODPA, 0.274 mole), 1,3-bis(3-aminophenoxyphenyl)benzene (1,3-APB, 0.70 mole), 3,4'-oxydianiline (3,4'-ODA, 0.15 mole), 3,5-diamino-4'-phenylethynyl benzophenone (DPEB, 0.15 mole) and 4-phenylethynylphthalic anhydride (PEPA, 1.45 mole).

Into a 100 mL three neck round bottom flask equipped with a mechanical stirrer, thermometer and nitrogen inlet/outlet was placed 1,3-APB (5.5250 g, 0.0189 mole), 3,4'-ODA (0.8110 g, 0.00405 mole), DPEB (1.2651 g, 0.00405 mole) and NMP (15 g). The mixture was stirred for ~0.5–1 hr to dissolve the diamines. A slurry of ODPA (2.3919 g, 0.00771 mole) and PEPA (9.5758 g, 0.0386 mole) in NMP (10 g) was added. Additional NMP (11.3 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of 104° C. and $T_g$ of 283° C. after curing for 1 hour at 371° C. The powder exhibited a complex melt viscosity of 4 poise at 250° C., this viscosity was stable at 250° C. for the duration of the experiment (1 hour). The powder exhibited a complex melt viscosity of 1 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 25

Synthesis of a phenylethynyl terminated amide acid and imide co-oligomer with a calculated number average molecular weight of 750 g/mole using 3,3',4,4'-oxydiphthalic dianhydride (ODPA, 0.46 mole), 1,3-bis(3-aminophenoxyphenyl)benzene (1,3-APB, 0.70 mole), 3,4'-oxydianiline (3,4'-ODA, 0.15 mole), 3,5-diamino-4'-phenylethynyl benzophenone (DPEB, 0.15 mole) and 4-phenylethynylphthalic anhydride (PEPA, 1.08 mole).

Into a 100 mL three neck round bottom flask equipped with a mechanical stirrer, thermometer and nitrogen inlet/outlet was placed 1,3-APB (5.5250 g, 0.0189 mole), 3,4'-ODA (0.8110 g, 0.00405 mole), DPEB (1.2651 g, 0.00405 mole) and NMP (15 g). The mixture was stirred for ~0.5–1 hr to dissolve the diamines. A slurry of ODPA (3.8474 g, 0.0124 mole) and PEPA (7.2462 g, 0.0292 mole) in NMP (10 g) was added. Additional NMP (9.7 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of 107° C. and $T_g$ of 268° C. after curing for 1 hour at 371° C. The powder exhibited a complex melt viscosity of 3 poise at 250° C., this viscosity was stable at 250° C. for the duration of the experiment (1 hour). The powder exhibited a complex melt viscosity of 3 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 26

Synthesis of a phenylethynyl terminated amide acid and imide co-oligomer with a calculated number average molecular weight of 1000 g/mole using 3,3',4,4'- oxydiphthalic dianhydride (ODPA, 0.565 mole), 1,3-bis(3-aminophenoxyphenyl)benzene (1,3-APB, 0.70 mole), 3,4'- oxydianiline (3,4'-ODA, 0.15 mole), 3,5-diamino-4'-phenylethynyl benzophenone (DPEB, 0.15 mole) and 4-phenylethynylphthalic anhydride (PEPA, 0.87 mole).

Into a 100 mL three neck round bottom flask equipped with a mechanical stirrer, thermometer and nitrogen inlet/outlet was placed 1,3-APB (5.5250 g, 0.0189 mole), 3,4'-ODA (0.8110 g, 0.00405 mole), DPEB (1.2651 g, 0.00405 mole) and NMP (15 g). The mixture was stirred for ~0.5–1 hr to dissolve the diamines. A slurry of ODPA (4.7326 g, 0.015 mole) and PEPA (5.8294 g, 0.0235 mole) in NMP (10 g) was added. Additional NMP (8.7 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of 113° C. and $T_g$ of 253° C. after curing for 1 hour at 371° C. The powder exhibited a complex melt viscosity of 2 poise at 250° C., this viscosity was stable at 250° C. for the duration of the experiment (1 hour). The powder exhibited a complex melt viscosity of 2 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 27

Synthesis of a phenylethynyl terminated amide acid and imide co-oligomer with a calculated number average molecular weight of 1250 g/mole using 3,3',4,4'-oxydiphthalic dianhydride (ODPA, 0.636 mole), 1,3-bis(3-aminophenoxyphenyl)benzene (1,3-APB, 0.70 mole), 3,4'-oxydianiline (3,4'-ODA, 0.15 mole), 3,5-diamino-4'-phenylethynyl benzophenone (DPEB, 0.15 mole) and 4-phenylethynylphthalic anhydride (PEPA, 0.73 mole).

Into a 100 mL three neck round bottom flask equipped with a mechanical stirrer, thermometer and nitrogen inlet/outlet was placed 1,3-APB (5.5250 g, 0.0189 mole), 3,4'-ODA (0.8110 g, 0.00405 mole), DPEB (1.2651 g, 0.00405 mole) and NMP (15 g). The mixture was stirred for ~0.5–1 hr to dissolve the diamines. A slurry of ODPA (5.3289 g, 0.0172 mole) and PEPA (4.8750 g, 0.0196 mole) in NMP (10 g) was added. Additional NMP (8.0 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a yellow powder. The powder exhibited an initial $T_g$ of 150° C. and $T_g$ of 241° C. after curing for 1 hour at 371° C. The powder exhibited a complex melt viscosity of 18 poise at 250° C., this viscosity was stable at 250° C. for the duration of the experiment (1 hour). The powder exhibited a complex melt viscosity of 8 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 28

Synthesis of a phenylethynyl terminated amide acid and imide co-oligomer with a calculated number average molecular weight of 500 g/mole using 3,3',4,4'-oxydiphthalic dianhydride (ODPA, 0.249 mole), 1,3-bis(3-aminophenoxyphenyl)benzene (1,3-APB, 0.55 mole), 3,4'-oxydianiline (3,4'-ODA, 0.30 mole), 3,5-diamino-4'-phenylethynyl benzophenone (DPEB, 0.15 mole) and 4-phenylethynylphthalic anhydride (PEPA, 1.50 mole).

Into a 100 mL three neck round bottom flask equipped with a mechanical stirrer, thermometer and nitrogen inlet/outlet was placed 1,3-APB (4.0195 g, 0.0137 mole), 3,4'-ODA (1.5018 g, 0.0075 mole), DPEB (1.1714 g, 0.00375 mole) and NMP (15 g). The mixture was stirred for ~0.5–1 hr to dissolve the diamines. A slurry of ODPA (1.9270 g, 0.00621 mole) and PEPA (9.3269 g, 0.0375 mole) in NMP (10 g) was added. Additional NMP (8.3 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a yellow powder. The powder exhibited an initial $T_g$ of 130° C. and $T_g$ of 308° C. after curing for 1 hour at 371° C. The powder exhibited a complex melt viscosity of 1 poise at 250° C., this viscosity was stable at 250° C. for the duration of the experiment (1 hour). The powder exhibited a complex melt viscosity of 2 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 29

Synthesis of a phenylethynyl terminated amide acid and imide co-oligomer with a calculated number average molecular weight of 750 g/mole using 3,3',4,4'-oxydiphthalic dianhydride (ODPA, 0.423 mole), 1,3-bis(3-aminophenoxyphenyl)benzene (1,3-APB, 0.55 mole), 3,4'-oxydianiline (3,4'-ODA, 0.30 mole), 3,5-diamino-4'-phenylethynyl benzophenone (DPEB, 0.15 mole) and 4-phenylethynylphthalic anhydride (PEPA, 1.15 mole).

Into a 100 mL three neck round bottom flask equipped with a mechanical stirrer, thermometer and nitrogen inlet/outlet was placed 1,3-APB (4.0195 g, 0.0137 mole), 3,4'-ODA (1.5018 g, 0.0075 mole), DPEB (1.1714 g, 0.00375 mole) and NMP (15 g). The mixture was stirred for ~0.5–1 hr to dissolve the diamines. A slurry of ODPA (3.1272 g, 0.010 mole) and PEPA (7.1091 g, 0.0286 mole) in NMP (10 g) was added. Additional NMP (6.4 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a yellow powder. The powder exhibited an initial $T_g$ of 130° C. and $T_g$ of 291° C. after curing for 1 hour at 371° C. The powder exhibited a complex melt viscosity of 2 poise at 250° C., this viscosity was stable at 250° C. for the duration of the experiment (1 hour). The powder exhibited a complex melt viscosity of 2 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 30

Synthesis of a phenylethynyl terminated amide acid and imide co-oligomer with a calculated number average molecular weight of 1000 g/mole using 3,3',4,4'-oxydiphthalic dianhydride (ODPA, 0.5373 mole), 1,3-bis(3-aminophenoxyphenyl)benzene (1,3-APB, 0.55 mole), 3,4'-oxydianiline (3,4'-ODA, 0.30 mole), 3,5-diamino-4'-phenylethynyl benzophenone (DPEB, 0.15 mole) and 4-phenylethynylphthalic anhydride (PEPA, 0.925 mole).

Into a 100 mL three neck round bottom flask equipped with a mechanical stirrer, thermometer and nitrogen inlet/outlet was placed 1,3-APB (4.0195 g, 0.0137 mole), 3,4'-ODA (1.5018 g, 0.0075 mole), DPEB (1.1714 g, 0.00375 mole) and NMP (15 g). The mixture was stirred for ~0.5–1 hr to dissolve the diamines. A slurry of ODPA (4.1665 g, 0.0134 mole) and PEPA (5.7426 g, 0.0231 mole) in NMP (10 g) was added. Additional NMP (0.8 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a yellow powder. The powder exhibited an initial $T_g$ of 135° C. and $T_g$ of 263° C. after curing for 1 hour at 371° C. The powder exhibited a complex melt viscosity of 8 poise at 250° C., this viscosity was stable at 250° C. for the duration of the experiment (1 hour). The powder exhibited a complex melt viscosity of 4 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 31

Synthesis of a phenylethynyl terminated amide acid and imide co-oligomer with a calculated number average molecular weight of 1250 g/mole using 3,3',4,4'-oxydiphthalic dianhydride (ODPA, 0.612 mole), 1,3-bis(3-aminophenoxyphenyl)benzene (1,3-APB, 0.55 mole), 3,4'-oxydianiline (3,4'-ODA, 0.30 mole), 3,5-diamino-4'-phenylethynyl benzophenone (DPEB, 0.15 mole) and 4-phenylethynylphthalic anhydride (PEPA, 0.776 mole).

Into a 100 mL three neck round bottom flask equipped with a mechanical stirrer, thermometer and nitrogen inlet/outlet was placed 1,3-APB (4.0195 g, 0.0137 mole), 3,4'-ODA (1.5018 g, 0.0075 mole), DPEB (1.1714 g, 0.00375 mole) and NMP (15 g). The mixture was stirred for ~0.5–1 hr to dissolve the diamines. A slurry of ODPA (4.7450 g, 0.0153 mole) and PEPA (4.8167 g, 0.0194 mole) in NMP (5 g) was added. Additional NMP (10.2 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a yellow powder. The powder exhibited an initial $T_g$ of 135° C. and $T_g$ of 260° C. after curing for 1 hour at 371° C. The powder exhibited a complex melt viscosity of 10 poise at 250° C., this viscosity was stable at 250° C. for the duration of the experiment (1 hour). The powder exhibited a complex melt viscosity of 6 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 32

Synthesis of a phenylethynyl terminated amide acid and imide co-oligomer with a calculated number average molecular weight of 500 g/mole using 3,3',4,4'-biphenyltetracarboxylic dianhydride (BPDA, 0.3093 mole), 1,3-bis(3-aminophenoxyphenyl)benzene (1,3-APB, 0.75 mole), 3,4'-oxydianiline (3,4'-ODA, 0.25 mole) and 4-phenylethynylphthalic anhydride (PEPA, 1.3814 mole).

Into a 100 mL three neck round bottom flask equipped with a mechanical stirrer, thermometer and nitrogen inlet/outlet was placed 1,3-APB (4.5116 g, 0.0154 mole), 3,4'-ODA (1.0301 g, 0.0051 mole), BPDA (1.8726 g, 0.0064 mole) and PEPA (7.0562 g, 0.0284 mole). N-methyl-2-pyrrolidinone (NMP, 54 mL) was used to rinse in all of the reactants to afford a solids content of 49.6%. Upon addition of NMP, the reaction temperature increased slightly. The mixture was stirred overnight under nitrogen (all solids had dissolved at this point). An aliquot was removed for GPC analysis. Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of an orange glass. The glassy material was pulverized using a mortar and pestle to give a yellow powder. The powder exhibited an initial $T_g$ of 88° C. and $T_g$ of 269° C. after curing for 1 hour at 371° C. The powder exhibited a complex melt viscosity of 3 poise at 250° C., this viscosity was stable at 250° C. for the duration of the experiment (1 hour). The powder exhibited a complex melt viscosity of 1 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 33

Synthesis of a phenylethynyl terminated amide acid and imide co-oligomer with a calculated number average molecular weight of 500 g/mole using 3,3',4,4'-hexafluoroisopropylidyldiphthalic dianhydride (6-FDA, 0.1825 mole), 1,3-bis(3-aminophenoxyphenyl)benzene (1,3-APB, 0.9 mole), 3,4'-oxydianiline (3,4'-ODA, 0.1 mole) and 4-phenylethynylphthalic anhydride (PEPA, 1.6350 mole).

Into a 100 mL three neck round bottom flask equipped with a mechanical stirrer, thermometer and nitrogen inlet/outlet was placed 1,3-APB (5.2626 g, 0.0180 mole), 3,4'-ODA (0.4005 g, 0.0020 mole), 6-FDA (1.6215 g, 0.0036 mole) and PEPA (8.1175 g, 0.0327 mole). N-methyl-2-pyrrolidinone (NMP, 34.5 mL) was used to rinse in all of the reactants to afford a solids content of 30.2%. Upon addition of NMP, the reaction temperature increased slightly. The mixture was stirred overnight under nitrogen (all solids had dissolved at this point). An aliquot was removed for GPC analysis. Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a orange-brown glass. The glassy material was pulverized using a mortar and pestle to give a yellow powder. The powder exhibited an initial $T_g$ of 97° C. and $T_g$ of 270° C. after curing for 1 hour at 371° C. The powder exhibited a complex melt viscosity of 1 poise at 250° C., this viscosity was stable at 250° C. for the duration of the experiment (1 hour). The powder exhibited a complex melt viscosity of 1–4 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 34

Synthesis of a phenylethynyl terminated amide acid and imide co-oligomer with a calculated number average molecular weight of 750 g/mole using 3,3',4,4'-hexafluoroisopropylidyldiphthalic dianhydride (6-FDA, 0.3691 mole), 1,3-bis(3-aminophenoxyphenyl)benzene (1,3-APB, 0.9 mole), 3,4'-oxydianiline (3,4'-ODA, 0.1 mole) and 4-phenylethynylphthalic anhydride (PEPA, 1.2623 mole).

Into a 100 mL three neck round bottom flask equipped with a mechanical stirrer, thermometer and nitrogen inlet/outlet was placed 1,3-APB (5.2347 g, 0.0179 mole), 3,4'-ODA (0.3984 g, 0.0020 mole), 6-FDA (3.2620 g, 0.0073 mole) and PEPA (6.2344 g, 0.0251 mole). N-methyl-2-pyrrolidinone (NMP, 36.0 mL) was used to rinse in all of the reactants to afford a solids content of 28.9%. Upon addition of NMP, the reaction temperature increased slightly. The mixture was stirred overnight under nitrogen (all solids had dissolved at this point). An aliquot was removed for GPC analysis. Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a yellow powder. The powder was pulverized using a mortar and pestle. The powder exhibited an initial $T_g$ of 114° C. and $T_g$ of 247° C. after curing for 1 hour at 371° C. The powder exhibited a complex melt viscosity of 3 poise at 250° C., this viscosity was stable at 250° C. for the duration of the experiment (1 hour). The powder exhibited a complex melt viscosity of 1–2 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 35

Synthesis of a phenylethynyl terminated amide acid and imide co-oligomer with a calculated number average molecular weight of 500 g/mole using 3,3',4,4'-hexafluoroisopropylidyldiphthalic dianhydride (6-FDA, 0.1922 mole), 1,3-bis(3-aminophenoxyphenyl)benzene (1,3-APB, 0.75 mole), 3,4'-oxydianiline (3,4'-ODA, 0.25 mole) and 4-phenylethynylphthalic anhydride (PEPA, 1.6156 mole).

Into a 100 mL three neck round bottom flask equipped with a mechanical stirrer, thermometer and nitrogen inlet/outlet was placed 1,3-APB (1.7033 g, 0.0058 mole), 3,4'-ODA (0.3889 g, 0.0019 mole), 6-FDA (0.6633 g, 0.0015 mole) and PEPA (3.1156 g, 0.0126 mole). N-methyl-2-pyrrolidinone (NMP, 13.2 mL) was used to rinse in all of the reactants to afford a solids content of 30.2%. Upon addition of NMP, the reaction temperature increased slightly. The mixture was stirred overnight under nitrogen (all solids had dissolved at this point). An aliquot was removed for GPC analysis. Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a yellow powder. The powder was pulverized using a mortar and pestle. The powder exhibited an initial $T_g$ of 100° C. and a $T_m$ of 238° C. and $T_g$ of 279° C. after curing for 1 hour at 371° C. The powder exhibited a complex melt viscosity of 1–2 poise at 250° C., this viscosity was stable at 250° C. for the duration of the experiment (1 hour). The powder exhibited a complex melt viscosity of <1 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 36

Synthesis of a phenylethynyl terminated amide acid and imide co-oligomer with a calculated number average molecular weight of 750 g/mole using 3,3',4,4'-hexafluoroisopropylidyldiphthalic dianhydride (6-FDA, 0.3777 mole), 1,3-bis(3-aminophenoxyphenyl)benzene (1,3-APB, 0.75 mole), 3,4'-oxydianiline (3,4'-ODA, 0.25 mole) and 4-phenylethynylphthalic anhydride (PEPA, 1.2446 mole).

Into a 100 mL three neck round bottom flask equipped with a mechanical stirrer, thermometer and nitrogen inlet/outlet was placed 1,3-APB (4.3391 g, 0.0148 mole), 3,4'-ODA (0.9907 g, 0.0049 mole), 6-FDA (3.3206 g, 0.0075 mole) and PEPA (6.1483 g, 0.0248 mole). N-methyl-2-pyrrolidinone (NMP, 33.5 mL) was used to rinse in all of the reactants to afford a solids content of 30.0%. Upon addition of NMP, the reaction temperature increased slightly. The mixture was stirred overnight under nitrogen (all solids had dissolved at this point). Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a yellow powder. The powder was pulverized using a mortar and pestle. The powder exhibited an initial $T_g$ of 117° C. and $T_g$ of 259° C. after curing for 1 hour at 371° C. The powder exhibited a complex melt viscosity of 3–4 poise at 250° C., this viscosity was stable at 250° C. for the duration of the experiment (1 hour). The powder exhibited a complex melt viscosity of 2–6 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 37

Synthesis of a phenylethynyl terminated amide acid and imide co-oligomer with a calculated number average molecular weight of 500 g/mole using 3,3',4,4'-hexafluoroisopropylidyldiphthalic dianhydride (6-FDA, 0.2088 mole), 1,3-bis(3-aminophenoxyphenyl)benzene (1,3-APB, 0.50 mole), 3,4'-oxydianiline (3,4'-ODA, 0.50 mole) and 4-phenylethynylphthalic anhydride (PEPA, 1.5824 mole).

Into a 100 mL three neck round bottom flask equipped with a mechanical stirrer, thermometer and nitrogen inlet/outlet was placed 1,3-APB (2.8143 g, 0.0096 mole), 3,4'-ODA (1.9277 g, 0.0096 mole), 6-FDA (1.7860 g, 0.0046 mole) and PEPA (7.5631 g, 0.0305 mole). N-methyl-2-pyrrolidinone (NMP, 35.0 mL) was used to rinse in all of the reactants to afford a solids content of 28.1%. Upon addition of NMP, the reaction temperature increased slightly. The mixture was stirred overnight under nitrogen (all solids had dissolved at this point). Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a yellow powder. The powder was pulverized using a mortar and pestle. The powder exhibited an initial $T_g$ of 104° C. and $T_m$ of 256° C. and $T_g$ of 305° C. after curing for 1 hour at 371° C. The powder exhibited a complex melt viscosity of 31–63 poise at 250° C., this viscosity was stable at 250° C. for the duration of the experiment (1 hour). The powder exhibited a complex melt viscosity of 1–6 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 38

Synthesis of a phenylethynyl terminated amide acid and imide co-oligomer with a calculated number average molecular weight of 750 g/mole using 3,3',4,4'-hexafluoroisopropylidyldiphthalic dianhydride (6-FDA, 0.3924 mole), 1,3-bis(3-aminophenoxyphenyl)benzene (1,3-APB, 0.5 mole), 3,4'-oxydianiline (3,4'-ODA, 0.5 mole) and 4-phenylethynylphthalic anhydride (PEPA, 1.2152 mole).

Into a 100 mL three neck round bottom flask equipped with a mechanical stirrer, thermometer and nitrogen inlet/outlet was placed 1,3-APB (2.9787 g, 0.0102 mole), 3,4'-ODA (2.0402 g, 0.0102 mole), 6-FDA (3.5523 g, 0.0080 mole) and PEPA (6.1473 g, 0.0248 mole). N-methyl-2-pyrrolidinone (NMP, 33.0 mL) was used to rinse in all of the reactants to afford a solids content of 30.3%. Upon addition of NMP, the reaction temperature increased slightly. The mixture was stirred overnight under nitrogen (all solids had dissolved at this point). An aliquot was removed for GPC analysis. Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a yellow powder. The powder was pulverized using a mortar and pestle. The powder exhibited an initial $T_g$ of 121° C. and $T_g$ of 276° C. after curing for 1 hour at 371° C. The powder exhibited a complex melt viscosity of 8–10 poise at 250° C., this viscosity was stable at 250° C. for the duration of the experiment (1 hour). The powder exhibited a complex melt viscosity of 4–15 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 39

Synthesis of a phenylethynyl terminated amide acid and imide co-oligomer with a calculated number average molecular weight of 750 g/mole using pyromellitic dianhydride (PMDA, 0.5373 mole), 1,3-bis(3-aminophenoxyphenyl) benzene (1,3-APB, 0.75 mole), 3,4'-oxydianiline (3,4'-ODA, 0.25 mole) and 4-phenylethynylphthalic anhydride (PEPA, 0.9254 mole).

Into a 100 mL three neck round bottom flask equipped with a mechanical stirrer, thermometer and nitrogen inlet/outlet was placed 1,3-APB (4.1647 g, 0.0143 mole), 3,4'-ODA (0.9509 g, 0.0047 mole), PMDA (2.2261 g, 0.0102 mole) and PEPA (4.3635 g, 0.0176 mole). N-methyl-2-pyrrolidinone (NMP, 26.5 mL) was used to rinse in all of the reactants to afford a solids content of 30.0%. Upon addition of NMP, the reaction temperature increased slightly. The mixture was stirred overnight under nitrogen (all solids had dissolved at this point). Toluene was then added (75 mL) and the reaction flask was fitted with a Dean Stark trap and reflux condenser. The mixture was heated via an oil bath to 185° C. and held overnight. As the amide acid was cyclized to the imide it precipitated from solution. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a yellow powder. The powder was pulverized using a mortar and pestle. The powder exhibited an initial $T_g$ of 121° C. and $T_g$ of 260° C. after curing for 1 hour at 371° C. The powder exhibited a complex melt viscosity of 19–25 poise at 250° C., this viscosity was stable at 250° C. for the duration of the experiment (1 hour). The powder exhibited a complex melt viscosity of 5–8 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 40

Synthesis of a phenylethynyl terminated amide acid and imide co-oligomer with a calculated number average molecular weight of 1000 g/mole using 3,3',4,4'- hexafluoroisopropylidyldiphthalic dianhydride (6-FDA, 0.5335 mole), 1,3-bis(3-aminophenoxyphenyl)benzene (1,3-APB, 0.5 mole), 1,3-phenylene diamine (mPDA, 0.5 mole) and 4-phenylethynylphthalic anhydride (PEPA, 0.9330 mole).

Into a 100 mL three neck round bottom flask equipped with a mechanical stirrer, thermometer and nitrogen inlet/outlet was placed 1,3-APB (2.6573 g, 0.0091 mole), mPDA (0.9830 g, 0.0091 mole), and N-methyl-2-pyrrolidinone (NMP, 12.0 mL). The mixture was stirred for ~0.5–1 hr to dissolve the diamines. A slurry of 6-FDA (4.3086 g, 0.0097 mole) and PEPA (4.2105 g, 0.0170 mole) in NMP (10.0 mL) was added. Additional NMP (8.5 mL) was used to rinse in all of the anhydrides (27.9% solids w/w). Upon addition of the anhydride/NMP slurry, the reaction temperature increased slightly. The mixture was stirred overnight under nitrogen (all solids had dissolved at this point). An aliquot was removed for GPC analysis. Toluene was then added (80 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a yellow powder. The powder was pulverized using a mortar and pestle. The powder exhibited an initial $T_g$ of 139° C. and $T_g$ of 274° C. after curing for 1 hour at 371° C. The powder exhibited a complex melt viscosity of 13–21 poise at 250° C., this viscosity was stable at 250° C. for the duration of the experiment (1 hour). The powder exhibited a complex melt viscosity of 3–10 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 41

Synthesis of a phenylethynyl terminated amide acid and imide co-oligomer with a calculated number average molecular weight of 1250 g/mole using 3,3',4,4'- hexafluoroisopropylidyldiphthalic dianhydride (6-FDA, 0.6085 mole), 1,3-bis(3-aminophenoxyphenyl)benzene (1,3-APB, 0.5 mole), 1,3-phenylene diamine (mPDA, 0.5 mole) and 4-phenylethynylphthalic anhydride (PEPA, 0.7830 mole).

Into a 100 mL three neck round bottom flask equipped with a mechanical stirrer, thermometer and nitrogen inlet/outlet was placed 1,3-APB (2.7419 g, 0.0094 mole), mPDA (1.0143 g, 0.0094 mole), and N-methyl-2-pyrrolidinone (NMP, 12.0 mL). The mixture was stirred for ~0.5–1 hr to dissolve the diamines. A slurry of 6-FDA (5.0708 g, 0.0114 mole) and PEPA (3.6461 g, 0.0147 mole) in NMP (10.0 mL) was added. Additional NMP (10.2 mL) was used to rinse in all of the anhydrides (27.3% solids w/w). Upon addition of the anhydride/NMP slurry, the reaction temperature increased slightly. The mixture was stirred overnight under nitrogen (all solids had dissolved at this point). An aliquot was removed for GPC analysis. Toluene was then added (80 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a yellow powder. The powder was pulverized using a mortar and pestle. The powder exhibited an initial $T_g$ of 150° C. and $T_g$ of 262° C. after curing for 1 hour at 371° C. The powder exhibited a complex melt viscosity of 31–58 poise at 250° C., this viscosity was stable at 250° C. for the duration of the experiment (1 hour). The powder exhibited a complex melt viscosity of 6–21 poise at 280° C., this viscosity was stable at 280° C. for the duration of the experiment (2 hours).

EXAMPLE 42

Synthesis of a phenylethynyl terminated amide acid and imide co-oligomer with a calculated number average molecular weight of 1250 g/mole using 3,3',4,4'- hexafluoroisopropylidyldiphthalic dianhydride (6-FDA, 0.5554 mole), 1,3-bis(3-aminophenoxyphenyl)benzene (1,3-APB, 0.75 mole), 9,9'-bis(4-aminophenyl)fluorene (FDA, 0.25 mole) and 4-phenylethynylphthalic anhydride (PEPA, 0.8892 mole).

Into a 100 mL three neck round bottom flask equipped with a mechanical stirrer, thermometer and nitrogen inlet/outlet was placed 1,3-APB (3.7816 g, 0.0129 mole), FDA (1.5025 g, 0.0043 mole), and N,N-dimethylacetamide (DMAC, 6.5 mL). The mixture was stirred for ~0.5–1 hr to dissolve the diamines. A slurry of 6-FDA (4.2555 g, 0.0096 mole) and PEPA (3.8071 g, 0.0153 mole) in DMAc (5.0 mL) was added. Additional DMAc (26.8 mL) was used to rinse in all of the anhydrides (30.0% solids w/w). Upon addition of the anhydride/NMP slurry, the reaction temperature increased slightly. The mixture was stirred overnight under nitrogen (all solids had dissolved at this point). Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a yellow powder. The powder was pulverized using a mortar and pestle. The powder exhibited an initial $T_g$ of 147° C. and $T_g$ of 260° C. after curing for 1 hour at 371° C. The powder exhibited a complex melt viscosity of 28–38 poise at 250° C., this viscosity was stable at 250° C. for the duration of the experiment (1 hour). The powder exhibited a complex melt viscosity of 6–52 poise at 280° C., this viscosity was stable at 280° C. for the duration of the experiment (2 hours).

EXAMPLE 43

Synthesis of a phenylethynyl terminated amide acid and imide co-oligomer with a calculated number average molecular weight of 1000 g/mole using 3,3',4,4'-biphenyltetracarboxylic dianhydride (BPDA, 0.5597 mole), 1,3-bis(3-aminophenoxyphenyl)benzene (1,3-APB, 0.75 mole), 9,9'-bis(4-aminophenyl)fluorene (FDA, 0.25 mole) and 4-phenylethynylphthalic anhydride (PEPA, 0.8806 mole).

Into a 100 mL three neck round bottom flask equipped with a mechanical stirrer, thermometer and nitrogen inlet/outlet was placed 1,3-APB (3.9809 g, 0.0136 mole), FDA (1.5817 g, 0.0045 mole), and N-methyl-2-pyrrolidinone (NMP, 4.0 mL). The mixture was stirred for ~0.5–1 hr to dissolve the diamines. A slurry of BPDA (2.9899 g, 0.0102 mole) and PEPA (3.9690 g, 0.0160 mole) in NMP (4.9 mL) was added. Additional NMP (19.3 mL) was used to rinse in all of the anhydrides (30.0% solids w/w). Upon addition of the anhydride/NMP slurry, the reaction temperature increased slightly. The mixture was stirred overnight under nitrogen (all solids had dissolved at this point). Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a yellow powder. The powder was pulverized using a mortar and pestle. The powder exhibited an initial $T_g$ of 150° C. and $T_g$ of 267° C. after curing for 1 hour at 371° C. The powder exhibited a complex melt viscosity of 22–37 poise at 250° C., this viscosity was stable at 250° C. for the duration of the experiment (1 hour). The powder exhibited a complex melt viscosity of 9–30 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 44

Synthesis of a phenylethynyl terminated amide acid and imide co-oligomer with a calculated number average molecular weight of 500 g/mole using 3,3',4,4'-hexafluoroisopropylidyldiphthalic dianhydride (6-FDA, 0.1740 mole), 1,3-bis(3-aminophenoxyphenyl)benzene (1,3-APB, 0.85 mole), 3,5-diamino-4'-phenylethynylbenzophenone (DPEB, 0.15 mole) and 4-phenylethynylphthalic anhydride (PEPA, 1.6520 mole).

Into a 100 mL three neck round bottom flask equipped with a mechanical stirrer, thermometer and nitrogen inlet/outlet was placed 1,3-APB (5.2719 g, 0.0180 mole), DPEB (0.9941 g, 0.0032 mole), 6-FDA (1.6399 g, 0.0037 mole) and PEPA (8.7003 g, 0.0350 mole). N-methyl-2-pyrrolidinone (NMP, 37.5 mL) was used to rinse in all of the reactants to afford a solids content of 30.0%. Upon addition of NMP, the reaction temperature increased slightly. The mixture was stirred overnight under nitrogen (all solids had dissolved at this point). Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of an orange-brown glass. The glassy material was pulverized using a mortar and pestle to give a yellow powder. The powder exhibited an initial $T_g$ of 98° C. and $T_m$ of 196° C. and $T_g$ of 300° C. after curing for 1 hour at 371° C. The powder exhibited a complex melt viscosity of 15 poise at 250° C., this viscosity was stable at 250° C. for the duration of the experiment (1 hour). The powder exhibited a complex melt viscosity of 10 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 45

Synthesis of a phenylethynyl terminated amide acid and imide co-oligomer with a calculated number average molecular weight of 750 g/mole using 3,3',4,4'-hexafluoroisopropylidyldiphthalic dianhydride (6-FDA, 0.3614 mole), 1,3-bis(3-aminophenoxyphenyl)benzene (1,3-APB, 0.85 mole), 3,5-diamino-4'-phenylethynylbenzophenone (DPEB, 0.15 mole) and 4-phenylethynylphthalic anhydride (PEPA, 1.2772 mole).

Into a 100 mL three neck round bottom flask equipped with a mechanical stirrer, thermometer and nitrogen inlet/outlet was placed 1,3-APB (5.0517 g, 0.0173 mole), DPEB (0.9526 g, 0.0030 mole), 6-FDA (3.2639 g, 0.0073 mole) and PEPA (6.4455 g, 0.0260 mole). N-methyl-2-pyrrolidinone (NMP, 35.0 mL) was used to rinse in all of the reactants to afford a solids content of 30.3%. Upon addition of NMP, the reaction temperature increased slightly. The mixture was stirred overnight under nitrogen (all solids had dissolved at this point). Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of an orange-brown powder. The powder exhibited an initial $T_g$ of 112° C. and $T_g$ of 278° C. after curing for 1 hour at 371° C. The powder exhibited a complex melt viscosity of 5 poise at 250° C., this viscosity was stable at 250° C. for the duration of the experiment (1 hour). The powder exhibited a complex melt viscosity of 3 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 46

Synthesis of a phenylethynyl terminated amide acid and imide co-oligomer with a calculated number average molecular weight of 500 g/mole using 3,3',4,4'-hexafluoroisopropylidyldiphthalic dianhydride (6-FDA, 0.1905 mole), 1,3-bis(3-aminophenoxyphenyl)benzene (1,3-APB, 0.55 mole), 3,4'-oxytdianiline (3,4'-ODA, 0.30 mole), 3,5-diamino-4'-phenylethynylbenzophenone (DPEB, 0.15 mole) and 4-phenylethynylphthalic anhydride (PEPA, 1.6190 mole).

Into a 100 mL three neck round bottom flask equipped with a mechanical stirrer, thermometer and nitrogen inlet/outlet was placed 1,3-APB (2.5247 g, 0.0086 mole), 3,4'-ODA (0.9433 g, 0.0047 mole), DPEB (0.7357 g, 0.0024 mole), 6-FDA (1.3288 g, 0.0030 mole) and PEPA (6.3107 g, 0.0254 mole). N-methyl-2-pyrrolidinone (NMP, 27.5 mL) was used to rinse in all of the reactants to afford a solids content of 29.4%. Upon addition of NMP, the reaction temperature increased slightly. The mixture was stirred overnight under nitrogen (all solids had dissolved at this point). An aliquot was removed for GPC analysis. Toluene was then added (80 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a brown glass. The glassy material was pulverized using a mortar and pestle to give a brown powder. The powder exhibited an initial $T_g$ of 99° C. and $T_m$ of 244° C. and $T_g$ of 316° C. after curing for 1 hour at 371° C. The powder exhibited a complex melt viscosity of 1 poise at 250° C., this viscosity was stable at 250° C. for the duration of the experiment (1 hour). The powder exhibited a complex melt viscosity of 1 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 47

Synthesis of a phenylethynyl terminated amide acid and imide co-oligomer with a calculated number average molecular weight of 750 g/mole using 3,3',4,4'- hexafluoroisopropylidyldiphthalic dianhydride (6-FDA, 0.3762 mole), 1,3-bis(3-aminophenoxyphenyl)benzene (1,3-APB, 0.55 mole), 3,4,-oxytdianiline (3,4'-ODA, 0.30 mole), 3,5-diamino-4'-phenylethynylbenzophenone (DPEB, 0.15 mole) and 4-phenylethynylphthalic anhydride (PEPA, 1.2476 mole).

Into a 100 mL three neck round bottom flask equipped with a mechanical stirrer, thermometer and nitrogen inlet/outlet was placed 1,3-APB (2.4993 g, 0.0085 mole), 3,4'-ODA (0.9338 g, 0.0047 mole), DPEB (0.7283 g, 0.0023 mole), 6-FDA (2.5978 g, 0.0058 mole) and PEPA (4.8141 g, 0.0194 mole). N-methyl-2-pyrrolidinone (NMP, 26.5 mL) was used to rinse in all of the reactants to afford a solids content of 29.7%. Upon addition of NMP, the reaction temperature increased slightly. The mixture was stirred overnight under nitrogen (all solids had dissolved at this point). An aliquot was removed for GPC analysis. Toluene was then added (80 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a brown glass. The glassy material was pulverized using a mortar and pestle to give a brown powder. The powder exhibited an initial $T_g$ of 118° C. and $T_g$ of 307° C. after curing for 1 hour at 371° C. The powder exhibited a complex melt viscosity of 4 poise at 250° C., this viscosity was stable at 250° C. for the duration of the experiment (1 hour). The powder exhibited a complex melt viscosity of 9 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 48

Synthesis of a phenylethynyl terminated amide acid and imide co-oligomer with a calculated number average molecular weight of 500 g/mole using 3,3',4,4'-biphenyltetracarboxylic dianhydride (BPDA, 0.2989 mole), 1,3-bis(3-aminophenoxyphenyl)benzene (1,3-APB, 0.70 mole), 3,4'-oxydianiline (3,4'-ODA, 0.15 mole), 3,5-diamino-4'-phenylethynyl benzophenone (DPEB, 0.15 mole) and 4-phenylethynylphthalic anhydride (PEPA, 1.4022 mole).

Into a 100 mL three neck round bottom flask equipped with a mechanical stirrer, thermometer and nitrogen inlet/outlet was placed 1,3-APB (3.6901 g, 0.0126 mole), 3,4'-ODA (0.5416 g, 0.0027 mole), DPEB (0.8449 g, 0.0027 mole), BPDA (1.5858 g, 0.0054 mole) and PEPA (6.2767 g, 0.0253 mole). N-methyl-2-pyrrolidinone (NMP, 29 mL) was used to rinse in all of the reactants to afford a solids content of 30.2%. Upon addition of NMP, the reaction temperature increased slightly. The mixture was stirred overnight under nitrogen (all solids had dissolved at this point). Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~130° C. for ~8 hrs to give a quantitative yield of a tan powder. The powder exhibited an initial $T_g$ of 111° C. and $T_g$ of 307° C. after curing for 1 hour at 371° C. The powder exhibited a complex melt viscosity of 4 poise at 250° C., this viscosity was stable at 250° C. for the duration of the experiment (1 hour). The powder exhibited a complex melt viscosity of 2 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 49

Synthesis of a phenylethynyl terminated amide acid and imide co-oligomer with a calculated number average molecular weight of 500 g/mole using 3,3',4,4'-biphenyltetracarboxylic dianhydride (BPDA, 0.3068 mole), 1,3-bis(3-aminophenoxyphenyl)benzene (1,3-APB, 0.60 mole), 3,4'-oxydianiline (3,4'-ODA, 0.25 mole), 3,5-diamino-4'-phenylethynyl benzophenone (DPEB, 0.15 mole) and 4-phenylethynylphthalic anhydride (PEPA, 1.3864 mole).

Into a 100 mL three neck round bottom flask equipped with a mechanical stirrer, thermometer and nitrogen inlet/outlet was placed 1,3-APB (3.9508 g, 0.0135 mole), 3,4'-ODA (1.1276 g, 0.0056 mole), DPEB (1.0554 g, 0.0034 mole), BPDA (2.0332 g, 0.0069 mole) and PEPA (7.7519 g, 0.0312 mole). N-methyl-2-pyrrolidinone (NMP, 35 mL) was used to rinse in all of the reactants to afford a solids content of 30.2%. Upon addition of NMP, the reaction temperature increased slightly. The mixture was stirred overnight under nitrogen (all solids had dissolved at this point). Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~130° C. for ~8 hrs to give a quantitative yield of a tan powder. The powder exhibited an initial $T_g$ of 116° C. and $T_g$ of 318° C. after curing for 1 hour at 371° C. The powder exhibited a complex melt viscosity of 3 poise at 250° C., this viscosity was stable at 250° C. for the duration of the experiment (1 hour). The powder exhibited a complex melt viscosity of 3 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 50

Synthesis of a phenylethynyl terminated amide acid and imide co-oligomer with a calculated number average molecular weight of 500 g/mole using 3,3',4,4'-biphenyltetracarboxylic dianhydride (BPDA, 0.3147 mole), 1,3-bis(3-aminophenoxyphenyl)benzene (1,3-APB, 0.50 mole), 3,4'-oxydianiline (3,4'-ODA, 0.35 mole), 3,5-diamino-4'-phenylethynyl benzophenone (DPEB, 0.15 mole) and 4-phenylethynylphthalic anhydride (PEPA, 1.3707 mole).

Into a 100 mL three neck round bottom flask equipped with a mechanical stirrer, thermometer and nitrogen inlet/outlet was placed 1,3-APB (2.8781 g, 0.0098 mole), 3,4'-ODA (1.3800 g, 0.0069 mole), DPEB (0.9226 g, 0.0030 mole), BPDA (1.8232 g, 0.0062 mole) and PEPA (6.6999 g, 0.0270 mole). N-methyl-2-pyrrolidinone (NMP, 31 mL) was used to rinse in all of the reactants to afford a solids content of 30.0%. Upon addition of NMP, the reaction temperature increased slightly. The mixture was stirred overnight under nitrogen (all solids had dissolved at this point). Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~130° C. for ~8 hrs to give a quantitative yield of a tan powder. The powder exhibited an initial $T_g$ of 118° C. and $T_m$ of 186° C. and $T_g$ of 330° C. after curing for 1 hour at 371° C. The powder exhibited a complex melt viscosity of 2 poise at 250° C., this viscosity was stable at 250° C. for the duration of the experiment (1 hour). The powder exhibited a complex melt viscosity of 2 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 51

Synthesis of a phenylethynyl terminated amide acid and imide co-oligomer with a calculated number average molecular weight of 500 g/mole using 3,3',4,4'-biphenyltetracarboxylic dianhydride (BPDA, 0.3227 mole), 1,3-bis(3-aminophenoxyphenyl)benzene (1,3-APB, 0.40 mole), 3,4'-oxydianiline (3,4'-ODA, 0.45 mole), 3,5-diamino-4'-phenylethynyl benzophenone (DPEB, 0.15 mole) and 4-phenylethynylphthalic anhydride (PEPA, 1.3546 mole).

Into a 100 mL three neck round bottom flask equipped with a mechanical stirrer, thermometer and nitrogen inlet/outlet was placed 1,3-APB (2.3442 g, 0.0080 mole), 3,4'-ODA (1.8064 g, 0.0090 mole), DPEB (0.9393 g, 0.0030 mole), BPDA (1.9033 g, 0.0065 mole) and PEPA (6.7410 g, 0.0272 mole). N-methyl-2-pyrrolidinone (NMP, 31 mL) was used to rinse in all of the reactants to afford a solids content of 30.0%. Upon addition of NMP, the reaction temperature increased slightly. The mixture was stirred overnight under nitrogen (all solids had dissolved at this point). Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~130° C. for ~8 hrs to give a quantitative yield of a tan powder. The powder exhibited an initial $T_g$ of 121° C. and $T_m$ of 173° C. and $T_g$ of 340° C. after curing for 1 hour at 371° C. The powder exhibited a complex melt viscosity of 7 poise at 250° C., this viscosity was stable at 250° C. for the duration of the experiment (1 hour). The powder exhibited a complex melt viscosity of 5 poise at 280° C., this viscosity was stable at 280° C. for the duration of the experiment (2 hours).

While the invention has been described in terms of its preferred embodiments, those skilled in the art will recognize that the invention can be practiced with modification within the spirit and scope of the appended claims.

EXAMPLE 52

Synthesis of a phenylethynyl terminated amide acid and imide co-oligomer with a calculated number average molecular weight of 500 g/mole using 3,3',4,4'-biphenyltetracarboxylic dianhydride (BPDA, 0.3308 mole), 1,3-bis(3-aminophenoxyphenyl)benzene (1,3-APB, 0.30 mole), 3,4'-oxydianiline (3,4'-ODA, 0.55 mole), 3,5-diamino-4'-phenylethynyl benzophenone (DPEB, 0.15 mole) and 4-phenylethynylphthalic anhydride (PEPA, 1.3385 mole).

Into a 100 mL three neck round bottom flask equipped with a mechanical stirrer, thermometer and nitrogen inlet/outlet was placed 1,3-APB (1.7741 g, 0.0061 mole), 3,4'-ODA (2.2279 g, 0.0111 mole), DPEB (0.9479 g, 0.0030 mole), BPDA (1.9689 g, 0.0067 mole) and PEPA (6.7215 g, 0.0271 mole). N-methyl-2-pyrrolidinone (NMP, 30 mL) was used to rinse in all of the reactants to afford a solids content of 30.6%. Upon addition of NMP, the reaction temperature increased slightly. The mixture was stirred overnight under nitrogen (all solids had dissolved at this point). Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~130° C. for ~8 hrs to give a quantitative yield of a tan powder. The powder exhibited an initial $T_g$ of 111° C. and a $T_g$ of 352° C. after curing for 1 hour at 371° C. The powder exhibited a complex melt viscosity of 7 poise at 250° C., this viscosity was stable at 250° C. for the duration of the experiment (1 hour). The powder exhibited a complex melt viscosity of 10 poise at 280° C., this viscosity was stable at 280° C. for the duration of the experiment (2 hours).

EXAMPLE 53

Synthesis of a phenylethynyl terminated amide acid and imide co-oligomer with a calculated number average molecular weight of 1000 g/mole using 3,3',4,4'- biphenyltetracarboxylic dianhydride (BPDA, 0.5607 mole), 1,3-bis(3-aminophenoxyphenyl)benzene (1,3-APB, 0.65 mole), 9,9-bis(4-aminophenyl)fluorene (FDA, 0.15 mole), 3,5-diamino-4'-phenylethynyl benzophenone (DPEB, 0.20 mole) and 4-phenylethynylphthalic anhydride (PEPA, 0.8786 mole).

Into a 100 mL three neck round bottom flask equipped with a mechanical stirrer, thermometer and nitrogen inlet/outlet was placed 1,3-APB (4.0091 g, 0.0137 mole), FDA (1.1027 g, 0.0032 mole), DPEB (1.3181 g, 0.0042 mole), and 15 mL N-methyl-2-pyrrolidinone (NMP). Once dissolved, a slurry of BPDA (3.4806 g, 0.0118 mole) and PEPA (4.6016 g, 0.0185 mole) in 10 mL of NMP was added and rinsed in with an additional 7 mL of NMP to afford a solids content of 30.6%. The mixture was stirred overnight under nitrogen (all solids had dissolved at this point). Toluene was then added (50 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~140° C. for ~8 hrs to give a quantitative yield of a tan powder. The powder exhibited an initial $T_g$ of 142° C. and $T_m$ of 193° C. and a $T_g$ of 305° C. after curing for 1 hour at 371° C. The powder exhibited a complex melt viscosity of 40 poise at 250° C., this viscosity was stable at 250° C. for the duration of the experiment (1 hour). The powder exhibited a complex melt viscosity of 35 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 54

Synthesis of a phenylethynyl terminated amide acid and imide co-oligomer with a calculated number average molecular weight of 1000 g/mole using 3,3',4,4'-biphenyltetracarboxylic dianhydride (BPDA, 0.5624 mole), 1,3-bis(3-aminophenoxyphenyl)benzene (1,3-APB, 0.70 mole), 9,9-bis(4-aminophenyl)fluorene (FDA, 0.10 mole), 3,5-diamino-4'-phenylethynyl benzophenone (DPEB, 0.20 mole) and 4-phenylethynylphthalic anhydride (PEPA, 0.8752 mole).

Into a 100 mL three neck round bottom flask equipped with a mechanical stirrer, thermometer and nitrogen inlet/outlet was placed 1,3-APB (4.3158 g, 0.0148 mole), FDA (0.7349 g, 0.0021 mole), DPEB (1.3176 g, 0.0042 mole), and 15 mL N-methyl-2-pyrrolidinone (NMP). Once dissolved, a slurry of BPDA (3.4898 g, 0.0119 mole) and PEPA (4.5820 g, 0.0185 mole) in 10 mL of NMP was added and rinsed in with an additional 7 mL of NMP to afford a solids content of 30.4%. The mixture was stirred overnight under nitrogen (all solids had dissolved at this point). Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~130° C. for ~8 hrs to give a quantitative yield of a tan powder. The powder exhibited an initial $T_g$ of 146° C. and $T_m$ of 199° C. and a $T_g$ of 296° C. after curing for 1 hour at 371° C. The powder exhibited a complex melt viscosity of 25 poise at 250° C., this viscosity was stable at 250° C. for the duration of the experiment (1 hour). The powder exhibited a complex melt viscosity of 15 poise at 280° C., this viscosity was stable at 280° C. for the duration of the experiment (2 hours).

EXAMPLE 55

Synthesis of a phenylethynyl terminated amide acid and imide co-oligomer with a calculated number average molecular weight of 1000 g/mole using 3,3',4,4'-biphenyltetracarboxylic dianhydride (BPDA, 0.5552 mole), 1,3-bis(3-aminophenoxyphenyl)benzene (1,3-APB, 0.52 mole), 9,9-bis(4-aminophenyl)fluorene (FDA, 0.33 mole), 3,5-diamino-4'-phenylethynyl benzophenone (DPEB, 0.15 mole) and 4-phenylethynylphthalic anhydride (PEPA, 0.8896 mole).

Into a 100 mL three neck round bottom flask equipped with a mechanical stirrer, thermometer and nitrogen inlet/outlet was placed 1,3-APB (2.8263 g, 0.0097 mole), FDA (2.1379 g, 0.0061 mole), DPEB (0.8712 g, 0.0028 mole), and 10 mL N-methyl-2-pyrrolidinone (NMP). Once dissolved, a slurry of BPDA (3.0371 g, 0.0103 mole) and PEPA (4.1058 g, 0.0165 mole) in 9 mL of NMP was added and rinsed in with an additional 10 mL of NMP to afford a solids content of 30.2%. The mixture was stirred overnight under nitrogen (all solids had dissolved at this point). Toluene was then added (60 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~130° C. for ~8 hrs to give a quantitative yield of a tan powder. The powder exhibited an initial $T_g$ of 162° C. and $T_m$ of 210° C. and a $T_g$ of 326° C. after curing for 1 hour at 371° C. The powder exhibited a complex melt viscosity of 185 poise at 250° C., this viscosity was stable at 250° C. for the duration of the experiment (1 hour). The powder exhibited a complex melt viscosity of 40 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 56

Synthesis of a phenylethynyl pendent and terminated amide acid and imide co-oligomer with a calculated number average molecular weight of 1200 g/mole using 3,3',4,4'-biphenyltetracarboxylic dianhydride (BPDA, 0.616 mole), 1,3-bis(3-aminophenoxyphenyl)benzene (1,3-APB, 0.50 mole), 3,5-diamino-4'-phenylethynyl benzophenone (DPEB, 0.50 mole), 4-phenylethynylphthalic anhydride (PEPA, 0.384 mole) and phthalic anhydride (PA, 0.384 mole).

Into a 100 mL three neck round bottom flask equipped with a mechanical stirrer, thermometer and nitrogen inlet/outlet was placed 1,3-APB (2.9234 g, 0.010 mole), DPEB (3.1236 g, 0.010 mole), and 10 g of N-methyl-2-pyrrolidinone (NMP). Once dissolved, a slurry of BPDA (3.6248 g, 0.01232 mole), PEPA (1.9065 g, 0.00768 mole) and PA (1.1375 g, 0.00768 mole) in 10.7 g of NMP was added and rinsed in with an additional 2 g of NMP to afford a solids content of 35%. The mixture was stirred overnight under nitrogen (all solids had dissolved at this point). Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~130° C. for ~8 hrs to give a quantitative yield of a tan powder. The powder exhibited an initial $T_g$ of 168° C. and a $T_g$ of 287° C. after curing for 1 hour at 371° C. The powder exhibited a complex melt viscosity of 30–40 poise at 280–290° C. A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 57

Synthesis of a phenylethynyl terminated amide acid and imide co-oligomer with a calculated number average molecular weight of 1250 g/mole using 4,4'-biphenoxydiphthalic anhydride (BPODA, 0.57 mole), 1,3-bis(3-aminophenoxyphenyl)benzene (1,3-APB, 0.75 mole), 1,3-diaminobenzene (PDA, 0.25 mole) and 4-phenylethynylphthalic anhydride (PEPA, 0.86 mole).

Into a 100 mL three neck round bottom flask equipped with a mechanical stirrer, thermometer and nitrogen inlet/outlet was placed 1,3-APB (4.8236 g, 0.0165 mole), PDA (0.5948 g, 0.0055 mole), and 10 g of N-methyl-2-pyrrolidinone (NMP). Once dissolved, a slurry of BPODA (5.9990 g, 0.01254 mole) and PEPA (4.6967 g, 0.01892 mole) in 10.1 g of NMP was added and rinsed in with an additional 8 g of NMP to afford a solids content of 35%. The mixture was stirred overnight under nitrogen (all solids had dissolved at this point). Toluene was then added (60 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~130° C. for ~8 hrs to give a quantitative yield of a tan powder. The powder exhibited an initial $T_g$ of 135° C. and a $T_g$ of 238° C. after curing for 1 hour at 371° C. The powder exhibited a complex melt viscosity of 30–40 poise at 280–290° C. A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 58

Synthesis of a phenylethynyl terminated amide acid and imide co-oligomer with a calculated number average molecular weight of 1250 g/mole using 3,3',4,4'-biphenyltetracarboxylic dianhydride (BPDA, 0.6499 mole), 1,3-bis(3-aminophenoxyphenyl)benzene (1,3-APB, 0.60 mole), 3,4'-oxydianiline (3,4'-ODA, 0.25 mole), 3,5-diamino-4'-phenylethynyl benzophenone (DPEB, 0.15 mole) and 4-phenylethynylphthalic anhydride (PEPA, 0.7002 mole).

Into a 100 mL three neck round bottom flask equipped with a mechanical stirrer, thermometer and nitrogen inlet/outlet was placed 1,3-APB (4.0259 g, 0.0138 mole), 3,4'-ODA (1.1490 g, 0.0057 mole), DPEB (1.0754 g, 0.0034 mole), and 8 mL N-methyl-2-pyrrolidinone (NMP). Once dissolved, a slurry of BPDA (4.3888 g, 0.0149 mole) and PEPA (3.9895 g, 0.0161 mole) in 10 mL of NMP was added and rinsed in with an additional 15 mL of NMP to afford a solids content of 30.0%. The mixture was stirred overnight under nitrogen (all solids had dissolved at this point). Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~140° C. for ~8 hrs to give a quantitative yield of a tan powder. The powder exhibited an initial $T_g$ of 154° C. and $T_m$ of 205 and 237° C. and a $T_g$ of 276° C. after curing for 1 hour at 371° C. The powder exhibited a complex melt viscosity of 50 poise at 250° C. and 25 poise at 280° C. A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 59

Synthesis of a phenylethynyl terminated amide acid and imide co-oligomer with a calculated number average molecular weight of 750 g/mole using 3,3',4,4'-tetracarboxylic dianhydride (BPDA, 0.496 mole), 1,3-bis(3-aminophenoxyphenyl)benzene (1,3-APB, 0.75 mole), 1,3-diaminobenzene (1,3-DAB, 0.25 mole) and 4-phenylethynylphthalic anhydride (PEPA, 1.008 mole).

Into a 100 mL three neck round bottom flask equipped with a mechanical stirrer, thermometer and nitrogen inlet/outlet was placed 1,3-APB (3.6834 g, 0.0126 mole), 1,3-DAB (0.4542 g, 0.0042 mole) and NMP (5.0 g). The mixture was stirred for ~0.5–1 hr to dissolve the diamines. A slurry of BPDA (2.4516 g, 0.0083 mole) and PEPA (4.2037 g, 0.01693 mole) in NMP (5.0 g) was added. Additional NMP (6.86 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (20 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 120° C. for ~8 hrs to give a quantitative yield of a yellow powder. The powder exhibited an initial $T_g$ of ~138° C. and $T_g$ of 264° C. after curing for 1 hour at 371° C. The powder exhibited a complex melt viscosity of 1–2 poise at 250° C., this viscosity was stable at 250° C. for the duration of the experiment (1 hour). The powder exhibited a complex melt viscosity of ~0.5–1 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 60

Synthesis of a phenylethynyl terminated amide acid and imide co-oligomer with a calculated number average molecular weight of 1250 g/mole using 3,3',4,4'-tetracarboxylic dianhydride (BPDA, 0.664 mole), 1,3-bis(3-aminophenoxyphenyl)benzene (1,3-APB, 0.75 mole), 1,3-diaminobenzene (1,3-DAB, 0.25 mole) and 4-phenylethynylphthalic anhydride (PEPA, 0.672 mole).

Into a 100 mL three neck round bottom flask equipped with a mechanical stirrer, thermometer and nitrogen inlet/outlet was placed 1,3-APB (3.6834 g, 0.0126 mole), 1,3-DAB (0.4542 g, 0.0042 mole) and NMP (5.0 g). The mixture was stirred for ~0.5–1 hr to dissolve the diamines. A slurry of BPDA (3.2821 g, 0.01115 mole) and PEPA (2.8025 g, 0.01129 mole) in NMP (5.0 g) was added. Additional NMP (6.86 g) was used to rinse in all of the anhydrides (35.0% solids w/w). Upon addition of the anhydride/NMP slurry, the reaction temperature increased slightly. The mixture was stirred overnight under nitrogen (all solids had dissolved at this point). Toluene was added (20 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a yellow powder. The powder exhibited an initial $T_g$ of ~143° C. and $T_g$ of 247° C. after curing for 1 hour at 371° C. The powder exhibited a complex melt viscosity of 4–5 poise at 250° C., this viscosity was stable at 250° C. for the duration of the experiment (1 hour). The powder exhibited a complex melt viscosity of 2–4 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough. Based on a qualitative test of the molding, it was tougher than the molding fabricated from the material described in Example 1.

EXAMPLE 61

Synthesis of a phenylethynyl terminated amide acid and imide co-oligomer with a calculated number average molecular weight of 1500 g/mole using 3,3',4,4'-tetracarboxylic dianhydride (BPDA, 0.721 mole), 1,3-bis(3-aminophenoxyphenyl)benzene (1,3-APB, 0.75 mole), 1,3-diaminobenzene (1,3-DAB, 0.25 mole) and 4-phenylethynylphthalic anhydride (PEPA, 0.576 mole).

Into a 100 mL three neck round bottom flask equipped with a mechanical stirrer, thermometer and nitrogen inlet/outlet was placed 1,3-APB (3.6834 g, 0.0126 mole), 1,3-DAB (0.4542 g, 0.0042 mole) and NMP (10.0 g). The mixture was stirred for ~0.5–1 hr to dissolve the diamines. A slurry of BPDA (3.5193 g, 0.01196 mole) and PEPA (2.4021 g, 0.00967 mole) in NMP (10.0 g) was added. Additional NMP (7.24 g) was used to rinse in all of the anhydrides (25.0% solids w/w). Upon addition of the anhydride/NMP slurry, the reaction temperature increased slightly. The mixture was stirred overnight under nitrogen (all solids had dissolved at this point). Toluene was added (20 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a yellow powder. The powder exhibited an initial $T_g$ of ~146° C. and $T_g$ of 241° C. after curing for 1 hour at 371° C. The powder exhibited a complex melt viscosity of 200–250 poise at 250° C., this viscosity was stable at 250° C. for the duration of the experiment (1 hour). The powder exhibited a complex melt viscosity of 15–30 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371°C. for 1 hour. Based on a qualitative test of the molding, it was moderately tough. Based on a qualitative test of the molding, it was tougher than either of the moldings fabricated from the material described in Examples 1 and 2.

EXAMPLE 62

Synthesis of a phenylethynyl terminated amide acid and imide co-oligomer with a calculated number average molecular weight of 750 g/mole using 3,3',4,4'-tetracarboxylic dianhydride (BPDA, 0.519 mole), 1,3-bis(3-aminophenoxyphenyl)benzene (1,3-APB, 0.60 mole), 1,3-diaminobenzene (1,3-DAB, 0.40 mole) and 4-phenylethynylphthalic anhydride (PEPA, 0.962 mole).

Into a 100 niL three neck round bottom flask equipped with a mechanical stirrer, thermometer and nitrogen inlet/outlet was placed 1,3-APB (2.9467 g, 0.01008 mole), 1,3-DAB (0.7267 g, 0.00672 mole) and NMP (8.0 g). The mixture was stirred for ~0.5–1 hr to dissolve the diamines. A slurry of BPDA (2.5654 g, 0.00872 mole) and PEPA (4.0119 g, 0.0162 mole) in NMP (8.0 g) was added. Additional NMP (4.03 g) was used to rinse in all of the anhydrides (30.0% solids w/w). Upon addition of the anhydride/NMP slurry, the reaction temperature increased slightly. The mixture was stirred overnight under nitrogen (all solids had dissolved at this point). Toluene was added (20 mL) and the reaction flask was fitted with a Dean Stark trap and reflux condenser. The mixture was heated via an oil bath to 185°

C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 110° C. for ~8 hrs to give a quantitative yield of a yellow powder. The powder exhibited an initial $T_g$ of ~125° C. and $T_g$ of 260° C. after curing for 1 hour at 371° C. The powder exhibited a complex melt viscosity of 1–3 poise at 250° C., this viscosity was stable at 250° C. for the duration of the experiment (1 hour). The powder exhibited a complex melt viscosity of 2–4 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough. Based on a qualitative test of the molding, it exhibited toughness comparable to that of the molding fabricated from the material described in Example 1.

EXAMPLE 63

Synthesis of a phenylethynyl terminated amide acid and imide co-oligomer with a calculated number average molecular weight of 1250 g/mole using 3,3',4,4'-tetracarboxylic dianhydride (BPDA, 0.68 mole), 1,3-bis(3-aminophenoxyphenyl)benzene (1,3-APB, 0.60 mole), 1,3-diaminobenzene (1,3-DAB, 0.40 mole) and 4-phenylethynylphthalic anhydride (PEPA, 0. 64 mole).

Into a 100 mL three neck round bottom flask equipped with a mechanical stirrer, thermometer and nitrogen inlet/outlet was placed 1,3-APB (2.9467 g, 0.01008 mole), 1,3-DAB (0.7267 g, 0.00672 mole) and NMP (8.0 g). The mixture was stirred for ~0.5–1 hr to dissolve the diamines. A slurry of BPDA (3.3612 g, 0.0114 mole) and PEPA (2.6690 g, 0.01075 mole) in NMP (8.0 g) was added. Additional NMP (4.03 g) was used to rinse in all of the anhydrides (30.0% solids w/w). Upon addition of the anhydride/NMP slurry, the reaction temperature increased slightly. The mixture was stirred overnight under nitrogen (all solids had dissolved at this point). Toluene was added (20 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 110° C. for ~8 hrs to give a quantitative yield of a yellow powder. The powder exhibited an initial $T_g$ of ~149° C. and $T_g$ of 244° C. after curing for 1 hour at 371° C. The powder exhibited a complex melt viscosity of 3–5 poise at 250° C., this viscosity was stable at 250° C. for the duration of the experiment (1 hour). The powder exhibited a complex melt viscosity of 2–4 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough. Based on a qualitative test of the molding, it was tougher than the molding fabricated from the material described in Example 4.

EXAMPLE 64

Synthesis of a phenylethynyl terminated amide acid and imide co-oligomer with a calculated number average molecular weight of 500 g/mole using 3,3',4,4'-tetracarboxylic dianhydride (BPDA, 0.33 mole), 1,3-bis(3-aminophenoxyphenyl)benzene (1,3-APB, 0.60 mole), 1,3-diaminobenzene (1,3-DAB, 0.25 mole), 3,5-diamino-4'-phenylethynyl benzophenone (DPEB, 0.15 mole) and 4-phenylethynylphthalic anhydride (PEPA, 1.34 mole).

Into a 100 mL three neck round bottom flask equipped with a mechanical stirrer, thermometer and nitrogen inlet/outlet was placed 1,3-APB (2.7713 g, 0.00948 mole), DAB (0.4272 g, 0.00395 mole), DPEB (0.07403 g, 0.00024 mole) and NMP (10 g). The mixture was stirred for ~0.5–1 hr to dissolve the diamines. A slurry of BPDA (1.5201 g, 0.0052 mole) and PEPA (5.2792 g, 0.0213 mole) in NMP (10.0 g) was added. Additional NMP (5.77 g) was used to rinse in all of the anhydrides (25.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of 108° C. and $T_g$ of 325° C. after curing for 1 hour at 371° C. The powder exhibited a complex melt viscosity of 1–2 poise at 250° C., this viscosity was stable at 250° C. for the duration of the experiment (1 hour). The powder exhibited a complex melt viscosity 1–2 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 65

Synthesis of a phenylethynyl terminated amide acid and imide co-oligomer with a calculated number average molecular weight of 750 g/mole using 3,3',4,4'-tetracarboxylic dianhydride (BPDA, 0.494 mole), 1,3-bis(3-aminophenoxyphenyl)benzene (1,3-APB, 0.60 mole), 1,3-diaminobenzene (1,3-DAB, 0.25 mole), 3,5-diamino-4'-phenylethynyl benzophenone (DPEB, 0.15 mole) and 4-phenylethynylphthalic anhydride (PEPA, 1.012 mole).

Into a 100 mL three neck round bottom flask equipped with a mechanical stirrer, thermometer and nitrogen inlet/outlet was placed 1,3-APB (2.7713 g, 0.00948 mole), DAB (0.4272 g, 0.00395 mole), DPEB (0.07403 g, 0.00024 mole) and NMP (10 g). The mixture was stirred for ~0.5–1 hr to dissolve the diamines. A slurry of BPDA (2.2964 g, 0.0078 mole) and PEPA (3.9692 g, 0.0159 mole) in NMP (10.0 g) was added. Additional NMP (5.77 g) was used to rinse in all of the anhydrides (25.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of 130° C. and $T_g$ of 303° C. after curing for 1 hour at 371° C. The powder exhibited a complex melt viscosity of 80–200 poise at 250° C., this viscosity was stable at 250° C. for the duration of the experiment (1 hour). The powder exhibited a complex melt viscosity of 20–100 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 66

Synthesis of a phenylethynyl terminated amide acid and imide co-oligomer with a calculated number average molecular weight of 1250 g/mole using 3,3',4,4'- tetracarboxylic dianhydride (BPDA, 0.66 mole), 1,3-bis(3-aminophenoxyphenyl)benzene (1,3-APB, 0.60 mole), 1,3-diaminobenzene (1,3-DAB, 0.25 mole), 3,5-diamino-4'-phenylethynyl benzophenone (DPEB, 0.15 mole) and 4-phenylethynylphthalic anhydride (PEPA, 0.68 mole).

Into a 100 mL three neck round bottom flask equipped with a mechanical stirrer, thermometer and nitrogen inlet/outlet was placed 1,3-APB (2.7713 g, 0.00948 mole), DAB (0.4272 g, 0.00395 mole), DPEB (0.07403 g, 0.00024 mole) and NMP (10 g). The mixture was stirred for ~0.5–1 hr to dissolve the diamines. A slurry of BPDA (3.0820 g, 0.0105 mole) and PEPA (2.6435 g, 0.01065 mole) in NMP (10.0 g) was added. Additional NMP (5.77 g) was used to rinse in all of the anhydrides (25.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a yellow powder. The powder exhibited an initial $T_g$ of 149° C. and $T_g$ of 290° C. after curing for 1 hour at 371° C. The powder exhibited a complex melt viscosity of 100–300 poise at 250° C., this viscosity was stable at 250° C. for the duration of the experiment (1 hour). The powder exhibited a complex melt viscosity of 40–100 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was moderately tough.

EXAMPLE 67

Synthesis of a phenylethynyl terminated amide acid and imide co-oligomer with a calculated number average molecular weight of 500 g/mole using 3,3',4,4'-tetracarboxylic dianhydride (BPDA, 0.343 mole), 1,3-bis(3-aminophenoxyphenyl)benzene (1,3-APB, 0.50 mole), 1,3-diaminobenzene (1,3-DAB, 0.35 mole), 3,5-diamino-4'-phenylethynyl benzophenone (DPEB, 0.15 mole) and 4-phenylethynylphthalic anhydride (PEPA, 1.314 mole).

Into a 100 mL three neck round bottom flask equipped with a mechanical stirrer, thermometer and nitrogen inlet/outlet was placed 1,3-APB (2.3913 g, 0.0082 mole), DPEB (0.7666 g, 0.00245 mole) and NMP (5.0 g). The mixture was stirred for ~0.5–1 hr to dissolve the diamines. A slurry of BPPA (1.6510 g, 0.0056 mole) and PEPA (5.3363 g, 0.0215 mole) in NMP (10.0 g) was added. Additional NMP (5.04) was used to rinse in all of the anhydrides (30.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of 111° C. and $T_g$ of 342° C. after curing for 1 hour at 371° C. The powder exhibited a complex melt viscosity of 60–80 poise at 250° C., this viscosity was stable at 250° C. for the duration of the experiment (1 hour). The powder exhibited a complex melt viscosity of 1–10 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it was the least tough.

EXAMPLE 68

Synthesis of a phenylethynyl terminated amide acid and imide co-oligomer with a calculated number average molecular weight of 500 g/mole using 3,3',4,4'-tetracarboxylic dianhydride (BPDA, 0.36 mole), 1,3-bis(3-aminophenoxyphenyl)benzene (1,3-APB, 0.40 mole), 1,3- diaminobenzene (1,3-DAB, 0.45 mole), 3,5-diamino-4'-phenylethynyl benzophenone (DPEB, 0.15 mole) and 4-phenylethynylphthalic anhydride (PEPA, 1.28 mole).

Into a 100 mL three neck round bottom flask equipped with a mechanical stirrer, thermometer and nitrogen inlet/outlet was placed 1,3-APB (1.9130 g, 0.0065 mole), DPEB (0.7666 g, 0.00245 mole) and NMP (5.0 g). The mixture was stirred for ~0.5–1 hr to dissolve the diamines. A slurry of BPPA (1.7328 g, 0.0059 mole) and PEPA (5.1982 g, 0.0209 mole) in NMP (10.0 g) was added. Additional NMP (4.34 g) was used to rinse in all of the anhydrides (30.0% solids w/w). Upon addition of the anhydride/NMP slurry, the reaction temperature increased slightly. The mixture was stirred overnight under nitrogen (all solids had dissolved at this point). Toluene was added (40 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was filtered through a coarse porosity sintered glass funnel and poured into water in a blender. The solid was isolated by filtration, washed in warm water (by placing in a large beaker and stirring) three times. The solid was allowed to air dry overnight. The solid was further dried in a forced air oven at 125° C. for ~8 hrs to give a quantitative yield of a brown glass. The glassy material was pulverized using a mortar and pestle to give a yellow powder. The powder exhibited an initial $T_g$ of 119° C. and $T_g$ of 354° C. after curing for 1 hour at 371° C. The powder exhibited a complex melt viscosity of 300–400 poise at 250° C., this viscosity was stable at 250° C. for the duration of the experiment (1 hour). The powder exhibited a complex melt viscosity of 100–200 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour. Based on a qualitative test of the molding, it exhibited comparable toughness to that of the molding prepared from the material described in Example 4.

EXAMPLE 69

Synthesis of a phenylethynyl terminated amide acid and imide co-oligomer with a calculated number average molecular weight of 500 g/mole using 3,3',4,4'-hexafluoroisopropylidyldiphthalic dianhydride (6-FDA, 0.1836 mole), 1,3-bis(3-aminophenoxyphenyl)benzene (1,3-APB, 0.70 mole), 3,4'-oxytdianiline (3,4'-ODA, 0.15 mole), 3,5-diamino-4'-phenylethynylbenzophenone (DPEB, 0.15 mole) and 4-phenylethynylphthalic anhydride (PEPA, 1.6328 mole).

Into a 100 mL three neck round bottom flask equipped with a mechanical stirrer, thermometer and nitrogen inlet/outlet was placed 1,3-APB (5.2142 g, 0.0178 mole), 3,4'-ODA (0.7653 g, 0.0038 mole), DPEB (1.1939 g, 0.0038 mole), 6-FDA (2.0782 g, 0.0047 mole) and PEPA (10.3278 g, 0.0416 mole). N-methyl-2-pyrrolidinone (NMP, 44.0 mL) was used to rinse in all of the reactants to afford a solids content of 30.1%. Upon addition of NMP, the reaction temperature increased slightly. The mixture was stirred overnight under nitrogen (all solids had dissolved at this point). Toluene was then added (80 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of an orange-brown glass. The glassy material was pulverized using a mortar and pestle to give a brown powder. The powder exhibited an initial $T_g$ of 89° C. and $T_g$ of 313° C. after curing for 1 hour at 371° C. The powder exhibited a complex melt viscosity of 2 poise at 250° C., this viscosity was stable at 250° C. for the duration of the experiment (1 hour). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 70

Synthesis of a phenylethynyl terminated amide acid and imide co-oligomer with a calculated number average molecular weight of 1000 g/mole using 3,3',4,4'-biphenyltetracarboxylic dianhydride (BPDA, 0.5665 mole), 1,3-bis(3-aminophenoxyphenyl)benzene (1,3-APB, 0.85 mole), 3,5-diamino-4'-phenylethynylbenzophenone (DPEB, 0.15 mole) and 4-phenylethynylphthalic anhydride (PEPA, 0.8670 mole).

Into a 100 mL three neck round bottom flask equipped with a mechanical stirrer, thermometer and nitrogen inlet/outlet was placed 1,3-APB (5.0763 g, 0.0173 mole), DPEB (0.9572 g, 0.0031 mole), BPDA (3.4049 g, 0.0116 mole) and PEPA (4.3967 g, 0.0177 mole). N-methyl-2-pyrrolidinone (NMP, 31.0 mL) was used to rinse in all of the reactants to afford a solids content of 30.2%. Upon addition of NMP, the reaction temperature increased slightly. The mixture was stirred overnight under nitrogen (all solids had dissolved at this point). An aliquot was removed for GPC analysis. Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a brown powder. The powder exhibited an initial $T_g$ of 134° C. and $T_g$ of 260° C. after curing for 1 hour at 371° C. The powder exhibited a complex melt viscosity of 55 poise at 250° C., this viscosity was stable at 250° C. for the duration of the experiment (1 hour). The powder exhibited a complex melt viscosity of 11 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 71

Synthesis of a phenylethynyl terminated amide acid and imide co-oligomer with a calculated number average molecular weight of 1250 g/mole using 3,3',4,4'- biphenyltetracarboxylic dianhydride (BPDA, 0.6374 mole), 1,3-bis(3-aminophenoxyphenyl)benzene (1,3-APB, 0.85 mole), 3,5-diamino-4'-phenylethynylbenzophenone (DPEB, 0.15 mole) and 4-phenylethynylphthalic anhydride (PEPA, 0.7252 mole).

Into a 100 mL three neck round bottom flask equipped with a mechanical stirrer, thermometer and nitrogen inlet/outlet was placed 1,3-APB (5.1318 g, 0.0176 mole), DPEB (0.9677 g, 0.0031 mole), BPDA (3.8730 g, 0.0132 mole) and PEPA (3.7178 g, 0.0150 mole). N-methyl-2-pyrrolidinone (NMP, 31.0 mL) was used to rinse in all of the reactants to afford a solids content of 30.0%. Upon addition of NMP, the reaction temperature increased slightly. The mixture was stirred overnight under nitrogen (all solids had dissolved at this point). An aliquot was removed for GPC analysis. Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a brown powder. The powder exhibited an initial $T_g$ of 143° C. and $T_g$ of 255° C. after curing for 1 hour at 371° C. The powder exhibited a complex melt viscosity of 55 poise at 250° C., this viscosity was stable at 250° C. for the duration of the experiment (1 hour). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 72

Synthesis of a phenylethynyl terminated amide acid and imide co-oligomer with a calculated number average molecular weight of 1250 g/mole using 3,3',4,4'- hexafluoroisopropylidyldiphthalic dianhydride (6-FDA, 0.5554 mole), 1,3-bis(3-aminophenoxyphenyl)benzene (1,3-APB, 0.75 mole), 9,9'-bis(4-aminophenyl)fluorene (FDA, 0.25 mole) and 4-phenylethynylphthalic anhydride (PEPA, 0.8892 mole).

Into a 100 mL three neck round bottom flask equipped with a mechanical stirrer, thermometer and nitrogen inlet/outlet was placed 1,3-APB (3.7816 g, 0.0129 mole), FDA (1.5025 g, 0.0043 mole), and N,N-dimethylacetamide (DMAc, 6.5 mL). The mixture was stirred for ~0.5–1 hr to dissolve the diamines. A slurry of 6-FDA (4.2555 g, 0.0096 mole) and PEPA (3.8071 g, 0.0153 mole) in DMAc (5.0 mL) was added. Additional DMAc (26.8 mL) was used to rinse in all of the anhydrides (30.0% solids w/w). Upon addition of the anhydride/NMP slurry, the reaction temperature increased slightly. The mixture was stirred overnight under nitrogen (all solids had dissolved at this point). Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a yellow powder. The powder was pulverized using a mortar and pestle. The powder exhibited an initial $T_g$ of 147° C. and $T_g$ of 260° C. after curing for 1 hour at 371° C. The powder exhibited a complex melt viscosity of 33 poise at 250° C., this viscosity was stable at 250° C. for the duration of the experiment (1 hour). The powder exhibited a complex melt viscosity of 6–52 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 73

Synthesis of a phenylethynyl terminated amide acid and imide co-oligomer with a calculated number average molecular weight of 1250 g/mole using 3,3',4,4'-biphenyltetracarboxylic dianhydride (BPDA, 0.6316 mole), 1,3-bis(3-aminophenoxyphenyl)benzene (1,3-APB, 0.75 mole), 9,9'-bis(4-aminophenyl)fluorene (FDA, 0.25 mole) and 4-phenylethynylphthalic anhydride (PEPA, 0.7368 mole).

Into a 100 mL three neck round bottom flask equipped with a mechanical stirrer, thermometer and nitrogen inlet/outlet was placed 1,3-APB (3.6490 g, 0.0125 mole), FDA (1.4498 g, 0.0042 mole), and N,N-dimethylacetamide (DMAc, 5.0 mL). The mixture was stirred for ~0.5–1 hr to dissolve the diamines. A slurry of BPDA (3.0927 g, 0.0105 mole) and PEPA (3.0440 g, 0.0122 mole) in DMAc (5.0 mL) was added. Additional DMAc (28.0 mL) was used to rinse in all of the anhydrides (30.0% solids w/w). Upon addition of the anhydride/NMP slurry, the reaction temperature increased slightly. The mixture was stirred overnight under nitrogen (all solids had dissolved at this point). Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~130° C. for ~8 hrs to give a quantitative yield of a yellow powder. The powder was pulverized using a mortar and pestle. The powder exhibited an initial $T_g$ of 157° C. and $T_g$ of x° C. after curing for 1 hour at 371° C. The powder exhibited a complex melt viscosity of 65 poise at 250° C., this viscosity was stable at 250° C. for the duration of the experiment (1 hour). The powder exhibited a complex melt viscosity of 11–180 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 74

Synthesis of a phenylethynyl terminated amide acid and imide co-oligomer with a calculated number average molecular weight of 750 g/mole using 3,3',4,4'-biphenyltetracarboxylic dianhydride (BPDA, 0.4701 mole), 1,3-bis(3-aminophenoxyphenyl)benzene (1,3-APB, 0.65 mole), 3,4'-oxydianiline (3,4'-ODA, 0.15 mole), 3,5-diamino-4'-phenylethynyl benzophenone (DPEB, 0.20 mole) and 4-phenylethynylphthalic anhydride (PEPA, 1.0599 mole).

Into a 100 mL three neck round bottom flask equipped with a mechanical stirrer, thermometer and nitrogen inlet/outlet was placed 1,3-APB (3.4080 g, 0.0117 mole), 3,4'-ODA (0.5387 g, 0.0027 mole), DPEB (1.1205 g, 0.0036 mole), and 10 mL N-methyl-2-pyrrolidinone (NMP). Once dissolved, a slurry of BPDA (2.4806 g, 0.0084 mole) and PEPA (4.7188 g, 0.0190 mole) in 10 mL of NMP was added and rinsed in with an additional 7 mL of NMP to afford a solids content of 30.6%. The mixture was stirred overnight under nitrogen (all solids had dissolved at this point). Toluene was then added (60 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~130° C. for ~8 hrs to give a quantitative yield of a tan powder. The powder exhibited an initial $T_g$ of 126° C. and $T_m$ of 183° C. and a $T_g$ of 297° C. after curing for 1 hour at 371° C. The powder exhibited a complex melt viscosity of 6 poise at 250° C., this viscosity was stable at 250° C. for the duration of the experiment (1 hour). The powder exhibited a complex melt viscosity of 2–53 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 75

Synthesis of a phenylethynyl terminated amide acid and imide co-oligomer with a calculated number average molecular weight of 100 g/mole using 3,3',4,4'-biphenyltetracarboxylic dianhydride (BPDA, 0.5813 mole), 1,3-bis(3-aminophenoxyphenyl)benzene (1,3-APB, 0.65 mole), 3,4'-oxydianiline (3,4'-ODA, 0.25 mole), 3,5-diamino-4'-phenylethynyl benzophenone (DPEB, 0.10 mole) and 4-phenylethynylphthalic anhydride (PEPA, 0.8374 mole).

Into a 100 mL three neck round bottom flask equipped with a mechanical stirrer, thermometer and nitrogen inlet/outlet was placed 1,3-APB (3.6452 g, 0.0125 mole), 3,4'-ODA (0.9603 g, 0.0048 mole), DPEB (0.5992 g, 0.0019 mole), and 8 mL N-methyl-2-pyrrolidinone (NMP). Once dissolved, a slurry of BPDA (3.2809 g, 0.0112 mole) and PEPA (3.9877 g, 0.0161 mole) in 8 mL of NMP was added and rinsed in with an additional 12 mL of NMP to afford a solids content of 30.1%. The mixture was stirred overnight under nitrogen (all solids had dissolved at this point). Toluene was then added (60 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~130° C. for ~8 hrs to give a quantitative yield of a tan powder. The powder exhibited an initial $T_g$ of 129° C. and a $T_g$ of 268° C. after curing for 1 hour at 371° C. The powder exhibited a complex melt viscosity of 20 poise at 250° C., this viscosity was stable at 250° C. for the duration of the experiment (1 hour). The powder exhibited a complex melt viscosity of 15 poise at 280° C., this viscosity was stable at 280° C. for the duration of the experiment (2 hours).

EXAMPLE 76

Synthesis of a phenylethynyl terminated amide acid and imide co-oligomer with a calculated number average molecular weight of 1250 g/mole using 3,3',4,4'-biphenyltetracarboxylic dianhydride (BPDA 0.6518 mole), 1,3-bis(3-aminophenoxyphenyl)benzene (1,3-APB, 0.75 mole), 4,4'-methylenedianiline (MDA, 0.25 mole) and 4-phenylethynylphthalic anhydride (PEPA, 0.6964 mole).

Into a 100 mL three neck round bottom flask equipped with a mechanical stirrer, thermometer and nitrogen inlet/outlet was placed 1,3-APB (4.6715 g, 0.0160 mole), MDA (1.0561 g, 0.0053 ), and 6 mL N-methyl-2-pyrrolidinone (NMP). A slurry of BPDA (4.0860 g, 0.0139 mole) and PEPA (3.6833 g, 0.0148 mole) in NMP (10 mL) was added. Additional NMP (14 mL) was used to rinse in all of the anhydrides (30.3% solids w/w). Upon addition of the anhydride/NMP slurry, the reaction temperature increased slightly. The mixture was stirred overnight under nitrogen (all solids had dissolved at this point). Toluene was then added (80 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~110° C. for ~8 hrs to give a quantitative yield of a light brown powder. The powder exhibited an initial $T_g$ of 146° C. and $T_g$ of 242° C. after curing for 1 hour at 371° C. The powder exhibited a complex melt viscosity of 55 poise at 250° C., this viscosity was stable at 250° C. for the duration of the experiment (1 hour). The powder exhibited a complex melt viscosity of 6 poise at 280° C., this viscosity was stable at 280° C. for the duration of the experiment (2 hours).

EXAMPLE 77

Synthesis of a phenylethynyl terminated amide acid and imide co-oligomer with a calculated number average molecular weight of 1000 g/mole using 3,3',4,4'-biphenyltetracarboxylic dianhydride (BPDA 0.5801 mole), 1,3-bis(3-aminophenoxyphenyl)benzene (1,3-APB, 0.55 mole), 3,4'-oxydianiline (3,4'-ODA, 0.25 mole), 3,5-diamino-4'-phenylethynyl benzophenone (DPEB, 0.20 mole) and 4-phenylethynylphthalic anhydride (PEPA, 0.8398 mole).

Into a 100 mL three neck round bottom flask equipped with a mechanical stirrer, thermometer and nitrogen inlet/ outlet was placed 1,3-APB (2.8723 g, 0.0098 mole), 3,4'-ODA (0.8943 g, 0.0045), DPEB (1.1161 g, 0.0036 mole) and 8 mL N-methyl-2-pyrrolidinone (NMP). A slurry of BPDA (3.0491 g, 0.0104 mole) and PEPA (3.7242 g, 0.0150 mole) in NMP (7 mL) was added. Additional NMP (11 mL) was used to rinse in all of the anhydrides (30.4% solids w/w). Upon addition of the anhydride/NMP slurry, the reaction temperature increased slightly.

The mixture was stirred overnight under nitrogen (all solids had dissolved at this point). Toluene was then added (80 mL) and the reaction flask was fitted with a Dean Stark trap and reflux condenser. The mixture was heated via an oil bath to 185°C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~110° C. for ~8 hrs to give a quantitative yield of a light brown powder. The powder exhibited an initial $T_g$ of 137° C. and $T_m$ of 186° C. and a $T_g$ of 295° C. after curing for 1 hour at 371° C. The powder exhibited a complex melt viscosity of 25 poise at 250° C., this viscosity was stable at 250° C. for the duration of the experiment (1 hour). The powder exhibited a complex melt viscosity of 15 poise at 280° C., this viscosity was stable at 280° C. for the duration of the experiment (2 hours).

EXAMPLE 78

Synthesis of a phenylethynyl terminated amide acid and imide co-oligomer with a calculated number average molecular weight of 1000 g/mole using 3,3',4,4'- biphenyltetracarboxylic dianhydride (BPDA 0.5836 mole), 1,3-bis(3-aminophenoxyphenyl)benzene (1,3-APB, 0.55 mole), 3,4'-oxydianiline (3,4'-ODA, 0.30 mole), 3,5-diamino-4'-phenylethynyl benzophenone (DPEB, 0.15 mole) and 4-phenylethynylphthalic anhydride (PEPA, 0.8328 mole).

Into a 100 mL three neck round bottom flask equipped with a mechanical stirrer, thermometer and nitrogen inlet/outlet was placed 1,3-APB (2.8577 g, 0.0098 mole), 3,4'-ODA (1.0677 g, 0.0053), DPEB (0.8328 g, 0.0027 mole) and 5 mL N-methyl-2-pyrrolidinone (NMP). A slurry of BPDA (3.0518 g, 0.0104 mole) and PEPA (3.6744 g, 0.0148 mole) in NMP (7 mL) was added. Additional NMP (13 mL) was used to rinse in all of the anhydrides (30.8% solids w/w). Upon addition of the anhydride/NMP slurry, the reaction temperature increased slightly. The mixture was stirred overnight under nitrogen (all solids had dissolved at this point). Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~110° C. for ~8 hrs to give a quantitative yield of a light brown powder. The powder exhibited an initial $T_g$ of 144° C. and $T_m$ of 190° C. and a $T_g$ of 295° C. after curing for 1 hour at 371° C. The powder exhibited a complex 20 melt viscosity of 23 poise at 250° C., this viscosity was stable at 250° C. for the duration of the experiment (1 hour). The powder exhibited a complex melt viscosity of 25 poise at 280° C., this viscosity was stable at 280° C. for the duration of the experiment (2 hours).

EXAMPLE 79

Synthesis of a phenylethynyl terminated amide acid and imide co-oligomer with a calculated number average molecular weight of 1000 g/mole using 3,3',4,4'- biphenyltetracarboxylic dianhydride (BPDA 0.5813 mole), 1,3-bis(3-30 aminophenoxyphenyl)benzene (1,3-APB, 0.65 mole), 3,4'-oxydianiline (3,4'-ODA, 0.25 mole), 3,5-diamino-4'-phenylethynyl benzophenone (DPEB, 0.10 mole) and 4-phenylethynylphthalic anhydride (PEPA, 0.8374 mole).

Into a 100 mL three neck round bottom flask equipped with a mechanical stirrer, thermometer and nitrogen inlet/outlet was placed 1,3-APB (3.6452 g, 0.0125 mole), 3,4'-ODA (0.9603 g, 0.0048), DPEB (0.5992 g, 0.0019 mole) and 8 mL N-methyl-2-pyrrolidinone (NMP). A slurry of BPDA (3.2809 g, 0.0112 mole) and PEPA (3.9877 g, 0.0161 mole) in NMP (8 mL) was added. Additional NMP (12 mL) was used to rinse in all of the anhydrides (30.1% solids w/w). Upon addition of the anhydride/NMP slurry, the reaction temperature increased slightly. The mixture was stirred overnight under nitrogen (all solids had dissolved at this point). Toluene was then added (70 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) three times. The solid was allowed to air dry overnight and further dried in a forced air oven at ~110° C. for ~8 hrs to give a quantitative yield of a light brown powder. The powder exhibited an initial $T_g$ of 129° C. and a $T_g$ of 268° C. after curing for 1 hour at 371° C. The powder exhibited a complex melt viscosity of 20 poise at 250° C., this viscosity was stable at 250° C. for the duration of the experiment (1 hour). The powder exhibited a complex melt viscosity of 10 poise at 280° C., this viscosity was stable at 280° C. for the duration of the experiment (2 hours).

EXAMPLE 80

Synthesis of a phenylethynyl terminated amide acid and imide co-oligomer with a calculated number average molecular weight of 750 g/mole using 3,3',4,4'-biphenyltetracarboxylic dianhydride (BPDA 0.4796 mole), 1,3-bis(3-aminophenoxyphenyl)benzene (1,3-APB, 0.375 mole), 1,4-bis(4-aminophenoxyphenyl)benzene (1,4-APB, 0.375 mole), 3,4'-oxydianiline (3,4'-ODA, 0.25 mole) and 4-phenylethynylphthalic anhydride (PEPA, 1.0407 mole).

Into a 100 mL three neck round bottom flask equipped with a mechanical stirrer, thermometer and nitrogen inlet/outlet was placed 1,3-APB (1.8475 g, 0.0063 mole), 1,4-APB (1.8475 g, 0.0063 mole), 3,4'-ODA (0.8436 g, 0.0042) and 10 mL N-methyl-2-pyrrolidinone (NMP). A slurry of BPDA (2.3779 g, 0.0081 mole) and PEPA (4.3536 g, 0.0175 mole) in NMP (7 mL) was added. Additional NMP (8 mL) was used to rinse in all of the anhydrides (30.4% solids w/w). Upon addition of the anhydride/NMP slurry, the reaction temperature increased slightly. The mixture was stirred overnight under nitrogen (all solids had dissolved at this point). Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The imide was added to water to obtain the oligomer. The solid was isolated by filtration, washed in warm water (by placing in a large beaker and stirring) three times. The solid was allowed to air dry overnight and further dried in a forced air oven at ~130° C. for 5 hrs to give a quantitative yield of a light brown powder. The powder exhibited an initial $T_g$ of 128° C. and $T_m$s of 186, 217, 238, 280, and 304° C. and a $T_g$ of 294° C. after curing for 1 hour at 371° C. The powder exhibited a complex melt viscosity of 150–175 poise at 250° C., this viscosity was stable at 250° C. for the duration of the experiment (1 hour). The powder exhibited a complex melt viscosity of 8 poise at 280° C., this viscosity was stable at 280° C. for the duration of the experiment (2 hours).

EXAMPLE 81

Synthesis of a phenylethynyl terminated amide acid and imide co-oligomer with a calculated number average molecular weight of 750 g/mole using 3,3',4,4'-biphenyltetracarboxylic dianhydride (BPDA 0.4796 mole), 1,3-bis(4-aminophenoxyphenyl)benzene (1,3–4APB, 0.75 mole), 3,4'-oxydianiline (3,4'-ODA, 0.25 mole) and 4-phenylethynylphthalic anhydride (PEPA, 1.0407 mole).

Into a 100 mL three neck round bottom flask equipped with a mechanical stirrer, thermometer and nitrogen inlet/outlet was placed 1,3–4APB (3.8397 g, 0.0131 mole), 3,4'-ODA (0.8767 g, 0.0044) and 10 mL N-methyl-2-pyrrolidinone (NMP). A slurry of BPDA (2.4711 g, 0.0084 mole) and PEPA (4.5241 g, 0.0182 mole) in NMP (8 mL) was added. Additional NMP (9 mL) was used to rinse in all of the anhydrides (29.6% solids w/w). Upon addition of the anhydride/NMP slurry, the reaction temperature increased slightly. The mixture was stirred overnight under nitrogen (all solids had dissolved at this point). Toluene was then added (75 mL) and the reaction flask was fitted with a Dean Stark trap and reflux condenser. The mixture was heated via an oil bath to 185° C. and held overnight. The toluene was removed from the system via the Dean Stark trap (the reaction temp eventually reached ~205° C. during the toluene removal) and the reaction solution was allowed to cool to room temperature. The imide was added to water to obtain the oligomer. The solid was isolated by filtration, washed in warm water (by placing in a large beaker and stirring) three times. The solid was allowed to air dry overnight and further dried in a forced air oven at ~130° C. for 5 hrs to give a quantitative yield of a light brown powder. The powder exhibited an initial $T_g$ of 139° C. and $T_m$s of 167, 218, and 272° C. and a $T_g$ of 301° C. after curing for 1 hour at 371° C. The powder exhibited a complex melt viscosity of 6–13 poise at 280° C., this viscosity was stable at 280° C. for the duration of the experiment (2 hours).

We claim:

1. A low melt viscosity imide resin that is processable by resin transfer molding or resin infusion prepared by combining components comprising:
   (A) a diamine combination comprising:
      (i) greater than about fifty molar percent of a flexible diamine
      (ii) at least a second diamine
   (B) at least one aromatic dianhydride; and
   (C) an endcapping agent having a phenylethynyl group wherein said components have a low stoichiometric ratio from about 0.19 to about 0.72 of dianhydride to diamine combination and wherein said imide resin has a melt viscosity of less than approximately 60 poise below approximately 300° C.

2. The resin of claim 1 wherein said second diamine is rigid and comprises less than approximately fifty molar percent of said combination.

3. The resin of claim 1 wherein said second diamine is a pendent phenylethynyl containing diamine comprising less than approximately twenty molar percent of said combination.

4. The resin of claim 2 wherein said diamine combination further comprises a third diamine having pendent phenylethynyl groups.

5. The resin of claim 1 wherein said flexible diamine is selected from the group consisting of 1,3-bis(3-aminophenoxy) benzene and 1,3-bis(4-aminophenoxy) benzene.

6. The resin of claim 2 wherein said rigid diamine is selected from the group consisting of: 1,3-diaminobenzene, 9,9'-bis(4-aminophenyl)fluorene and 3,4'-diaminodiphenyl ether.

7. The resin of claim 3 wherein said phenylethynyl containing diamine is 3,5-diamino-4'-phenylethynyl benzophenone.

8. The resin of claim 1 wherein said aromatic dianhydride is selected from the group consisting of: 3,3',4,4'-biphenyltetracarboxylic dianhydride, 4,4'-oxydiphthalic anhydride, pyromellitic dianhydride and 4,4'-biphenoxydiphthalic anhydride.

9. The resin of claim 1 wherein the endcapping agent is 4-phenylethynylphthalic anhydride.

10. An adhesive prepared from the resin of claim 1.

11. A coating composition prepared from the resin of claim 1.

12. A cured film prepared from the resin of claim 1.

13. A foam prepared from the resin of claim 1.

14. A molding prepared from the resin of claim 1.

15. A fiber prepreg prepared from the resin of claim 1.

16. A composite matrix prepared from the resin of claim 1.

17. A method for preparing low melt viscosity imide resins that are processable by resin transfer molding or resin infusion comprising:
   (A) chemically combining:
      (i) a diamine combination comprising:
         A. greater than about fifty molar percent of a flexible diamine
         B. at least a second diamine
      (ii) at least one aromatic dianhydride; and
      (iii) an endcapping agent having a phenylethynyl group wherein the chemical combination has a low stoichiometric ratio from about 0.19 to about 0.72 of dianhydride to diamine combination and wherein said imide resin has a melt viscosity of less than approximately 60 poise below approximately 300° C.;
   (B) imidizing the chemical combination.

18. The method of claim 17 wherein said second diamine is rigid and comprises less than approximately fifty molar percent of said diamine combination.

19. The method of claim 17 wherein said second diamine is a pendent phenylethynyl containing diamine comprising less than approximately twenty molar percent of said diamine combination.

20. The method of claim 18 wherein said diamine combination fuirther comprises a third diamine having pendent phenylethynyl groups.

21. The method of claim 17 wherein said flexible diamine is selected from the group consisting of: 1,3-bis(3-aminophenoxy) benzene and 1,3-bis(4-aminophenoxy) benzene.

22. The method of claim 18 wherein said rigid diamine is selected from the group consisting of: 1,3-diaminobenzene, 9,9'-bis(4-aminophenyl)fluorene and 3,4'-diaminodiphenyl ether.

23. The method of claim 19 wherein said phenylethynyl containing diamine is 3,5-diamino-4'-phenylethynyl benzophenone.

24. The method of claim 17 wherein said aromatic dianhydride is selected from the group consisting of: 3,3',4,4'-biphenyltetracarboxylic dianhydride, 4,4'-oxydiphthalic anhydride, pyromellitic dianhydride and 4,4'-biphenoxydiphthalic anhydride.

25. The method of claim 17 wherein the endcapping agent is 4-phenylethynylphthalic anhydride.

26. An adhesive prepared from the method of claim 17.

27. A coating composition prepared from the method of claim 17.

28. A cured film prepared from the method of claim 17.

29. A foam prepared from the method of claim 17.

30. A molding prepared from the method of claim 17.

31. A fiber prepreg prepared from the method of claim 17.

32. A composite matrix prepared from the method of claim 17.

33. The method of claim 17 wherein said imidizing is performed through chemical or thermal treatment.

* * * * *